US011042261B2

(12) United States Patent
Choi et al.

(10) Patent No.: US 11,042,261 B2
(45) Date of Patent: Jun. 22, 2021

(54) GENERATING CONTENT TO BE SHARED BETWEEN USERS

(71) Applicant: Facebook, Inc., Menlo Park, CA (US)

(72) Inventors: Christine Choi, San Francisco, CA (US); Yo-Tzu Yeh, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/709,159

(22) Filed: Dec. 10, 2019

(65) Prior Publication Data

US 2021/0124476 A1    Apr. 29, 2021

Related U.S. Application Data

(60) Provisional application No. 62/926,353, filed on Oct. 25, 2019.

(51) Int. Cl.
| | | |
|---|---|---|
| G06F 3/0481 | (2013.01) | |
| H04L 29/08 | (2006.01) | |
| G06F 3/0484 | (2013.01) | |
| G06F 3/0482 | (2013.01) | |
| H04L 12/58 | (2006.01) | |
| G06Q 50/00 | (2012.01) | |

(52) U.S. Cl.
CPC ........ *G06F 3/04817* (2013.01); *G06F 3/0482* (2013.01); *G06F 3/04847* (2013.01); *G06Q 50/01* (2013.01); *H04L 51/32* (2013.01); *H04L 67/306* (2013.01)

(58) Field of Classification Search
CPC ............... G06F 3/04817; G06F 3/0482; G06F 3/04847; G06Q 50/01; H04L 67/306; H04L 51/32
See application file for complete search history.

(56) References Cited

U.S. PATENT DOCUMENTS

| | | |
|---|---|---|
| D425,497 S | 5/2000 | Eisenberg et al. |
| D438,873 S | 3/2001 | Wang et al. |
| D445,426 S | 7/2001 | Wang et al. |
| D585,453 S | 1/2009 | Chen et al. |
| D603,416 S | 11/2009 | Poling et al. |
| D644,662 S | 9/2011 | Gardner et al. |
| D683,739 S | 6/2013 | Glassman et al. |
| D684,583 S | 6/2013 | Brinda et al. |
| D702,698 S | 4/2014 | d'Amore et al. |

(Continued)

OTHER PUBLICATIONS

Lens Studio, "Countdown: Create a Snapchat Lens for your next birthday party or event!", uploaded on Aug. 26, 2019, youtube.com, All Pages. Retrieved from internet: <https://youtu.be/GLQ1nTkJJs8> (Year: 2019).*

(Continued)

*Primary Examiner* — Roberto Borja
(74) *Attorney, Agent, or Firm* — Lee & Hayes, P.C.

(57) ABSTRACT

Techniques are described for generating content to be shared between users. For example, user interfaces are described that include features and/or mode controls for generating content to be shared between users. Additionally, the described techniques include determining content shared between users (e.g., previously distributed content) based on a selection of a second user account, and generating customized content which may be specific to an event that includes the shared content.

20 Claims, 37 Drawing Sheets

(56) References Cited

U.S. PATENT DOCUMENTS

| | | | |
|---|---|---|---|
| 8,789,103 B2 | 7/2014 | Onogi et al. | |
| D714,822 S | 10/2014 | Capua et al. | |
| D725,666 S | 3/2015 | Tseng et al. | |
| 9,081,777 B1 | 7/2015 | Krawczyk | |
| D737,295 S | 8/2015 | Jung et al. | |
| 9,110,992 B2 | 8/2015 | Johnson et al. | |
| 9,153,000 B2 | 10/2015 | Kazan et al. | |
| D750,125 S | 2/2016 | Yang et al. | |
| D754,671 S | 4/2016 | Aldamiz Echevarria et al. | |
| D757,763 S | 5/2016 | Lim | |
| D757,769 S | 5/2016 | Wang et al. | |
| 9,342,851 B2 | 5/2016 | Musil | |
| D759,700 S | 6/2016 | Williams et al. | |
| D760,275 S | 6/2016 | Zhang | |
| D773,512 S | 12/2016 | Miura et al. | |
| D784,397 S | 4/2017 | Kim et al. | |
| D787,532 S | 5/2017 | Williams et al. | |
| D789,969 S | 6/2017 | Chaudhri et al. | |
| D795,293 S | 8/2017 | Nichols et al. | |
| 9,766,783 B2 | 9/2017 | Watson et al. | |
| D800,765 S | 10/2017 | Stoksik | |
| D802,607 S | 11/2017 | Apodaca et al. | |
| D810,113 S | 2/2018 | Huynh et al. | |
| D810,772 S | 2/2018 | Wang et al. | |
| D813,903 S | 3/2018 | Boyd et al. | |
| D816,104 S | 4/2018 | Rauschenbach et al. | |
| D817,995 S | 5/2018 | Choi | |
| D821,436 S | 6/2018 | Kim et al. | |
| D823,867 S | 7/2018 | Berlow | |
| D825,608 S | 8/2018 | Andrizzi et al. | |
| D826,240 S | 8/2018 | Andrizzi et al. | |
| D829,748 S | 10/2018 | Iwabuchi | |
| D831,065 S | 10/2018 | Walkin et al. | |
| D833,472 S | 11/2018 | Blechschmidt et al. | |
| D833,478 S | 11/2018 | Coquilla et al. | |
| D835,654 S | 12/2018 | Spikman et al. | |
| D836,130 S | 12/2018 | Chu et al. | |
| D837,809 S | 1/2019 | Kagatsume et al. | |
| D842,875 S | 3/2019 | Morris et al. | |
| D849,033 S | 5/2019 | Mokwunye | |
| D849,770 S | 5/2019 | Matas | |
| 10,324,586 B1 | 6/2019 | Parmar et al. | |
| D864,990 S | 10/2019 | Lee et al. | |
| D869,486 S | 12/2019 | Kim et al. | |
| D872,742 S | 1/2020 | Park et al. | |
| 10,534,806 B2 | 1/2020 | Stoddard, II et al. | |
| D875,115 S | 2/2020 | Yan | |
| 10,554,602 B2 | 2/2020 | Park et al. | |
| D877,162 S | 3/2020 | Hanson | |
| D877,750 S | 3/2020 | Stamatiou | |
| D877,776 S | 3/2020 | Jang et al. | |
| D879,817 S | 3/2020 | Evans et al. | |
| D881,210 S | 4/2020 | Anzures et al. | |
| D882,621 S | 4/2020 | Anzures et al. | |
| 10,623,917 B1 | 4/2020 | Paul | |
| D884,013 S | 5/2020 | Clediere | |
| D887,423 S | 6/2020 | Lee | |
| D888,081 S | 6/2020 | Stamatiou | |
| D888,756 S | 6/2020 | Clarke et al. | |
| D890,198 S | 7/2020 | Paul | |
| D892,141 S | 8/2020 | Clifford et al. | |
| D892,142 S | 8/2020 | Clifford et al. | |
| D894,921 S | 9/2020 | Paul | |
| D903,699 S | 12/2020 | Paul | |
| D904,425 S | 12/2020 | Paul | |
| D907,052 S | 1/2021 | Paul | |
| D910,064 S | 2/2021 | Paul | |
| 2006/0181736 A1 | 8/2006 | Quek et al. | |
| 2008/0115160 A1* | 5/2008 | Palo | H04N 5/44543 |
| | | | 725/25 |
| 2009/0222519 A1* | 9/2009 | Boyd | G06Q 10/109 |
| | | | 709/204 |
| 2011/0047512 A1 | 2/2011 | Onogi et al. | |
| 2011/0234593 A1 | 9/2011 | Heilmann | |
| 2011/0282942 A1 | 11/2011 | Berger et al. | |
| 2011/0283210 A1 | 11/2011 | Berger et al. | |
| 2013/0339091 A1 | 12/2013 | Humay | |
| 2013/0339440 A1 | 12/2013 | Balassanian et al. | |
| 2014/0006993 A1* | 1/2014 | Deluca | G06F 9/451 |
| | | | 715/772 |
| 2014/0155175 A1 | 6/2014 | Berger et al. | |
| 2014/0214831 A1 | 7/2014 | Chi et al. | |
| 2014/0372274 A1* | 12/2014 | Barry | G06Q 40/04 |
| | | | 705/37 |
| 2015/0252435 A1 | 9/2015 | Chou et al. | |
| 2015/0312291 A1 | 10/2015 | Dave et al. | |
| 2015/0352435 A1 | 12/2015 | Imai et al. | |
| 2015/0363747 A1 | 12/2015 | Agarwal | |
| 2016/0173436 A1* | 6/2016 | Koolwal | G06Q 50/01 |
| | | | 709/206 |
| 2016/0196584 A1* | 7/2016 | Franklin | G06F 3/04845 |
| | | | 705/14.64 |
| 2016/0203577 A1 | 7/2016 | Bell | |
| 2016/0292648 A1 | 10/2016 | Cowan | |
| 2016/0294799 A1 | 10/2016 | Miller et al. | |
| 2016/0342311 A1 | 11/2016 | Homick | |
| 2016/0357365 A1 | 12/2016 | Garand et al. | |
| 2017/0185596 A1 | 6/2017 | Spirer | |
| 2017/0200122 A1 | 7/2017 | Edson et al. | |
| 2017/0263029 A1* | 9/2017 | Yan | G06F 3/04842 |
| 2018/0096074 A1 | 4/2018 | Gueye | |
| 2018/0164986 A1* | 6/2018 | Al Majid | G06F 3/04845 |
| 2018/0190002 A1 | 7/2018 | Song et al. | |
| 2018/0248942 A1 | 8/2018 | Smarr et al. | |
| 2019/0130498 A1 | 5/2019 | Constantinides | |
| 2021/0042021 A1 | 2/2021 | Smith et al. | |

OTHER PUBLICATIONS

Daniel Rubino, "Top performer Countdown from iOS brought over to Windows Phone", Dec. 28, 2018, windowscentral.com, all pages. Retrieved from internet: <https://www.windowscentral.com/countdown-ios-brought-over-windows-phone> (Year: 2018).*

Rareclass Enterprises, "How to add a countdown clock app to Facebook", Sep. 28, 2016, youtube.com, all pages (Year: 2016).*

Office Action for U.S. Appl. No. 16/709,336, dated Jun. 19, 2020, Choi, "Generating Content to Be Shared Between Users", 13 pages.

Office Action for U.S. Appl. No. 16/709,688, dated Oct. 26, 2020, Choi, "Generating Content to Be Shared Between Users", 4 Pages.

Office Action for U.S. Appl. No. 16/709,739, dated Sep. 22, 2020, Choi, "Generating Content to Be Shared Between Users", 15 pages.

Babich, "Radio Buttons UX Design", UX Planet, retrieved at <<https://uxplanet.org/radio-buttons-ux-design-588e5c0a50dc>>, May 16, 2016, 4 pages.

"Daily UI #014—Countdown Timer", Dribbble.com, retrieved at <<https://dribbble.com/shots/3200973-Daily-UI-014-Countdown-Timer>>, Jan. 2017, 2 pages.

"Dynamic Count Down Wall Example", retrieved at <<https://web.archive.org/web/20161206131429/http://dynamicdrive.com/dynamicindex6/countdownwall.htm>>, Dec. 2016, 1 page.

"Flip Countdown free PSD", Freebiesbug, retrieved at <<https://freebiesbug.com/psd-freebies/flip-countdown/>>, Nov. 2012, 1 page.

"GitHub—xdan/flipcountdown: Clock in retro style", GitHub, retrieved at <<https://github.com/xdan/flipcountdown>>, Nov. 2016, 2 pages.

"How to design UI search patterns for web: Best practices for designing web search patterns", Justinmind, retrieved at <<https://www.justinmind.com/blog/best-practices-for-designing-your-search-pattern/>>, Dec. 2017, 1 page.

Mangwana, "Search Bar Design", retrieved at <<https://dribbble.com/shots/6840630-Search-Bar-Design>>, Jul. 2019, 2 pages.

Office Action for U.S. Appl. No. 16/709,739, dated Feb. 25, 2021, Choi, "Generating Content to Be Shared Between Users", 15 pages.

Office Action for U.S. Appl. No. 29/716,559, dated Mar. 2, 2021, Choi, "Display Screen Having a Graphical User Interface or Portion Thereof", 6 pages.

Office Action for U.S. Appl. No. 16/709,688, dated Dec. 14, 2020, Choi, "Generating Content to Be Shared Between Users", 3 pages.

Office Action for U.S. Appl. No. 16/709,336, dated Dec. 16, 2020, Choi, "Generating Content to Be Shared Between Users", 17 pages.

(56) References Cited

OTHER PUBLICATIONS

"Search Bar UI Design for Sketch, Adobe Xd, Illustrator, and .eps—Freebies UI", Freebies UI, retrieved at <<https://freebiesui.com/xd-freebies/xd-ui-kits/search-bar-ui-design/>>, Mar. 2017, 1 page.

"Making a digital clock in Java", Stack Overflow, retrieved at <<https://stackoverflow.com/questions/15329869/making-a-digital-clock-in-java>>, Mar. 2013, 2 pages.

"Timer PSD | Creative Other Presentation Software Templates", Creative Market, retrieved at <<https://creativemarket.com/Whitelighter/49951-Timer-PSD?u=Traint&utm_source=Pinterest&utm_medium=CM>>, Jun. 2014, 2 pages.

"Java-GUI clock using large amounts of RAM?", Stack Overflow, retrieved at <<https://stackoverflow.com/questions/27160592/java-gui-clock-using-large-amounts-of-ram>>, Nov. 2014, 3 pages.

\* cited by examiner

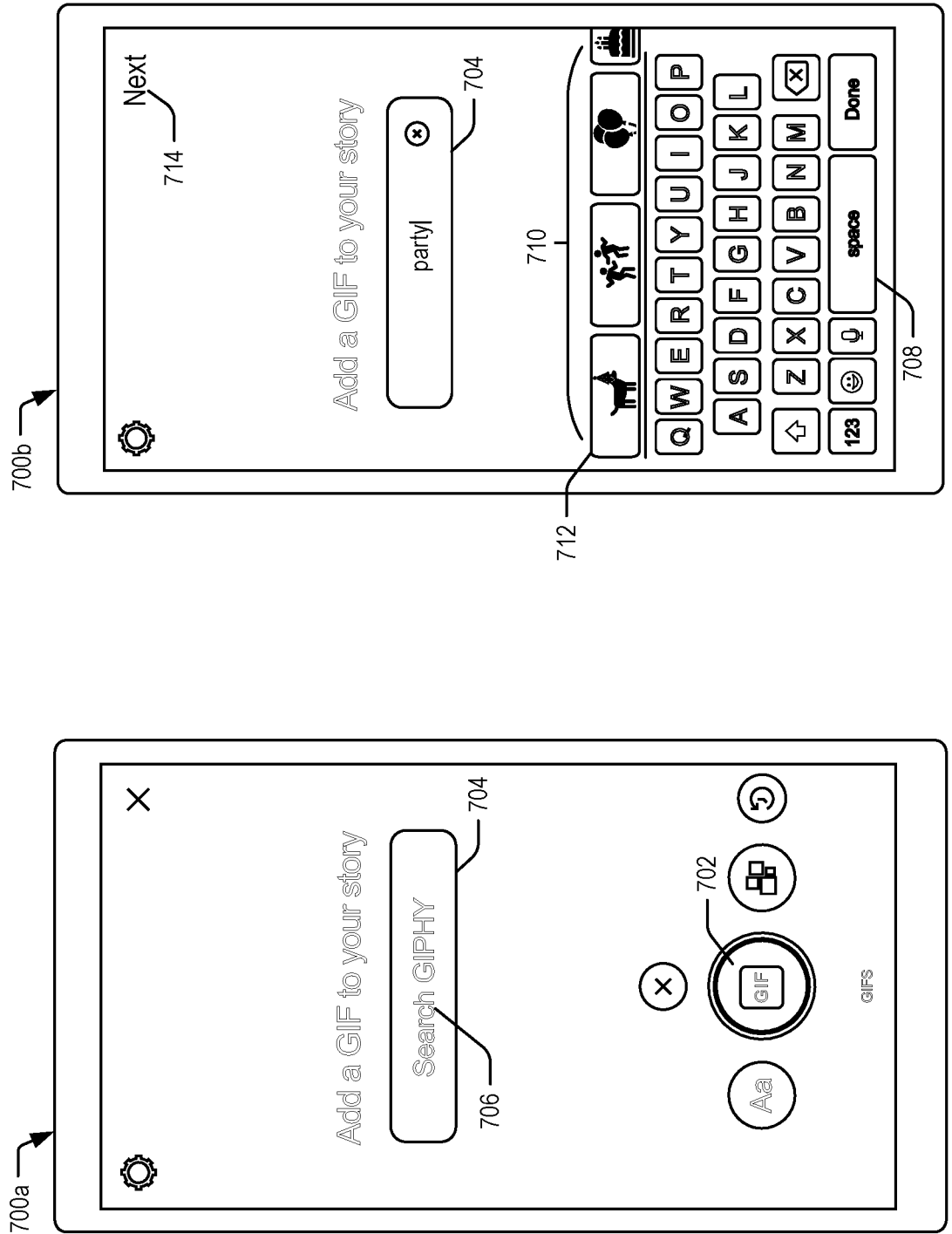

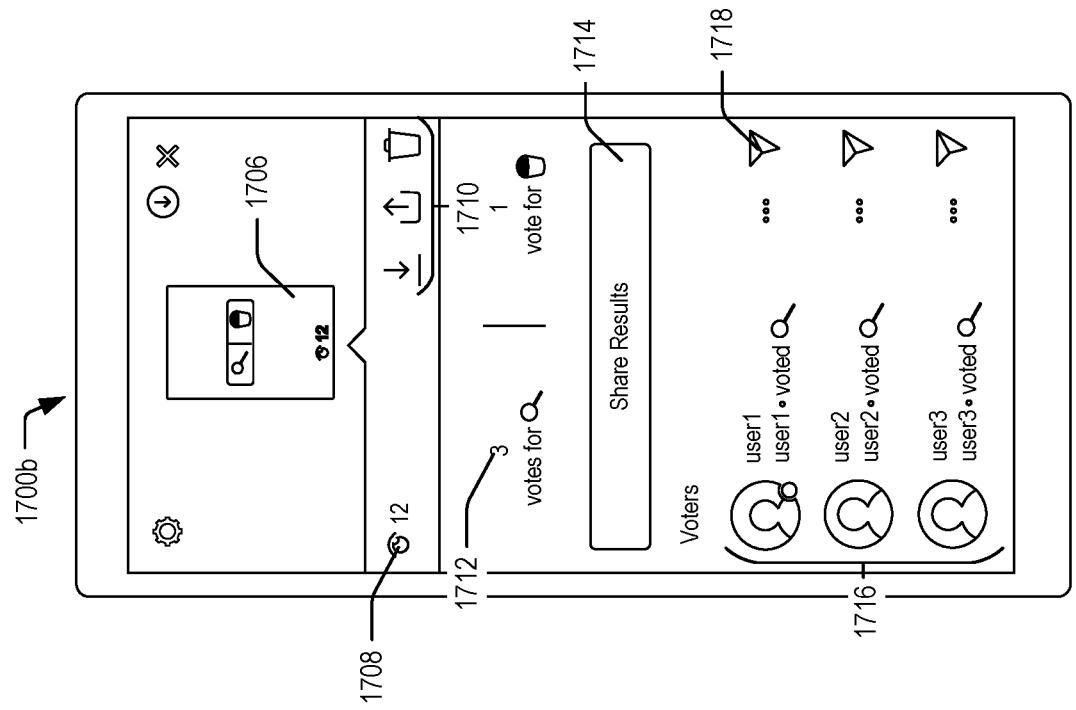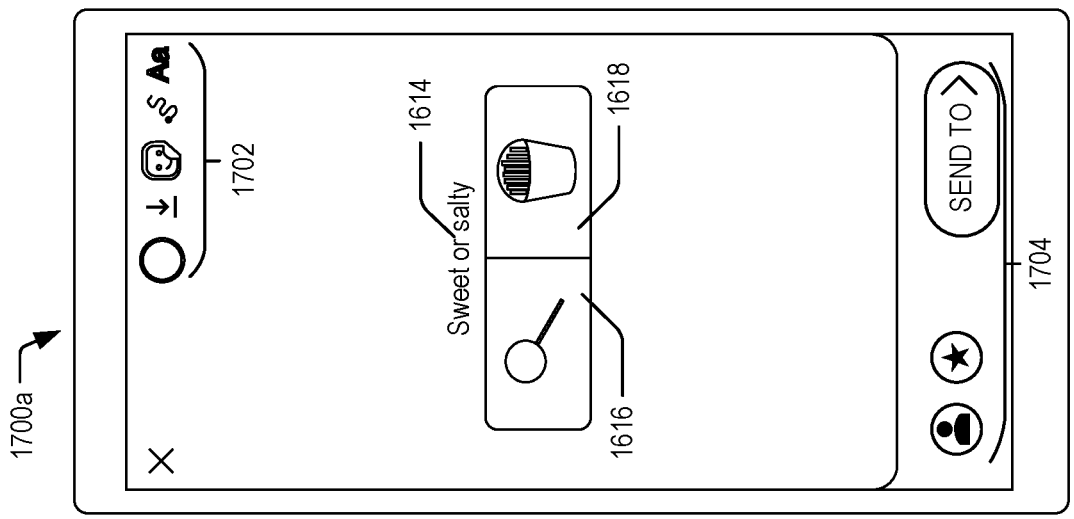
FIG. 17B
FIG. 17A

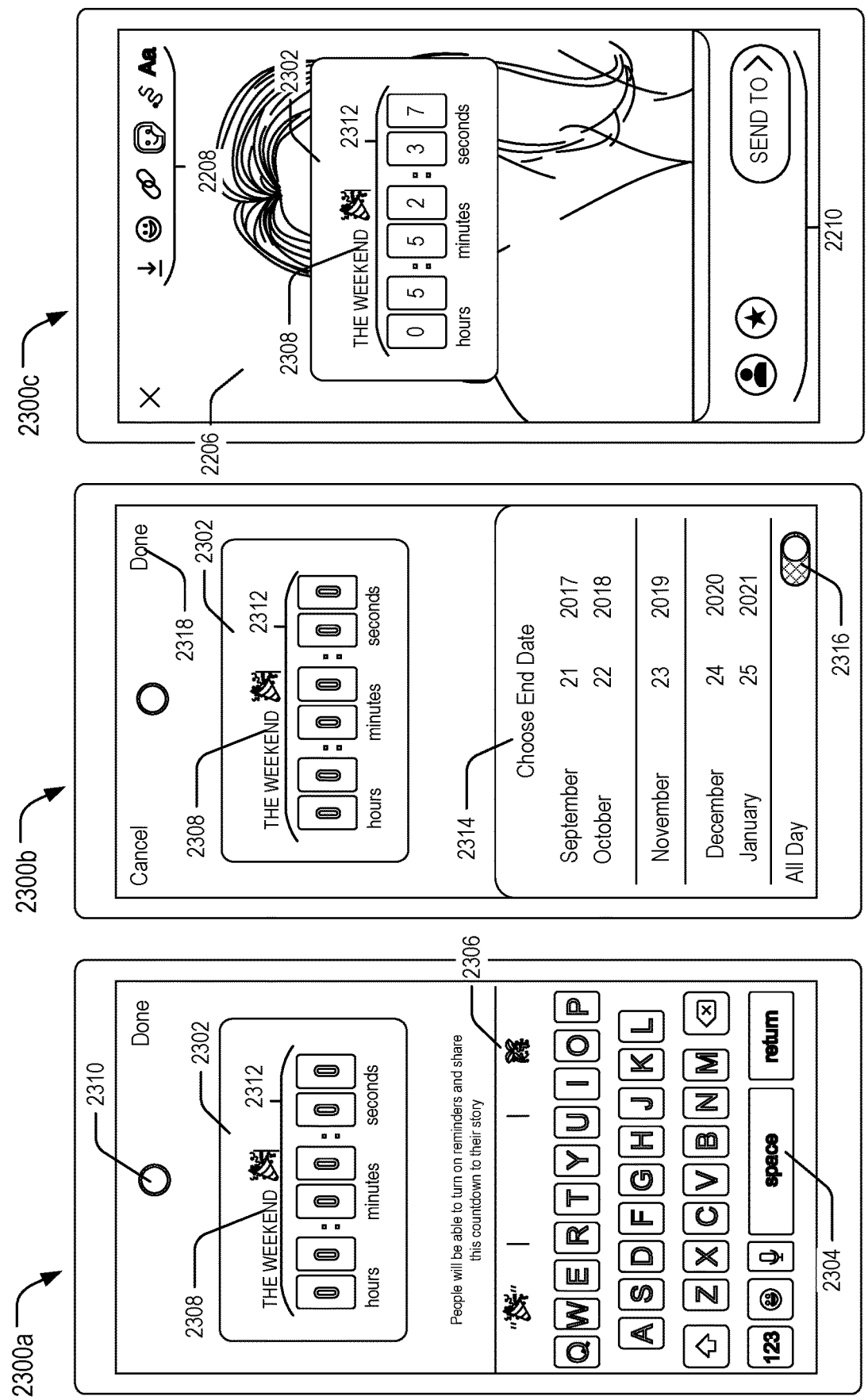

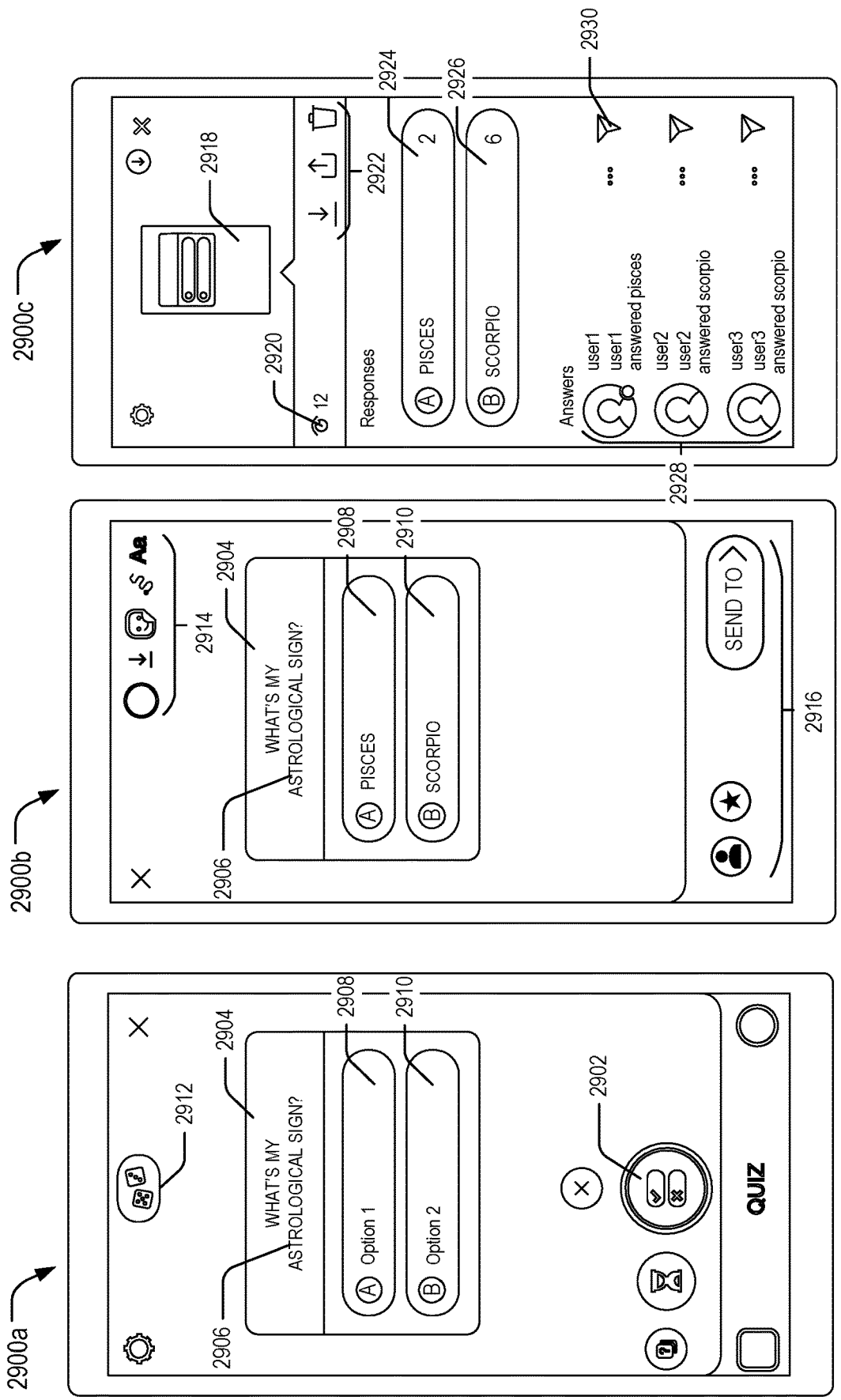

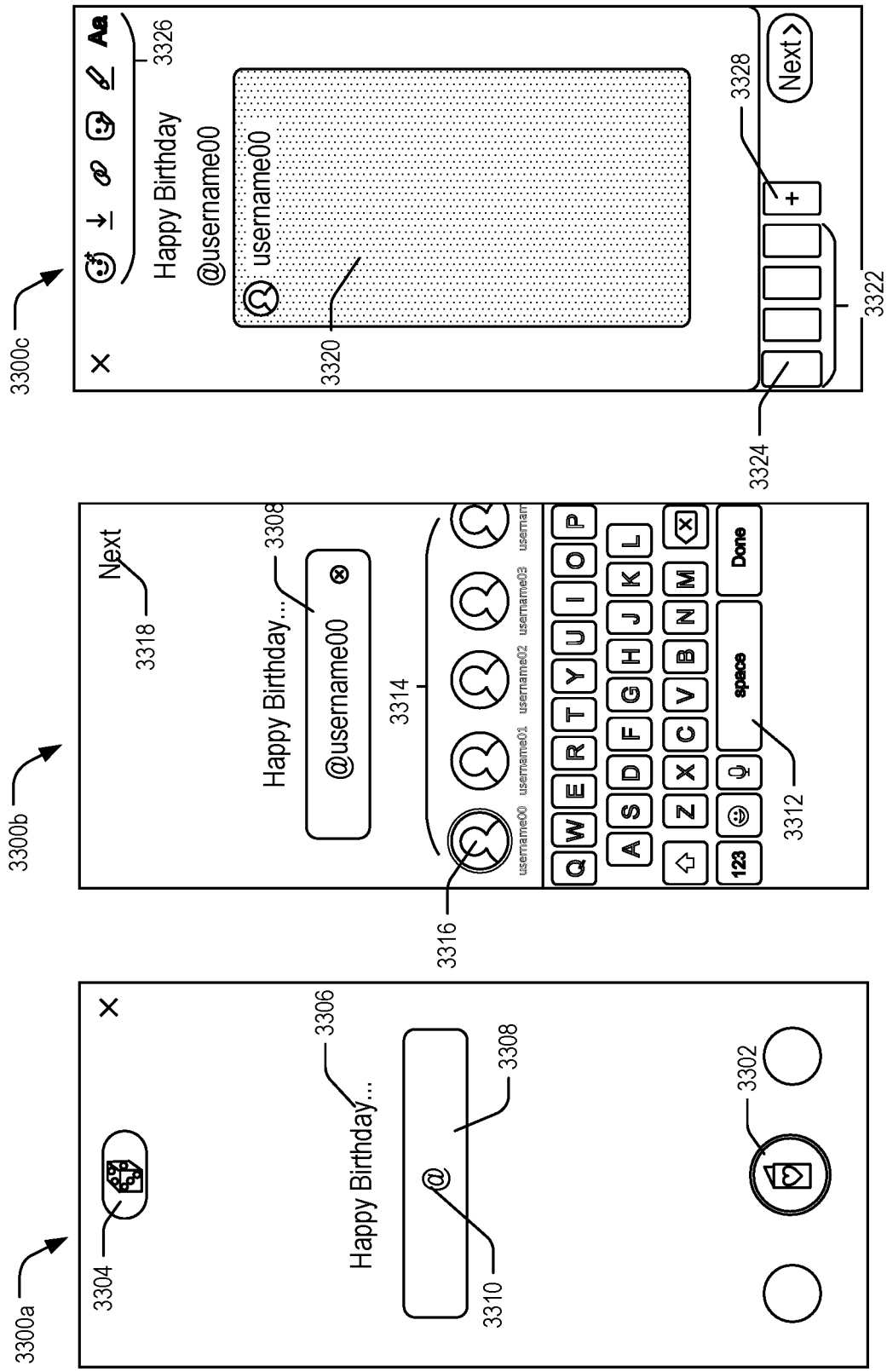

GENERATING CONTENT TO BE SHARED BETWEEN USERS

This application claims the benefit of priority to U.S. Provisional Application No. 62/926,353, filed Oct. 25, 2019, which is incorporated herein by reference.

BACKGROUND

Social networking platforms allow users to share content with one another. Users may share content such as images, video, audio, text, and other content types using social networking platforms. Oftentimes, it can be cumbersome for users to locate a specific, desired content item from numerous content items that may be located in different places that they desire to share on a social media platform. Additionally, functionality is often limited within a social media platform for how to customize content items that a user desires to share.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 7A-7B and 8A-8B illustrate example interfaces corresponding to a graphics interchange format (GIF) feature of a create mode control of an ephemeral content creation functionality.

FIGS. 16A-16C and FIGS. 17A and 17B illustrate example interfaces corresponding to poll feature of a create mode control of an ephemeral content creation functionality.

FIGS. 22A-22C, FIGS. 23A-23C, and FIGS. 24A-24C illustrate example interfaces corresponding to countdown feature of a normal mode control and a create mode control of an ephemeral content creation functionality.

FIGS. 27A-27C, FIGS. 28A-28C, and FIGS. 29A-29C illustrate example interfaces corresponding to quiz feature of a normal mode control and a create mode control of an ephemeral content creation functionality.

FIGS. 33A-33C illustrate example interfaces usable to present and select a user to whom to send a Shoutout message.

DETAILED DESCRIPTION

Figure 1:
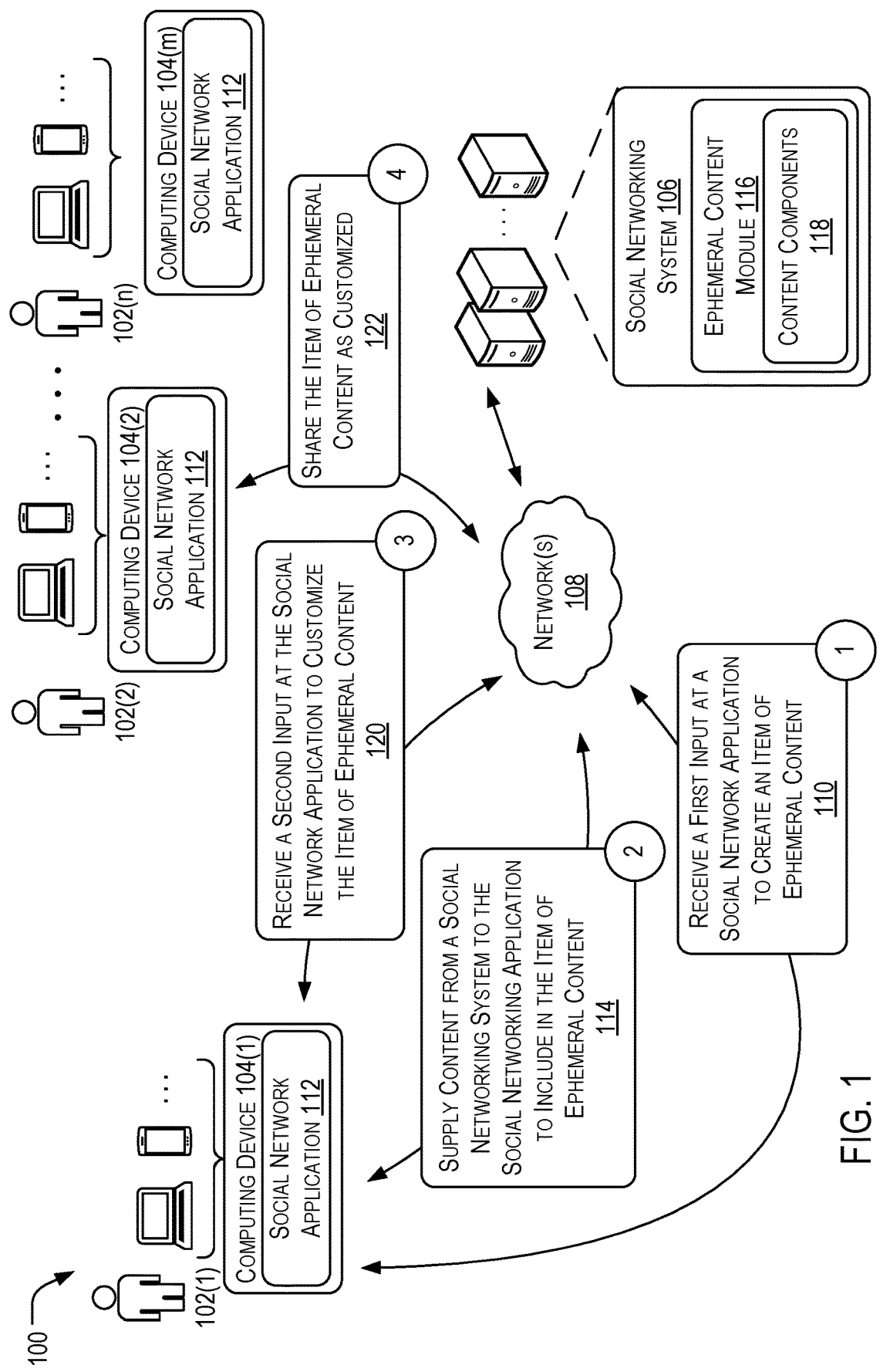
FIG. 1 is a schematic view of an example system usable to implement example ephemeral content creation and sharing techniques described herein.

As discussed above, users may find it cumbersome to locate a specific, desired content item from numerous content items that may be located in different places that they desire to share on a social media platform. Additionally, functionality may be limited within conventional social media platforms for how to customize content items that a user desires to share. For instance, many social network applications and/or services (referred to herein as "social network applications") allow users to capture images or video, and/or select previously captured images or video from device storage, to share with other users. Some social network applications allow users to share content in the form of feed media which may persist or otherwise be stored in association with the user's account (unless deleted or otherwise removed) and/or to share content in the form of reel media which may be ephemeral (e.g., automatically deleted or removed unless instructed to persist). In some cases, users may customize images or video included in feed media and/or reel media within a social network application by overlaying text, adding a caption, adding stickers, applying filters, or adding music, to name a few examples.

Many conventional social media platforms that enable ephemeral media content generation and sharing require that a user incorporate an image or a video into an ephemeral content item. In some cases, a user may wish to share an ephemeral content item without supplying an image or a video. For instance, a user may want to share an inspirational quote with other users, or a relatable GIF corresponding to how the user is feeling. Requiring that the user incorporate an image or a video (e.g., from storage of a computing device that the user is using to access the social media platform) as in conventional systems adds an extra step in the content creation process that may be frustrating for users, and may increase an amount of data sent over a network to access and share the image or the video as part of the ephemeral content item.

Additionally, in many cases, users may want to devote a particular post of reel media or feed media to another user. For instance, a first user may want to congratulate a second user for graduating from college, and share this congratulation with followers of the first user on the social network. The first user may want to include content in the post with images or video from a graduation ceremony, documentation of events with the first user and second user together during the second user's time in college, documentation of events with the first user and second user together growing up, and so forth. However, prior techniques required the first user to manually search through content on the social networking application (or local storage of the user's device, or elsewhere) to locate relevant content shared between the first user and the second user, which was time consuming and cumbersome for users. Additionally, conventional techniques did not provide templates specific to common events, such as a graduation, wedding, birthday, anniversary, and the like within a social networking application to present content shared between users.

This application describes a number of techniques and features for generating ephemeral content with, and without, an image or a video supplied by a user. Additionally, this application describes techniques for determining content shared between users (e.g., previously distributed content) based on a selection of a second user account, and generating customized content which may be specific to an event that includes the shared content.

For example, a user may access a social networking system via a social network application on a client computing device. In some cases, the social network application may include ephemeral content creation functionality. As used herein, "ephemeral content" refers to content comprising objects (e.g., posts, photos, text, videos, GIFs, icons, stickers, and the like) or information that is shared with at least one other user for a finite period of time (e.g., one hour, one day, one week, etc.). In some cases, the ephemeral content creation functionality may include a "normal" mode control, in which a user supplies an image or a video to be included in the item of ephemeral content. For example, the user may supply an image or a video from a camera accessed by the social media application on the computing device, from storage of the computing device, from cloud storage, and so forth. In some examples, the user may add features to the image or video to be included in the item of ephemeral content, such as a countdown icon that dynamically updates an amount of time to an event chosen by the user, a quiz icon that enables other users to answer a quiz created by the user, or the like.

In some examples, the ephemeral content creation functionality may also include a "create" mode control, in which the user is not required (although may still be able to, if desired) to supply an image or a video to be included in the item of ephemeral content. The create mode may enable the user to select from content supplied by a social networking system to the social network application, as well as enable the user to customize the content supplied by the social networking system. The create mode may include various features that enable the user to create customized content, such as a text feature, a GIF feature, a template feature, an on-this-day feature, a poll feature, a question feature, a countdown feature, a quiz feature, and a Shoutout feature, to name a few examples. These and other features and examples are described in more detail throughout this disclosure.

Additionally, in some examples, a user may access a social networking application via a client computing device, and select an option within the social networking application that enables the user to create a "Shoutout" to another user account of the social networking application (e.g., as part of the Shoutout feature described above and below). As used herein, a Shoutout may be an item of content that includes one or more items of previously captured and/or previously distributed content, where the content included within the Shoutout comprises content that is shared between two user accounts. Additionally, as used herein, "shared content" refers to content associated with two (or more) user accounts. Some examples of shared content include content that a first user account has tagged as being associated with a second user account, content that the second user account has tagged as being associated with the first user account, content of a post of the second user account on which the first user account has commented (and vice versa), content of a post of the second user account which the first user account has "liked" (and vice versa), messages from the first user account to the second user account (and vice versa), and the like. Additionally, in some cases, for example if authorized or opted in by the first and/or second users, the social networking system may identify shared content using computer vision techniques (e.g., facial recognition), such as in a case where the first user captured an image or video of a user associated with the second user account, but did not manually tag the second user account in the content.

In some examples, the social networking application may present a user interface that allows a user to enter a name or other identifier associated with the second user account (e.g., username or listed name of another user) that the user desires to create the Shoutout for. For instance, the user may type in a username associated with the second user account (or a portion thereof), and the social networking application may display one or more suggested user accounts corresponding to the typed input. The social networking application may receive a selection of a suggested user account (e.g., via a touch input in the user interface of a suggested user account, completing typing of the full username, etc.), and may send an indication of the selected user account to the social networking platform associated with the social network application.

In some cases, the social networking platform may determine shared content between a user account associated with the user, and the selected user account. As noted above, the shared content may be based on one of the two user accounts tagging the other in a post, one of the two user accounts liking the other's post, one of the two user accounts commenting on the other's post, and so forth. In some examples, the social networking platform may assign a score to the shared content based on factors such as a media type of the shared content (e.g., feed media, reel media, etc.), whether and to what extent the shared content has been redistributed (e.g., reshared from a third-party user account by the first user account and/or second user account, a number of reshares by third-party user accounts), whether a person is detected in the shared content (e.g., the first user, the second user, or other persons), whether the shared content was shared within a threshold amount of time (e.g., if the shared content was shared within the last hour, last day, last week, last year, etc.), engagement with the shared content by third-party user accounts (e.g., comments, likes, number of impressions or views, duration of time that the content was viewed, etc.), timing of engagement with the shared content by the third-party user accounts (e.g., if the engagement with the shared content took place within the last hour, last day, last week, last year, etc.), and so forth. Based on the score, the social networking platform may rank the shared content with other shared content between the two user accounts, such as by assigning a higher ranking to shared content having a higher score.

In some examples, the social networking system may output the shared content, the score assigned to the shared content, and/or the ranking associated with the shared content to the computing device associated with the first user account. In cases where the social network system outputs multiple items of shared content to the computing device associated with the first user account, the social network application on the computing device may display the multiple items of shared content in an order based on the ranking. The social network application may receive one or more selections of content that the user desires to include in the Shoutout. Additionally or alternatively, the social network application may allow the user to select content from other sources (other than the social networking platform), such as local storage on the computing device or cloud storage of the user, to include in the Shoutout. In some examples, the user may select multiple items of the shared content in a particular order, which may cause the social network application to populate the Shoutout with the multiple items of the shared content in the particular order. For instance, the social network application may populate the Shoutout with the selected multiple items of content to play or be presented sequentially in the selected order when viewed in the social network application.

In examples, the social network application may populate the Shoutout with the selected shared content, and allow the user to preview the Shoutout that includes the selected shared content. If the user is satisfied with the Shoutout, the social network application may receive an input from the user to share the Shoutout with one or more other users via the social networking system. For example, the social network application may output the completed Shoutout to the social networking system, which may share the Shoutout with followers of the first user account and/or a subset of user accounts selected by the user. When viewed by other user accounts, the Shoutout my display the shared content between the two user accounts, a salutation (e.g., "Congratulations!", "Happy Birthday!", etc.), the username of the second user account, an animation (e.g., confetti, a burning birthday candle, etc.), an overlay applied by the user (e.g., a sticker, GIF, etc.), and so forth, as created by the user. In examples, the Shoutout may be a single content item that is shared as part of reel media and/or feed media, but includes one or multiple items of shared content between the two (or more) users within the Shoutout that may be displayed in a sequential format. Other formats for multiple shared content items within a Shoutout are also considered, including allowing viewing users to swipe through multiple content items within the Shoutout, displaying the multiple content items in a tile format within the Shoutout, and so forth.

In this way, the social networking system presents content shared between user accounts in response to a user selecting a desired user account, rather than requiring the user to manually search for content within the social networking system and elsewhere as was required in previous techniques. Additionally, the social networking system described herein gives the user the ability to customize the post to a particular event, such as a birthday, anniversary, graduation, and the like, without the user having to use multiple applications to customize the content to be included in the post.

Various embodiments of the present disclosure include systems, methods, and non-transitory computer-readable media of a social networking system.

In some examples, a process may include displaying, by a device associated with a first user account, a first user interface. The process may include receiving an indication of a second user account with which to share content, and generating, in response to the indication, a second user interface, wherein generating the second user interface comprises: receiving shared content between the first user account and the second user account, and populating at least a portion of the second user interface with an item of the shared content.

In some examples, the first user interface comprises a text entry field. The process may further include receiving an input at the text entry field, and displaying in response to the input at the text entry field, a suggested user account. The process may further include receiving a selection of the suggested user account, and selecting, as the second user account, the suggested user account in response to receiving the selection.

In some examples, receiving the input at the text entry field may comprise receiving a username of the suggested user account, or a name of a user associated with the suggested user account.

In some examples, at least one of the first user interface or the second user interface comprises a salutation from the first user account to the second user account.

In some examples, the shared content comprises one or more of feed media or reel media.

In some examples, the item of the shared content is one of multiple items of the shared content. The process may further include receiving a ranking the multiple items of the shared content, the ranking based at least in part on a media type of the multiple items of the shared content. The process may further include determining that the item of the shared content is a highest ranking of the multiple items of the shared content, and selecting the item of the shared content to populate the second user interface based at least in part on the item of the shared content being the highest ranking of the multiple items of the shared content.

In some examples, the second user interface comprises an animation displayed with the item of the shared content.

In some examples, the item of the shared content is a first item of the shared content. The process may further include displaying the first item of the shared content and a second item of the shared content in a third user interface. The process may further include receiving, as one or more selected items of content, a selection of one or more of the first item of the shared content or the second item of the shared content in the third user interface. Populating the at least the portion of the second user interface may further comprise populating the second user interface with the one or more selected items of content.

In some examples, receiving the selection may comprise receiving a selection of both the first item of the shared content and the second item of the shared content, and the second user interface may further comprise the first item of the shared content and the second item of the shared content sequentially.

In some examples, the item of the shared content comprises a designator of both the first user account and the second user account.

In some examples, a system may comprise one or more processors and one or more computer-readable media storing instructions that, when executed by the one or more processors, perform operations. The operations may comprise receiving, from a computing device associated with a first user account, an indication of a second user account to be designated in an item of content. The operations may further comprise selecting an item of previously distributed content, the item of previously distributed content shared by the first user account and the second user account. The operations may further comprise generating the item of content, the item of content comprising the item of previously distributed content shared by the first user account and the second user account, and sending, to the computing device associated with the first user account, the item of content.

In some examples, the item of previously distributed content is one of multiple items of previously distributed content, and selecting the item of previously distributed content may comprise ranking the multiple items of previously distributed content based at least in part on media types of the multiple items of previously distributed content.

In some examples, the media types comprise a reel media type and a feed media type.

In some examples, the media type of the previously distributed item of content is the reel media type. The operations may further comprise scoring the previously distributed item of content based at least in part on whether the previously distributed item of content has been redistributed, whether the previously distributed item of content is detected to depict a person, or whether the previously distributed item of content was previously distributed within a threshold amount of time. Ranking the multiple items of previously distributed content may be based at least in part on the score.

In some examples, the media type of the previously distributed item of content is the feed media type. The operations may further comprise scoring the previously distributed item of content based at least in part on engagement with the previously distributed item of content by one or more other user accounts, and whether the previously distributed item of content was previously distributed within a threshold amount of time. Ranking the multiple items of previously distributed content may be based at least in part on the score.

In some examples, the item of previously distributed content is a first item of previously distributed content. The operations may further comprise filtering out a second item of previously distributed content based at least in part on the second item of previously distributed content comprising music or being a reshared item of content.

In some examples, one or more computer-readable media store instructions that, when executed by one or more processors, perform operations. The operations may comprise displaying, by a device associated with a first user account, a first user interface. The operations may further comprise receiving, at the device, an indication of a second user account with which to share content. The operations may further comprise generating, in response to the indication, a second user interface, where generating the second user interface comprises receiving shared content between the first user account and the second user account, and populating at least a portion of the second user interface with an item of the shared content.

In some examples, the item of the shared content is one of multiple items of the shared content. The operations may further comprise receiving a ranking the multiple items of the shared content, where the ranking is based at least in part on a media type of the multiple items of the shared content. The operations may further comprise determining that the item of the shared content is a highest ranking of the multiple items of the shared content, and selecting the item of the shared content to populate the second user interface based at least in part on the item of the shared content being the highest ranking of the multiple items of the shared content.

In some examples, the item of the shared content is a first item of the shared content. The operations may further comprise displaying the first item of the shared content and a second item of the shared content in a third user interface. The operations may further comprise receiving, as one or more selected items of content, a selection of one or more of the first item of the shared content or the second item of the shared content in the third user interface. Populating the at least the portion of the second user interface may further comprise populating the second user interface with the one or more selected items of content.

In some examples, receiving the selection may comprise receiving a selection of both the first item of the shared content and the second item of the shared content. The second user interface may further comprise the first item of the shared content and the second item of the shared content sequentially.

In some examples, a process may include receiving, by a social media application on a device associated with a first user account, a first user input to create an item of ephemeral content. The item of ephemeral content may be independent of an image or a video supplied from storage of the device or from a camera of the device, and comprise content supplied by a social networking system to the social media application. The process may further include receiving a second user input to generate a customization of the item of ephemeral content. The process may further include receiving an indication to share the item of ephemeral content with a second user account, the item of ephemeral content including the content supplied by the social networking system and the customization. The process may further include outputting the item of ephemeral content to the social networking system to be shared with the second user account.

In some examples, the content supplied by the social networking system comprises a predetermined background, and wherein the second user input comprises a text input.

In some examples, the content supplied by the social networking system comprises a graphic interchange format (GIF) item, and wherein the second user input comprises a selection of the GIF item from multiple GIF items supplied by the social networking system.

In some examples, the GIF item is displayed in one or more instances as a full bleed backdrop of the item of ephemeral content.

In some examples, the content supplied by the social networking system comprises a template, the template providing a suggestion as to what to share. The second user input may comprise a text input associated with the template.

In some examples, the content supplied by the social networking system comprises an event associated with the first user account on a previous date from among multiple events associated with the user account on previous dates. The second user input may comprise a selection of the event associated with the user account on the previous date.

In some examples the event is a first event, and the process may further include determining that the first user account has multiple events associated with the first user account on one or more of the multiple previous dates. The process may further include displaying a selectable control in the user interface that, when selected, is configured to cycle through the multiple events. The process may further include receiving a selection of the selectable control, and displaying a second event of the multiple events associated with the first user account on the one or more of the multiple previous dates.

In some examples, the multiple previous dates correspond to a same day at one or more of: a multiple of one year ago, a multiple of one month ago, or a multiple of one week ago.

In some examples, the content supplied by the social networking system comprises a poll and two or more selectable answers to the poll.

In some examples, the poll is a first predetermined poll of multiple predetermined polls. The process may further include displaying a selectable control in the user interface that, when selected, is configured to cycle through the multiple predetermined polls. The process may further include receiving a selection of the selectable control, and displaying a second predetermined poll of the multiple predetermined polls.

In some examples, the content supplied by the social networking system comprises a question and a field, that when the item of ephemeral content is output to the social networking system to be shared with the second user account, enables the second user account to provide a text input response to the question.

In some examples, the question is a first predetermined question of multiple predetermined questions. The process may further include displaying a selectable control in the user interface that, when selected, is configured to cycle through the multiple predetermined questions. The process may further include receiving a selection of the selectable control, and displaying a second predetermined question of the multiple predetermined questions.

In some examples, one or more computer-readable media store instructions that, when executed by one or more processors, cause the one or more processors to perform operations. The operations may comprise receiving a user input to enter an ephemeral content creation functionality of a social network application, the ephemeral content creation functionality comprising multiple mode controls displayed on a display. The multiple mode controls may be displayed such that the multiple mode controls are arranged generally in a first row on the display, and a mode control of the multiple mode controls generally in a first center of the first row on the display is a current mode control of the ephemeral content creation functionality. The operations may further comprise receiving a selection of the mode control of the multiple mode controls. The operations may further comprise displaying a menu associated with the mode control on the display, the menu comprising features each usable to generate an item of ephemeral content. The menu may be displayed on the display such that the features are arranged generally in a second row on the display, the second row is above the first row, and a feature of the features generally in a second center of the second row on the display is a current feature usable to generate the item of ephemeral content.

In some examples, the mode control is a first mode control and the multiple mode controls are further displayed on the display such that a horizontal gesture causes a second mode control of the multiple mode controls to transition to the center of the first row and to be the current mode control of the ephemeral content creation functionality.

In some examples, the feature is a first feature and the menu is further displayed on the display such that a horizontal gesture causes a second feature of the multiple features to transition to the center of the second row and to be the current feature usable to generate the item of ephemeral content.

In some examples, a computing device comprises a display, one or more processors, and one or more computer-readable media storing instructions that, when executed by the one or more processors, cause the computing device to perform operations. The operations may comprise receiving a user input to enter an ephemeral content creation functionality of a social network application, the ephemeral content creation functionality comprising multiple mode controls displayed on the display. The multiple mode controls may be displayed on the display such that the multiple mode controls are arranged generally in a first row on the display, and a mode control of the multiple mode controls generally in a first center of the first row on the display is a current mode control of the ephemeral content creation functionality. The operations may further comprise receiving a selection of the mode control of the multiple mode controls. The operations may further comprise displaying a menu associated with the mode control on the display, the menu comprising features each usable to generate an item of ephemeral content. The menu may be displayed on the display such that the features are arranged generally in a second row on the display, the second row is above the first row, and a feature of the features generally in a second center of the second row on the display is a current feature usable to generate the item of ephemeral content.

In some examples, the mode control is a first mode control and the multiple mode controls are further displayed on the display such that a horizontal gesture causes a second mode control of the multiple mode controls to transition to the center of the first row and to be the current mode control of the ephemeral content creation functionality.

In some examples, the feature is a first feature and the menu is further displayed on the display such that a horizontal gesture causes a second feature of the multiple features to transition to the center of the second row and to be the current feature usable to generate the item of ephemeral content.

In some examples, the multiple mode controls comprise a camera mode control, a live video mode control, a content creation mode control, a boomerang mode control, a zoom mode control, or a hands-free mode control.

In some examples, the first row is a first horizontal row, and wherein the second row is a second horizontal row.

In some examples, a process may include receiving, by a device associated with a first user account, a selection of a countdown icon in a user interface. The process may further include receiving, at the device, a first input for a name to associate with the countdown icon, and receiving, at the device, a second input for a date to associate with the countdown icon. The process may further include associating the countdown icon with a content item. The process may further include receiving, at the device, an indication to share the content item including the countdown icon with a second user account, and outputting the content item including the countdown icon to a social networking system to share with the second user account.

In some examples, the process may further include receiving, at the device, a third input of a time to associate with the countdown icon.

In some examples, the countdown icon displays a number of days, a number of hours, and a number of minutes from a current time until the date associated with the countdown icon.

In some examples, the countdown icon displays a number of hours, a number of minutes, and a number of seconds from a current time until the date associated with the countdown icon.

In some examples, the countdown icon is dynamically updated prior to and after outputting to the social networking system.

In some examples, the countdown icon includes a selectable option that, when selected by a user associated with the second user account, causes the second user account to receive a reminder when the date associated with the countdown icon is reached.

In some examples, the process further includes receiving, at the device associated with the first user account, a notification of selection of the selectable option by the user associated with the second user account.

In some examples, the countdown icon includes a selectable option that, when selected by a user associated with the second user account, enables the second user account to reshare the countdown icon with a third user account via the social networking system.

In some examples, the process further includes receiving, at the device associated with the first user account, a notification of selection of the selectable option by the user associated with the second user account.

In some examples, a system comprises one or more processors and one or more computer-readable media storing instructions that, when executed by the one or more processors, cause the one or more processors to perform operations. The operations may comprise receiving, by a device associated with a first user account, a selection of a countdown feature in a user interface. The operations may further comprise displaying, by the device, a countdown in the user interface, the countdown populated with a predetermined name associated with an event and a predetermined amount of time to the event. The operations may further comprise receiving, at the device, an indication to share the countdown with a second user account, and outputting the countdown to a social networking system to share with the second user account.

In some examples, the operations may further comprise displaying, by the device, a selectable control in the user interface, that when selected, enables a user to customize the countdown. The operations may further comprise receiving a selection of the selectable control, and receiving a first input of a customized name to associate with the countdown. The operations may further comprise receiving a second input of a date to associate with the countdown. Outputting the countdown may further comprise outputting the countdown including the customized name and an amount of time based at least in part the date associated with the countdown.

In some examples, the operations may further comprise receiving, at the device, a third input for a time to associate with the countdown, where the amount of time is further based on the time associated with the countdown.

In some examples, the predetermined name is a first predetermined name, the event is a first event, and the predetermined amount of time is a first predetermined amount of time. The operations may further comprise displaying a selectable control in the user interface, receiving a selection of the selectable control, and displaying a second predetermined name associated with a second event and a second predetermined amount of time to the second event responsive to receiving the selection of the selectable control.

In some examples, outputting the countdown may comprise outputting the countdown unassociated with an image or a video.

In some examples, the device is a first device, and the operations further comprise receiving an input to associate the countdown with an image or a video, wherein the image or the video is displayed in association with the countdown on the first device. Outputting the countdown may further comprise outputting an instruction to display the image or the video in association with the countdown on a second device associated with the second user account.

In some examples, the operations may further comprise receiving an input to change a color of a background associated with the countdown as displayed on the first device and the second device.

In some examples, one or more computer-readable media store instructions that, when executed by one or more processors, cause the one or more processors to perform operations. The operations may comprise receiving, by a device associated with a first user account, a selection of a countdown feature in a user interface. The operations may further comprise displaying, by the device, a countdown in the user interface, the countdown populated with a predetermined name associated with an event and a predetermined amount of time to the event. The operations may further comprise receiving, at the device, an indication to share the countdown with a second user account, and outputting the countdown to a social networking system to share with the second user account.

In some examples, the operations may further comprise displaying, by the device, a selectable control in the user interface, that when selected, enables a user to customize the countdown. The operations may further comprise receiving a selection of the selectable control, receiving a first input of a customized name to associate with the countdown, and receiving a second input of a date to associate with the countdown. Outputting the countdown may comprise outputting the countdown including the customized name and an amount of time based at least in part the date associated with the countdown.

In some examples, the predetermined name is a first predetermined name, the event is a first event, and the predetermined amount of time is a first predetermined amount of time. The operations may further comprise displaying a selectable control in the user interface and receiving a selection of the selectable control. The operations may further comprise displaying a second predetermined name associated with a second event and a second predetermined amount of time to the second event responsive to receiving the selection of the selectable control.

In some examples, the countdown is dynamically updated prior to and after outputting to the social networking system.

In some examples, a process may include receiving, by a device associated with a first user account, a selection of a quiz icon in a user interface. The process may further include receiving, at the device, a first input to associate a topic with the quiz icon, and receiving, at the device, a second input for a first answer associated with the quiz icon. The process may further include receiving, at the device, a third input for a second answer associated with the quiz icon, and associating the quiz icon with a content item. The process may further include receiving, at the device, an indication to share the content item including the quiz icon with a second user account. The process may further include outputting the content item including the quiz icon to a social networking system to share with second user account.

In some examples, the selection is a first selection, the device is a first device, and the indication is a first indication. The process may further include receiving, by the first device, a second selection of the first answer in the user interface, and selecting, as a correct answer, the first answer based at least in part on receiving the second selection. Outputting the content item may further comprise outputting an instruction to cause a second indication of the correct answer to be displayed by a second device associated with the second user account based at least in part on a user selecting the first answer of the quiz icon as displayed by the second computing device.

In some examples, outputting the content item further comprises outputting an instruction to cause a second device associated with the second user account to display an answer having a highest number of responses, the answer being one of the first answer or the second answer.

In some examples, the process may further include receiving, at the first device, a third input to change a color of the quiz icon as displayed on the first device and the second device.

In some examples, the process may further include receiving a fourth input, the fourth input causing the first device to display one or more user accounts that have viewed the quiz icon.

In some examples, the process may further include receiving a fourth input, the fourth input causing the device to display responses to the quiz icon by displaying a first number of the one or more user accounts that responded to the first answer proximate the first answer, and displaying a second number of the one or more user accounts that responded to the second answer proximate the second answer.

In some examples, the indication is a first indication. The process may further include receiving a fourth input, the fourth input causing the device to display one or more user accounts that have responded to the quiz icon and a second indication of the first answer or a third indication of the second answer proximate the one or more user accounts that have responded to the quiz icon.

In some examples, the content item is an image or a video, and associating the quiz icon with the content item comprises overlaying the quiz icon on the image or the video.

In some examples, the process may further include displaying an icon in the user interface to add a third answer to the quiz icon, and receiving a selection of the icon. The process may further include receiving a fourth input for the third answer associated with the quiz icon.

In some examples, a system comprises one or more processors, and one or more computer-readable media storing instructions that, when executed by the one or more processors, cause the one or more processors to perform operations. The operations may comprise receiving, by a first device associated with a first user account, a selection of a quiz feature in a user interface. The operations may further comprise displaying, by the first device, a quiz in the user interface, the quiz populated with a predetermined topic. The operations may further comprise receiving, at the first device, a first input of a first answer associated with the predetermined topic, and receiving, at the first device, a second input of a second answer associated with the predetermined topic. The operations may further comprise receiving, at the first device, an indication to share the quiz with a second user account, and outputting the quiz to a social networking system to share with second user account.

In some examples, the operations may further comprise receiving a third input for a customized topic to associate with the quiz and replace the predetermined topic. The operations may further comprise receiving a fourth input of a third answer to associate with the customized topic, and receiving a fifth input a fourth answer to associate with the customized topic. Outputting the quiz may comprise outputting the quiz including the customized topic, the third answer, and the fourth answer.

In some examples, the predetermined topic is a first predetermined topic. The operations may further comprise displaying a selectable control in the user interface, and receiving a selection of the selectable control. The operations may further comprise displaying a second predetermined topic, the second predetermined topic being a different topic than the first predetermined topic.

In some examples, outputting the quiz to the second device comprises outputting the quiz unassociated with an image or a video.

In some examples, the operations may further comprise receiving an input to associate the quiz with an image or a video. The image or the video may be displayed in association with the quiz on the first device, and outputting the quiz may further comprise outputting an instruction to display the image or the video in association with the quiz when shared with the second user account.

In some examples, the operations may further comprise receiving an input to change a color of a background associated with the quiz as displayed on the first device and the second device.

In some examples, one or more computer-readable media store instructions that, when executed by one or more processors, cause the one or more processors to perform operations. The operations may comprise receiving, by a first device associated with a first user account, a selection of a quiz feature in a user interface. The operations may further comprise displaying, by the first device, a quiz in the user interface, the quiz populated with a predetermined topic. The operations may further comprise receiving, at the first device, a first input of a first answer associated with the predetermined topic, and receiving, at the first device, a second input of a second answer associated with the predetermined topic. The operations may further comprise receiving, at the first device, an indication to share the quiz with a second user account, and outputting the quiz to a social networking system to share with second user account.

In some examples, the operations may further comprise receiving a third input for a customized topic to associate with the quiz and replace the predetermined topic. The operations may further comprise receiving a fourth input of a third answer to associate with the customized topic. The operations may further comprise receiving a fifth input a fourth answer to associate with the customized topic. Outputting the quiz may comprise outputting the quiz including the customized topic, the third answer, and the fourth answer.

In some examples, the predetermined topic is a first predetermined topic. The operations may further comprise displaying a selectable control in the user interface, and receiving a selection of the selectable control. The operations may further comprise displaying a second predetermined topic, the second predetermined topic being a different topic than the first predetermined topic.

In some examples, outputting the quiz to the second device comprises outputting the quiz unassociated with an image or a video.

In some examples, the operations may further comprise receiving an input to associate the quiz with an image or a video. The image or the video may be displayed in association with the quiz on the first device. Outputting the quiz may further comprise outputting an instruction to display the image or the video in association with the quiz when shared with the second user account.

In some examples, the operations may further comprise receiving an input to change a color of a background associated with the quiz as displayed on the first device and the second device.

In addition to the societal improvements discussed above, the techniques described herein also improve performance of one or more computing devices by reducing an amount of content sent over a network. For instance, in the context of the create mode control mentioned above, removing the need to include an image or a video in an ephemeral content item reduces the amount of data sent between the social network application on a client computing device and a social networking system. Additionally, by sending content to a requesting user account that is shared between the requesting user account and a selected user account to be included in a Shoutout, the social networking system can reduce the amount of content transferred between the social networking system and a social network application in the content selection process. Additionally, by incorporating multiple content items into a single Shoutout post, the social networking system may reduce the amount of content sent over a network to users that the Shoutout is shared with, as opposed to conventional systems that required multiple posts for each content item that the user wanted to share. In these ways, the quantity of data sent over the network may be reduced.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to generate content to be shared between users via the system 100. In some examples, the system 100 may include users 102(1), 102(2), . . . 102(n) (collectively "users 102") to interact using computing devices 104(1), 104(2), . . . 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 a user account associated with the user. The user account may include demographic information, communication-channel information, and information on personal interests of the user. The social networking system 106 may also, with input from a user, create and store a record of relationships of the user with other users of the social networking system 106, as well as provide services (e.g., posts, comments, photo-sharing, messaging, tagging, mentioning of other users or entities, games, etc.) to facilitate social interaction between or among the users 102.

The social networking system 106 may be configured to provide content creation techniques to the users 102. For instance, the social networking system 106 may be configured to generate content (e.g., ephemeral content) to be shared between users based on selections made by a user 102(1).

For example, at operation 110, (indicated by "1"), a first input is received at a social network application 112 installed on the computing device 104(1) to create an item of ephemeral content. In some examples, the social network application may comprise ephemeral content creation functionality, as described herein. As discussed above, "ephemeral content" refers to content comprising objects (e.g., posts, photos, text, videos, GIFs, icons, stickers, and the like) or information that is shared with at least one other user for a finite period of time (e.g., one hour, one day, one week, etc.).

In examples, the first input may correspond to an input to access or open the social network application 112, an input to access a content creation mode of the social network application 112, and/or an input to create a new item of ephemeral content within the social network application 112, to name a few examples. In some cases, the first input may include selection of a default or "normal" content creation mode control of the ephemeral content creation functionality of the social network application 112, where the normal content creation mode control enables the user 102(1) to create an item of ephemeral content that includes an image or a video. For instance, the social networking application 112 may access the image or the video to be included in the item of ephemeral content created using the normal mode control from a camera of the computing device 104(1), storage of the computing device 104(1), cloud storage (not explicitly pictured), and so forth.

Alternatively or additionally, the first input may include selection of a "create" content creation mode of the ephemeral content creation functionality of the social network application 112, where the create content creation mode control enables the user 102(1) to create an item of ephemeral content independent of an image or a video supplied by the user 102(1). For instance, the social networking system 106 may supply content to be included in the item of ephemeral content, as described herein.

For example, at operation 114 (indicated by "2"), the social networking system 106 supplies content to the social networking application 112 to include in the item of ephemeral content. In some examples, an ephemeral content module 116 of the social networking system 106 may supply one or more content components 118 to the social network application 112, e.g., based on a feature of the social network application 112 being used by the user 102(1) to create the item of ephemeral content. For instance, the ephemeral content module 116 may receive the indication of the first input, such as a mode control and/or a feature being used by the user 102(1).

Based on the indication of a current mode control and/or feature being used by the user 102(1), the ephemeral content module 116 may supply corresponding content from the content components 118 to the social network application 112 corresponding to the current mode control and/or feature. In but one illustrative example, the ephemeral content module 116 may receive an indication that the user 102(1) has selected a "templates" feature of the create mode control, and may supply a template from the content components 118 to the social network application 112, which may then be customized by the user 102(1) using the social network application 112. In another illustrative, example, the ephemeral content module 116 may receive an indication that the user 102(1) has selected a "quiz" icon to be included in a content item using the normal mode control, and may supply a quiz icon from the content components 118 to the social network application 112, which may then be customized by the user 102(1) using the social network application 112.

The content components 118 may include, but are not limited to: backgrounds, text (e.g., font, color, size, etc.), GIFs, templates to insert content (e.g., text, images, video, stickers, icons, and the like), events associated with a user account of the user 102(1) (e.g., when the user account followed and/or was followed by another user account), predetermined polls (e.g., including a topic and/or answers to the poll), predetermined questions, countdown icons, predetermined countdowns (e.g., to a predetermined event, such as the weekend or a holiday), quiz icons, predetermined quizzes (e.g., having a predetermined topic and/or predetermined answers to the quiz), content shared between the user account of the user 102(1) and one or more other users 102(2)-102(n) (e.g., posts and/or reel media that includes both user accounts), and so on.

At operation 120 (indicated by "3"), the social network application 112 may receive a second input to customize the item of ephemeral content. Customization may take a variety of forms. For example, in a text feature of the create mode control, the second input may include the user 102(1) inputting custom text using a keyboard, speech, selection of suggested words/phrases, or other input method, changing a background upon which the customized text will be displayed when the item of ephemeral content is shared, adding icons or stickers, adding a drawing input, and the like. In another example, in the normal mode control, the user 102(1) may input a customization to a countdown icon to be included in an ephemeral content item, such as a title for the countdown (e.g., related to an event) and a time to the event. Additional customizations are included throughout this disclosure, particularly in reference to FIGS. 5A-36.

At operation 122 (indicated by "4"), the social network application 112 shares the item of ephemeral content, as customized, with the social network applications 112 installed on the computing devices 104(2)-104(m), e.g., via the social networking system 106. For example, the user 102(1) may select an option in a user interface displayed by the social network application 112 to share the item of ephemeral content with followers of the user 102(1). The social network application 112 may send the completed item of ephemeral content, including the content supplied by the social networking system 106 and customizations by the user 102(1) according to the operation 120, to the social networking system 106. The social networking system 106 may then distribute the item of ephemeral content to the users 102(2)-102(n) identified by the user 102(1).

When the computing devices 104(2)-104(m) display the item of ephemeral content to the users 102(2)-102(n), the social network application 112 may allow the users 102(2)-102(n) to interact with the item of ephemeral content. For example, the social network application 112 may allow the users 102(2)-102(n) to supply an answer to a question, a poll, and/or a quiz included in the item of ephemeral content. In response, the social network application 112 may display results of the poll (e.g., according to a total number of responses to the poll and answers input by other users), a correct answer of a quiz (e.g., by highlighting a correct answer supplied by the user 102(1) when the quiz was generated), and the like. In some examples, the social network application 112 of the computing devices 104(2)-104(m) may output response inputs by the users 102(2)-102(n), and compile results associated with the item of ephemeral content. In some cases, the user 102(1) may view the results associated with the item of ephemeral content via the social network application 112 of the computing device 104(1).

Alternatively or additionally, the social network application 112 of the computing devices 104(2)-104(m) may enable the users 102(2)-102(n) to "follow" a countdown generated by the user 102(1) in normal mode and/or create mode. When followed, the users 102(2)-102(n) may receive updates and/or notifications (e.g., push notifications) associated with the countdown, such as when the countdown expires. In some cases, the user 102(1) may receive a notification via the social network application 112 in response to one or more of the other users 102(2)-102(n) following the countdown.

In some examples, the social networking system 106 (and similarly, the social networking system 3206 described in relation to FIG. 32 below) may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Example Create Mode Control

Figure 2B:
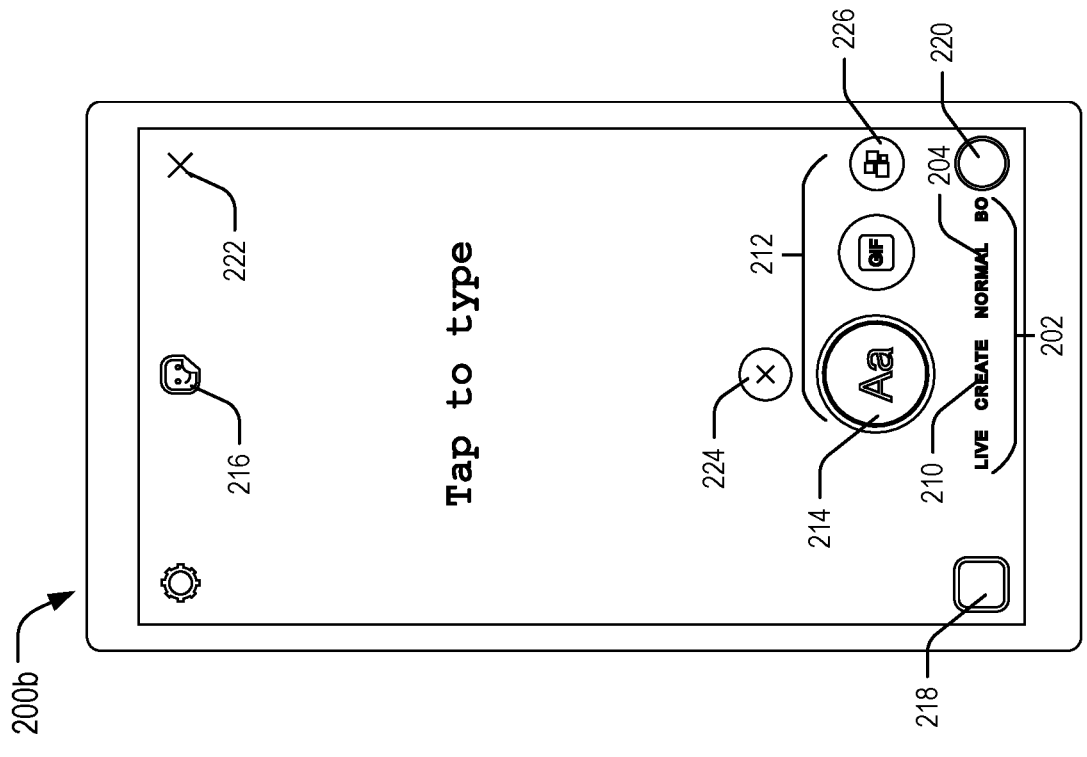
FIGS. 2A and 2B illustrate example interfaces of mode controls for an ephemeral content creation functionality.
Figure 2A:
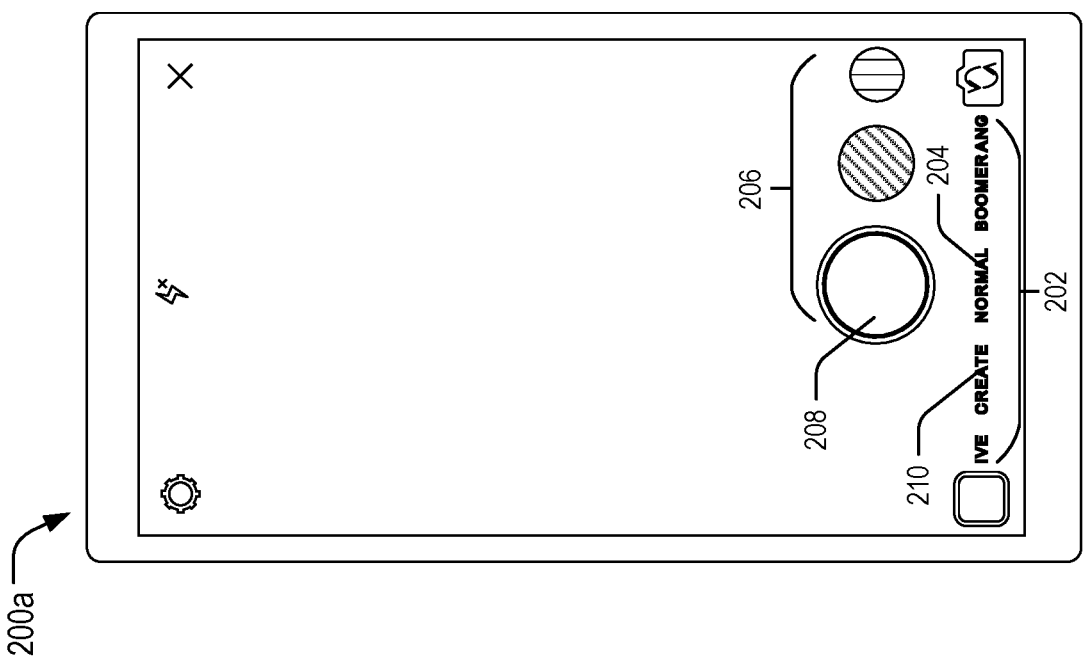

FIGS. 2A and 2B are schematic views showing example user interfaces that are usable to implement the techniques described herein for generating content to be shared between users. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the system 100. For example, the interfaces described in this section may be implemented in the context of the system 3200, among others.

FIGS. 2A and 2B illustrate example interfaces of mode controls for an ephemeral content creation functionality. An interface 200a shown in FIG. 2A corresponds to a first user interface that may be displayed upon selection of an ephemeral content creation functionality of the social network application 112 (e.g., Stories of Instagram®). For example, the interface 200a may be displayed in response to a gesture (e.g., a horizontal swipe gesture) from a "home" screen and/or a feed of the social network application 112. In other examples, the interface 200a may be displayed by selection of a button, icon, or other control, by voice command, or by other user input.

In examples, the ephemeral content creation functionality provided by the social network application 112 may include one or more mode controls 202. Each of the one or more mode controls 202 may provide a subset of capabilities of the ephemeral content creation functionality. As shown, the mode controls 202 may be arranged in the interface 200a in a first row, e.g., generally horizontally across the interface 200a. A mode control 204 of the mode controls 202 generally in a center of the first row may be a current or "selected" mode of the ephemeral content creation functionality. In other words, the mode control 204 in the center of the first row may dictate a subset of the capabilities of the ephemeral content creation functionality that a user has currently selected to access, corresponding to the particular mode control 204. In some cases, the user 102(1) may transition between the mode controls 202 using a gesture, such as a horizontal swipe gesture, and/or by tapping a desired mode to bring the desired mode to the center of the mode control row and utilize the functionality of the desired mode control, to name a few examples.

The mode controls 202 may include a camera mode control (also referred to herein as a normal mode control), a live video mode control, a content creation mode control (also referred to herein as a create mode control), a boomerang mode control, a zoom mode control, a hands-free mode control, and so forth. In examples, the live video mode control may enable the user 102(1) to stream video to followers and engage with the followers (e.g., by viewing live comments and likes of the video, and responding to comments and/or likes as the video plays). In some cases, the boomerang mode control may enable the user 102(1) to capture a burst of images using a camera of the computing device 104(1), then speeds up the images and plays them forward and backward to create a looping "boomerang" video. In some examples, the zoom mode control may enable the user 102(1) to capture a video that includes a zoom in and/or a zoom out operation, and apply one of multiple filters to the video. The hands-free mode control may enable the user 102(1) to initiate recording a video with a tap, rather than holding a button to record, as is the case when using the normal mode control.

In the example shown, the mode control 204 that is currently selected corresponds to a "normal" mode control. In some examples, the normal mode control may be a default mode control upon selection of the ephemeral content creation functionality, but other modes may be used as the default. Based on selection of the mode control 204 as the normal mode control, the social networking application 112 may display a menu 206 associated with the mode control 204 in the interface 200a. In examples, the menu 206 may include features which are each usable to generate an item of ephemeral content. For instance, a feature 208 included in the menu 206 may cause, upon selection by the user 102(1), a camera of the device 104(1) to capture an image or a video which may be used to generate the item of ephemeral content.

In some examples, the features included in the menu 206 may be arranged in the interface 200a in a second row, e.g., generally horizontally across the interface 200a and located above (e.g., closer to a top of the interface 200a). A feature of the features in the menu 206 generally in a center of the second row may be a current or "selected" feature of the mode control 204. That is, the feature 208 in the center of the second row may dictate a subset of the capabilities of the mode control 204 that a user has currently selected, corresponding to the particular feature 208. In examples, the feature in the center of the second row that is the current feature of the mode control 204 may have an indicator, such as an outline, a highlight, or may be displayed in a center of a stationary circle (or other shape) in the interface 200a. In some cases, the user 102(1) may transition between the features in the menu 206 using a gesture, such as a horizontal swipe gesture, and/or by tapping a desired feature to bring the desired feature to the center of the feature menu row and utilize the functionality of the desired feature, to name a few examples.

An interface 200b shown in FIG. 2B corresponds to a second user interface that may be displayed upon selection of a mode control 210 (e.g., Create Mode of Instagram®). For example, the interface 200b may be displayed in response to a gesture (e.g., a horizontal swipe gesture) from the mode control 204 (normal mode) to the mode control 210 (Create Mode). The mode control 204 may include a menu 212 that includes features associated with the mode control 210 arranged in a row (e.g., a horizontal configuration) above the row of mode controls 202.

Similar to the discussion above, a feature of the features in the menu 212 generally in a center of the second row may be a current feature of the mode control 210. That is, a feature 214 in the center of the second row may dictate a subset of the capabilities of the mode control 210 that a user may access, corresponding to the particular feature 214. The center of the second row may correspond to a center of a display screen, a center of a user interface, and/or a center relative to the other features in the menu 212. In examples, the feature in the center of the second row that is the current feature of the mode control 210 may have an indicator, such as an outline, a highlight, or may be displayed in a center of a stationary circle (or other shape) in the interface 200b. In some cases, the user 102(1) may transition between the features in the menu 212 using a gesture, such as a horizontal swipe gesture, and/or by tapping a desired feature to bring the desired feature to the center of the feature menu row and utilize the functionality of the desired feature, to name a few examples.

In some examples, the mode control 210 may include one or more controls that remain constant independent of a selected feature of the mode control 210. For instance, the mode control 210 may include an overlay control 216 that, when selected, enables the user 102(1) to add an overlay such as a sticker, a GIF, an icon, or the like, which may overlay at least a portion of the item of ephemeral content. The mode control 210 may include a content control 218 that, when selected, enables the user 102(1) to add an image and/or a video from storage accessible by the device 104(1)

to the item of ephemeral content. Additionally, the mode control 210 may include a background control 220 that, when selected, enables the user 102(1) to change a color, pattern, gradient, and the like of a background of the item of ephemeral content. Further, the mode control 210 may include an exit control 222 that, when selected, exits the ephemeral content creation functionality, returning the social network application 112 to a feed or other user interface.

In some cases, the mode control 210 may include a return control 224, that, when selected, returns the menu 212 to a default feature (e.g., the feature 214). For example, the user 102(1) may select a different feature, such as a feature 226, and the social network application 112 may present functionality associated with the feature 226, as well as moving the icon associated with the feature 226 to a center of the row of the menu 212. In some examples, when the feature 226 is selected, the mode controls 202 may be hidden and/or may not be selectable. Therefore, the user 102(1) may select the return control 224 to view and/or access the mode controls 202.

Figure 3:
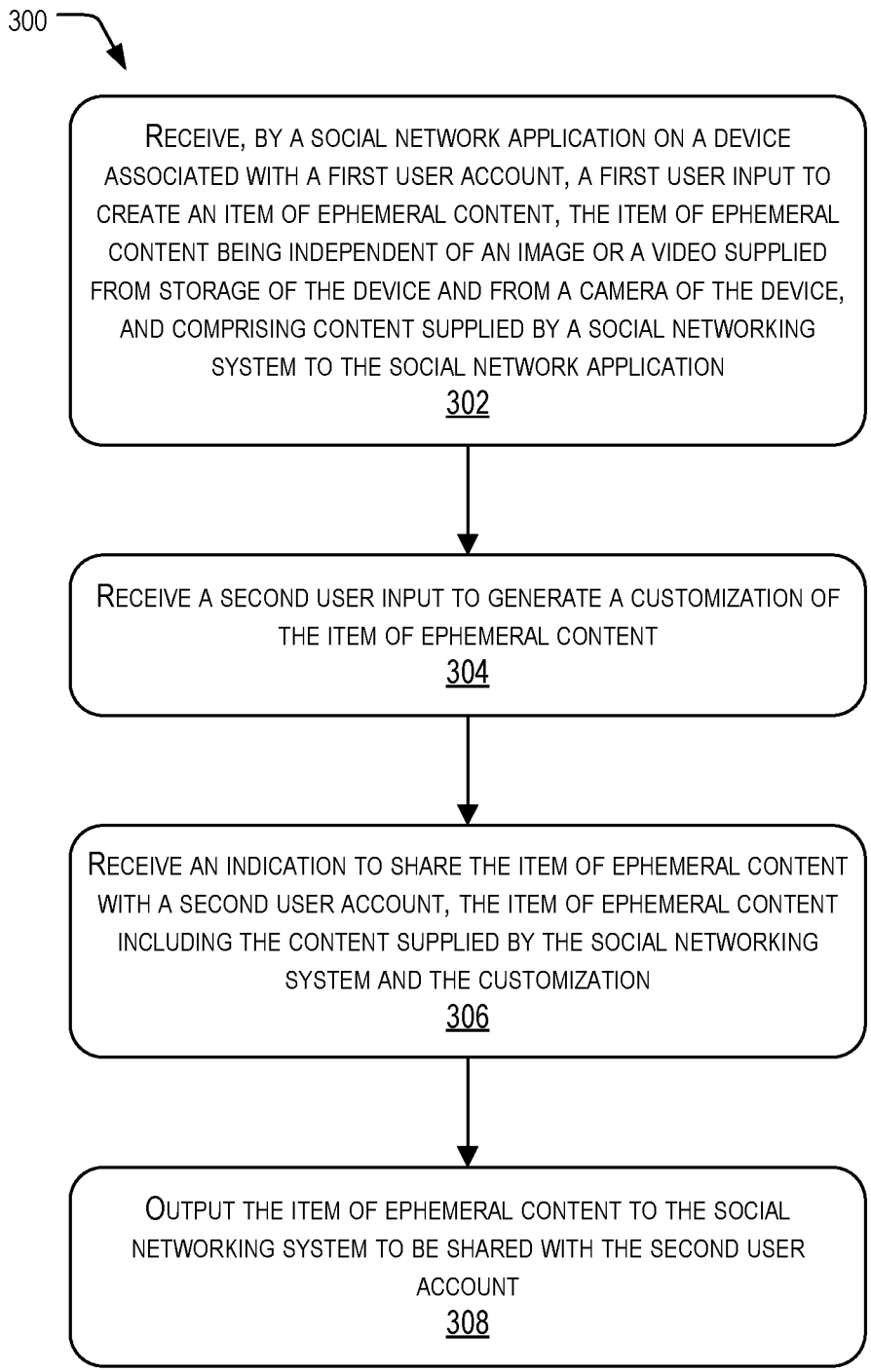
FIG. 3 illustrates an example process for receiving inputs to generate an item of ephemeral content using ephemeral content creation functionality.

FIG. 3 illustrates an example process 300 for receiving inputs to generate an item of ephemeral content using ephemeral content creation functionality. Various methods are described with reference to the example system of FIG. 1 and/or the user interfaces of FIGS. 2A and 2B for convenience and ease of understanding. However, the methods described are not limited to being performed using the systems of FIG. 1 or FIG. 32 and/or the user interfaces of FIGS. 2A and 2B, and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

An operation 302 includes receiving, by a social network application on a device associated with a first user account, a first user input to create an item of ephemeral content. The item of ephemeral content may be independent of an image or a video supplied from storage of the device and from a camera of the device. The item of ephemeral content may comprise content supplied by a social networking system to the social network application.

For example, the first user input to create the item of ephemeral content may include a selection of ephemeral content creation functionality from amongst other functionality of the social network application, where the other functionality may include displaying feed media, displaying reel media, generating original content using a camera of the computing device 104(1), and so forth. Alternatively or additionally, the first user input may include selection of a mode control of multiple mode controls 202, such as a create mode control. In some cases, the first user input may include selection of a feature from a menu 206 and/or a menu 212 of a mode control. In some examples, the item of ephemeral content comprises content supplied from the content components 118 of the social networking system 106, as described above and below.

An operation 304 includes receiving a second user input to generate a customization of the item of ephemeral content. Various customizations are described herein, but may include adding and/or altering text, changing a color of a background, moving an icon to a different location on the item of ephemeral content, selecting a particular content item from multiple content items supplied by the social networking system to include in the item of ephemeral content, adding a sticker or icon to the item of ephemeral content, and selecting another user account to include with (e.g., tag) the item of ephemeral content, to name a few examples.

An operation 306 includes receiving an indication to share the item of ephemeral content including the content supplied by the social networking system and the customization with a second user account. In some examples, the indication to share the item of ephemeral content may include an indication to share the item of ephemeral content with all, or multiple, of the followers of the user account associated with the user 102(1). Alternatively or additionally, the indication to share the item of ephemeral content may include an indication of a subset of the followers of the user account associated with the user 102(1), such as a group of designated "Close Friends" of the user 102(1), one or more individually-selected user accounts, and so forth.

An operation 308 includes outputting the item of ephemeral content to the social networking system to be shared with the second user account. In some examples, the social networking system 106 may distribute the item of ephemeral content to the users 102(2)-102(n) identified by the user 102(1) as part of the operation 306. When the computing devices 104(2)-104(m) display the item of ephemeral content to the users 102(2)-102(n), the social network application 112 may allow the users 102(2)-102(n) to interact with the item of ephemeral content, as described above and in more detail below.

Figure 4:
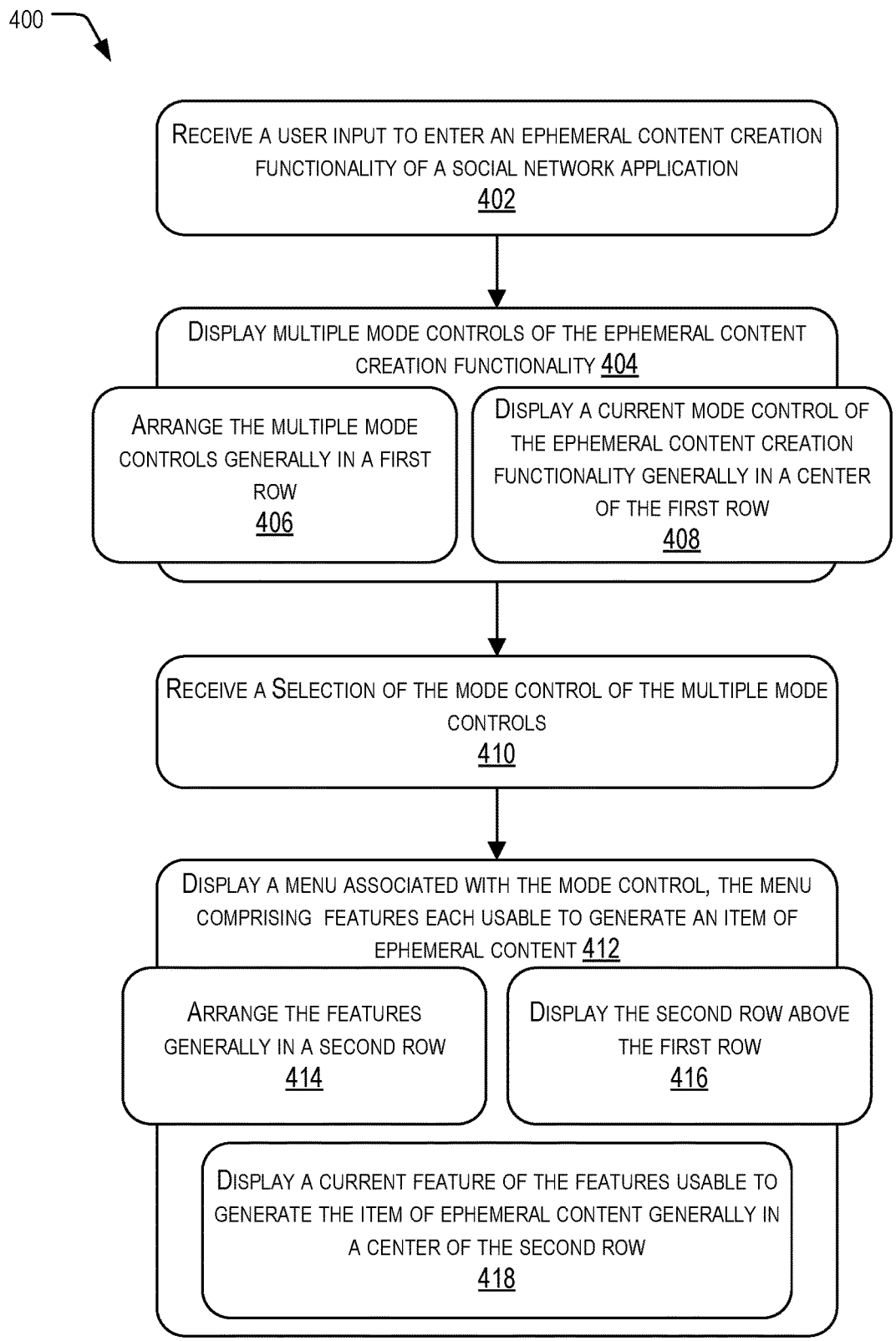
FIG. 4 illustrates an example process for displaying a user interface associated with an ephemeral content creation functionality.

FIG. 4 illustrates an example process 400 for displaying a user interface associated with an ephemeral content creation functionality.

An operation 402 includes receiving a user input to enter an ephemeral content creation functionality of a social network application. As discussed above, the user input may include a selection of ephemeral content creation functionality from amongst other functionality of the social network application 112, where the other functionality may include displaying feed media, displaying reel media, generating original content using a camera of the computing device 104(1), and so forth.

An operation 404 includes displaying multiple mode controls of the ephemeral content creation functionality. In some examples, the multiple mode controls 202 may include a camera mode control (also referred to herein as a normal mode control), a live video mode control, a content creation mode control (also referred to herein as a create mode control), a boomerang mode control, a zoom mode control, a hands-free mode control, and so forth.

The operation 404 may further include an operation 406, in which the multiple mode controls are arranged generally in a first row. In examples, the first row may be a generally horizontal configuration, although other orientations are considered as well (e.g., a vertical configuration, an arced configuration, a diagonal configuration, a combination of several configurations, etc.).

The operation 404 may also include an operation 408, in which a current mode control of the ephemeral content creation functionality is displayed generally in a center of the first row. For example, the center of the first row may be relative to a user interface displayed on the device 104(1), which remains in generally a same location, while mode controls move to relative to the center in response to user input to change mode controls. In some examples, the mode control located in the center position of the first row may provide a subset of functionality of the ephemeral content creation functionality corresponding to the particular mode control.

An operation 410 includes receiving a selection of the mode control of the multiple mode controls. In some examples, the selection of the mode control may be a default mode control selected when the user 102(1) enters the ephemeral content creation functionality. Alternatively or additionally, the selection of the mode control may be in response to the user 102(1) selecting a different mode control than the default mode control, such as by using a swipe gesture to move the mode control to the center of the first row, tapping the mode control to cause the mode control to move to the center of the first row, and so forth.

An operation 412 includes displaying a menu associated with the mode control, where the menu comprises features each usable to generate an item of ephemeral content. In but one illustrative example of a menu associated with the create mode control, the menu may include features such as a text feature, a GIF feature, a template feature, and on-this-day feature, a poll feature, a question feature, a countdown feature, a quiz feature, a Shoutout feature, and so on.

The operation 412 may further include an operation 414, in which the features are arranged generally in a second row. In examples, the second row may be a generally horizontal configuration, although other orientations are considered as well (e.g., a vertical configuration, an arced configuration, a diagonal configuration, a combination of several configurations, etc.).

The operation 412 may also include an operation 416, in which the second row is displayed above the first row. Other examples are also considered, such as the second row being to a left of the first row, the second row being to a right of the first row, the second row being below the first row, and so forth.

Additionally, the operation 412 may include an operation 418, in which a current feature of the features usable to generate the item of ephemeral content is displayed generally in a center of the second row. For example, the center of the second row may be relative to the user interface displayed on the device 104(1), which remains in generally a same location, while features of the menu 212 move relative to the center in response to user input to change features. Additionally, in some cases, the center of the second row may be generally aligned with the center of the first row, e.g., such that the current feature is displayed above the current mode control. In some examples, the feature located in the center position of the second row may provide a subset of functionality of the ephemeral content creation functionality corresponding to the particular feature of the selected mode control.

The techniques and features described in relation to FIGS. 3 and 4 make generating and sharing content easier and more efficient for users compared to previous techniques that included cumbersome and difficult-to-navigate menus. For example, displaying the first row and the second row together in the user interface of the social network application 112 may reduce a number of steps to create and share content. Furthermore, displaying the first row and the second row together in the user interface as described provides a compact layout of multiple mode controls and features, while still providing a wide range of content types that can be created using the ephemeral content creation functionality.

Example Text Feature

Figure 5C:
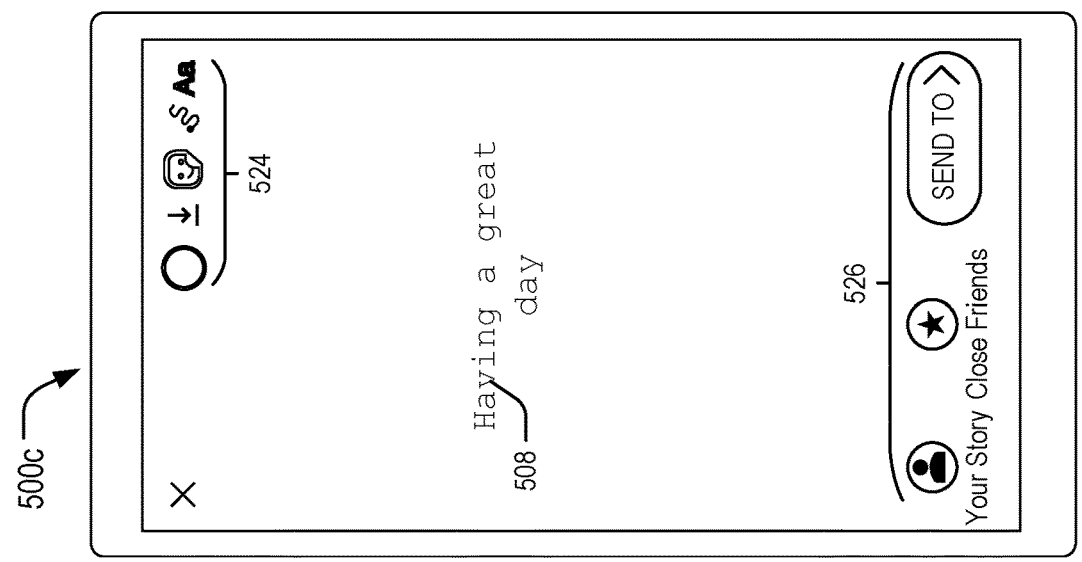
FIGS. 5A-5C illustrate example interfaces corresponding to a text feature of a create mode control of an ephemeral content creation functionality.
Figure 5B:
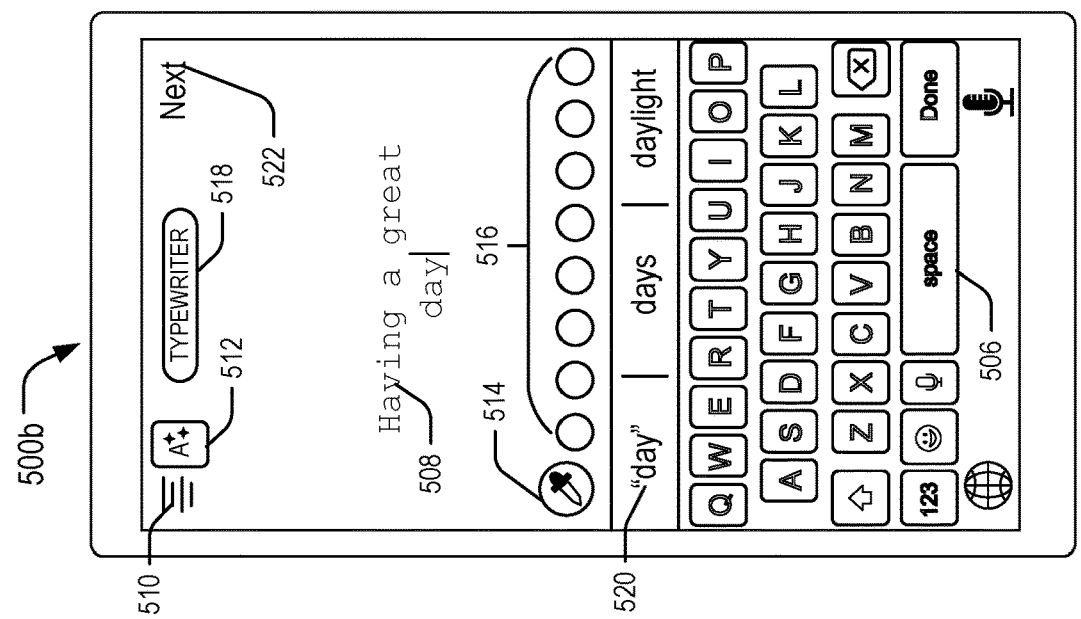
Figure 5A:
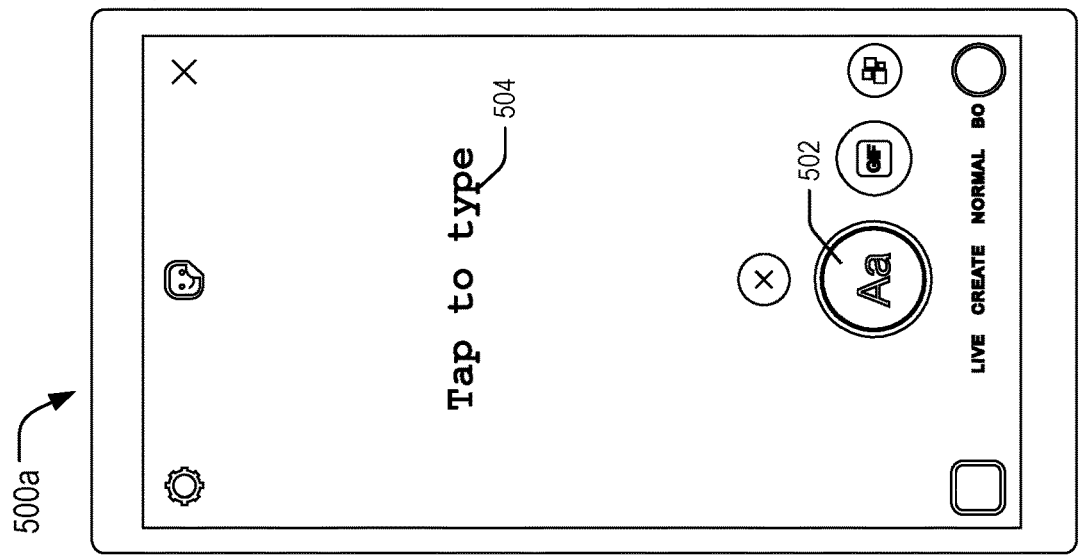

FIGS. 5A-5C are schematic views showing example user interfaces that are usable to implement the techniques described herein for generating content to be shared between users. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the system 100. For example, the interfaces described in this section may be implemented in the context of the system 3200, among others.

FIGS. 5A-5C illustrate example interfaces corresponding to a text feature of a create mode control of an ephemeral content creation functionality. An interface 500a shown in FIG. 5A corresponds to a first user interface that may be displayed upon selection of a text feature 702 in the social network application 112 (e.g., in Create Mode of Instagram®). In some examples, the interface 500a may include an icon 504 or other control (in this example, "Tap to type") that indicates to the user 102(1) an action to take to enable the user to enter text to be included in the item of ephemeral content.

An interface 500b shown in FIG. 5B corresponds to a second user interface that the social network application 112 may display in response to the user 102(1) providing an input to customize the item of ephemeral content. For instance, the social network application 112 may display the interface 500b in response to the user 102(1) tapping the icon 504, and/or an area surrounding the icon 504. The interface 500b includes a keyboard 506, which may enable the user 102(1) to enter text 508 to be included in the item of ephemeral content. Additionally, the interface 500b may include an icon 510 that, when selected, causes a justification of the text 508 to cycle through multiple justifications (e.g., left justification, center justification, right justification, etc.). The interface 500b may include an icon 512 that, when selected, causes the text 508 to alternate between being highlighted or not highlighted. A color of the highlight, and/or a color of the text 508 when the text 508 is not highlighted, may be indicated by a color of an icon 514. The interface 500b may include multiple selectable colors 516 that the user 102(1) may select to change the color of the text 508 and/or the color of the highlight of the text 508.

In some cases, the interface 500b may include a selectable control 518 that, when selected, causes a font of the text 508 to cycle through multiple fonts (e.g., a typewriter font, a strong font, a classic font, a modern font, etc.). Additionally, the interface 500b may include suggestions 520 of words that the user 102(1) may select to be inserted into the text 508. The suggestions 520 may include spelling suggestions, suggestions for a next word to be included in the text 508, and the like. The social network application 112 may receive a selection of an icon 522 ("Next") to proceed to the next step of generating the item of ephemeral content.

An interface 500c in FIG. 5C illustrates the text 508, as completed, to be included in the item of ephemeral content, which may be further modified or edited by the user 102(1). For example, icons 524 may provide functionality, when selected, for the user 102(1) to add additional content to further customize the item of ephemeral content, such as additional text, filters, downloads, links, stickers, effects, GIFs, drawing inputs, and the like. The interface 500c also includes icons 526 that may enable the user 102(1) to select which of the users 102(2)-102(n) the item of ephemeral content will be shared with via the social networking system 106.

In examples, the interface 500c may provide the user 102(1) a preview of how item of ephemeral content will appear once distributed to other users 102(2)-102(n) (however, without the icons 524 and/or the icons 526). In the illustrated example, the user 102(1) may select a particular background that the text 508 overlays. In some examples, the background behind the text 508 may appear as a full bleed background of the item of ephemeral content. For instance, a full bleed background may comprise extending the background to an edge of a display screen, without including a border around the edge when the item of ephemeral content is displayed.

Figure 6:
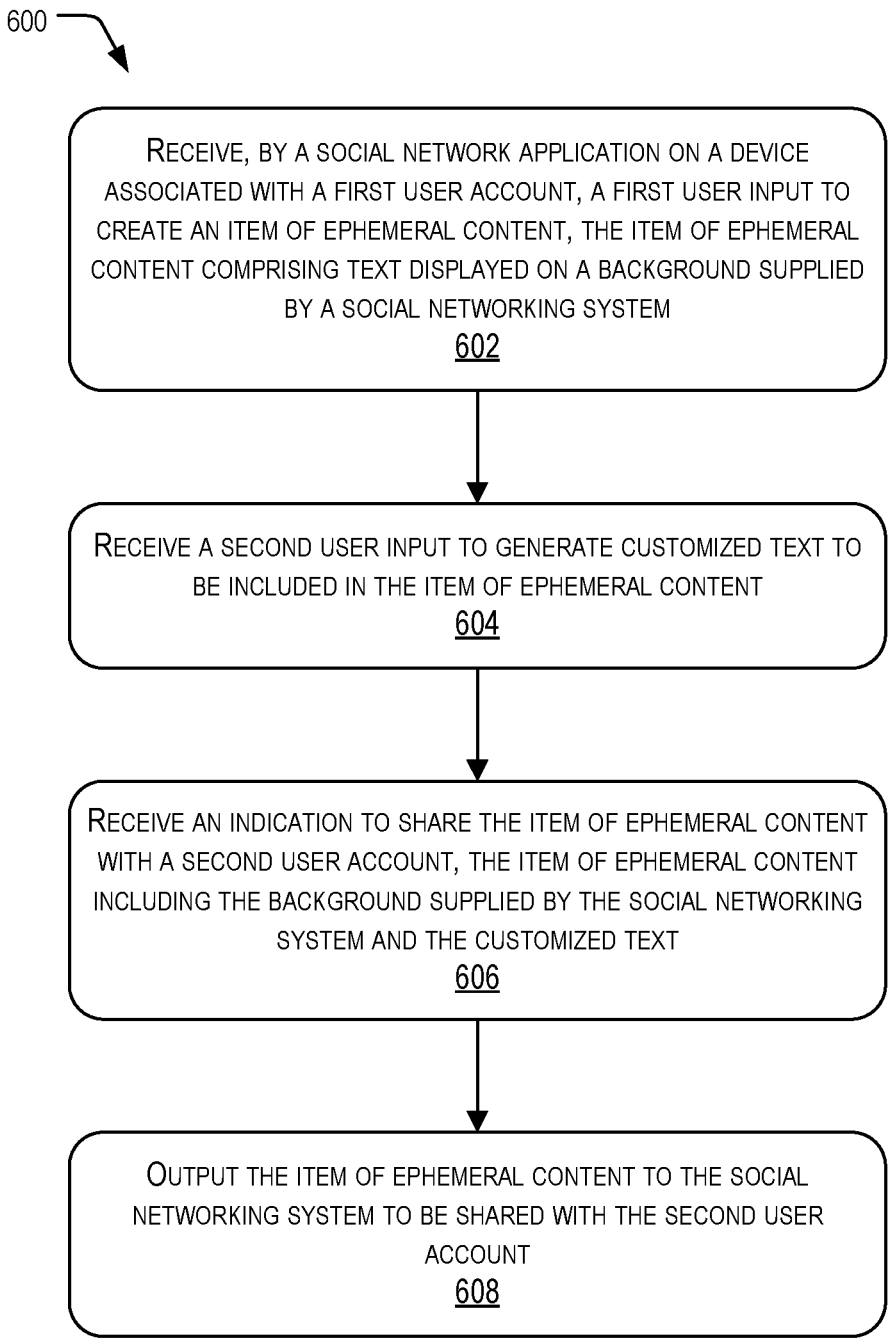
FIG. 6 illustrates an example process for receiving inputs to generate an item of ephemeral content using a text feature of a create mode control of an ephemeral content creation functionality.

FIG. 6 illustrates an example process 600 for receiving inputs to generate an item of ephemeral content using a text feature of a create mode control of an ephemeral content creation functionality.

An operation 602 includes receiving, by a social network application on a device associated with a first user account, a first user input to create an item of ephemeral content. The item of ephemeral content may include text displayed on a background, where at least the background is supplied by a social networking system. In examples, the background may be included in the content components 118 of the social networking system 106. The social networking system 106 may send the background to the social network application 112 to display as part of the text feature of the ephemeral content creation functionality. In some cases, the content components 118 may also include fonts, highlighting, colors, and/or formatting supplied to the social network application 112 that the user 102(1) may select to include in the item of ephemeral content.

An operation 604 includes receiving a second user input to generate customized text to be included in the item of ephemeral content. In some examples, the user 102(1) may enter customized text using the keyboard 506, a speech input technique, or the like to be included in the item of ephemeral content. The user 102(1) may further customize the text by changing the font, highlighting, color, and/or formatting as displayed in the item of ephemeral content.

An operation 606 includes receiving an indication to share the item of ephemeral content with a second user account, where the item of ephemeral content includes the background supplied by the social networking system and the customized text. For example, the user 102(1) may select which of the users 102(2)-102(n) the item of ephemeral content will be shared with via the social networking system 106, such as all or multiple followers of the user 102(1), one or more individually-selected users, a group of pre-selected "Close Friends", and so forth. An operation 608 includes outputting the item of ephemeral content to the social networking system to be shared with the second user account, as described above.

Example GIF Feature

FIGS. 7A-8B are schematic views showing example user interfaces that are usable to implement the techniques described herein for generating content to be shared between users. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the system 100. For example, the interfaces described in this section may be implemented in the context of the system 3200, among others.

FIGS. 7A-8B illustrate example interfaces corresponding to a graphics interchange format (GIF) feature of a create mode control of an ephemeral content creation functionality. An interface 700a shown in FIG. 7A corresponds to a first user interface that may be displayed upon selection of a GIF feature 702 in the social network application 112 (e.g., in Create Mode of Instagram®). In some examples, the interface 700a may include a text entry field 704. The text entry field 704 may include an indicator 706 (in this example, a "Search GIPHY") that indicates to the user 102(1) to enter a term associated with a GIF the user 102(1) wants to include in the item of ephemeral content.

An interface 700b shown in FIG. 7B includes a keyboard 708 which may be displayed upon selection of the text entry field 704 or the GIF feature 702. For instance, the user 102(1) has entered the term "party" in the text entry field 704 such as by using the keyboard 708. In some cases, the social networking application 112 may display thumbnails 710 of suggested GIFs upon receiving at least a portion of the term entered in the text entry field 704. In some examples, the suggested GIFS may be based at least in part on the term entered in the text entry field 704. The social network application 112 may receive a selection of a GIF associated with the search term (in this example, the search term "party") in the interface 700b, such as by selection of a thumbnail of the GIF 712, and/or selection of an icon 714 ("Next") to proceed to the next step of generating the item of ephemeral content.

Figure 8B:
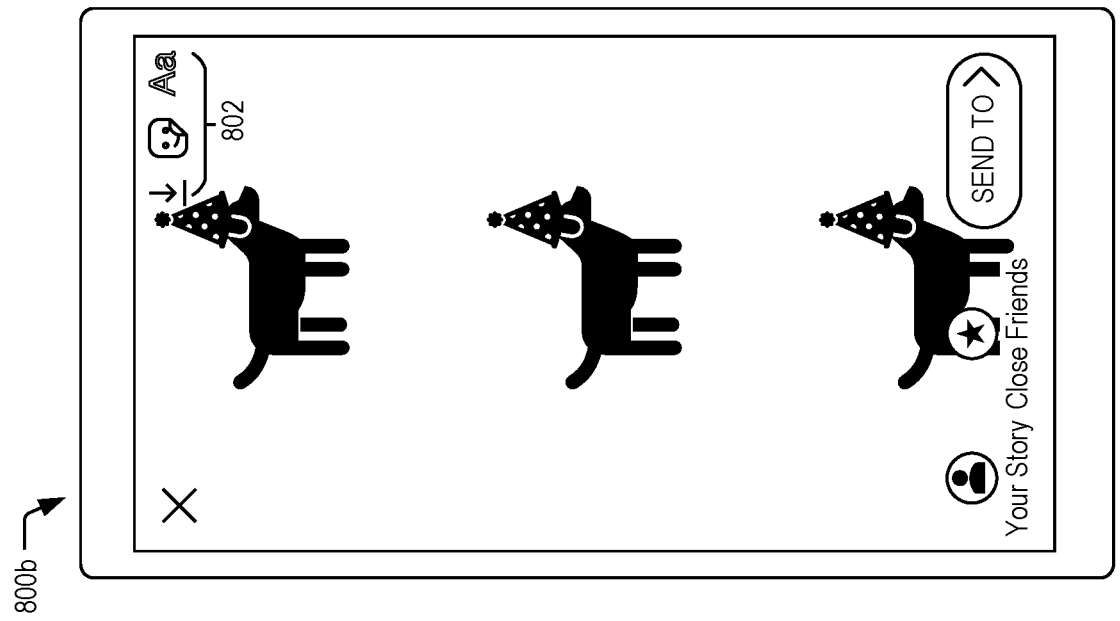
Figure 8A:
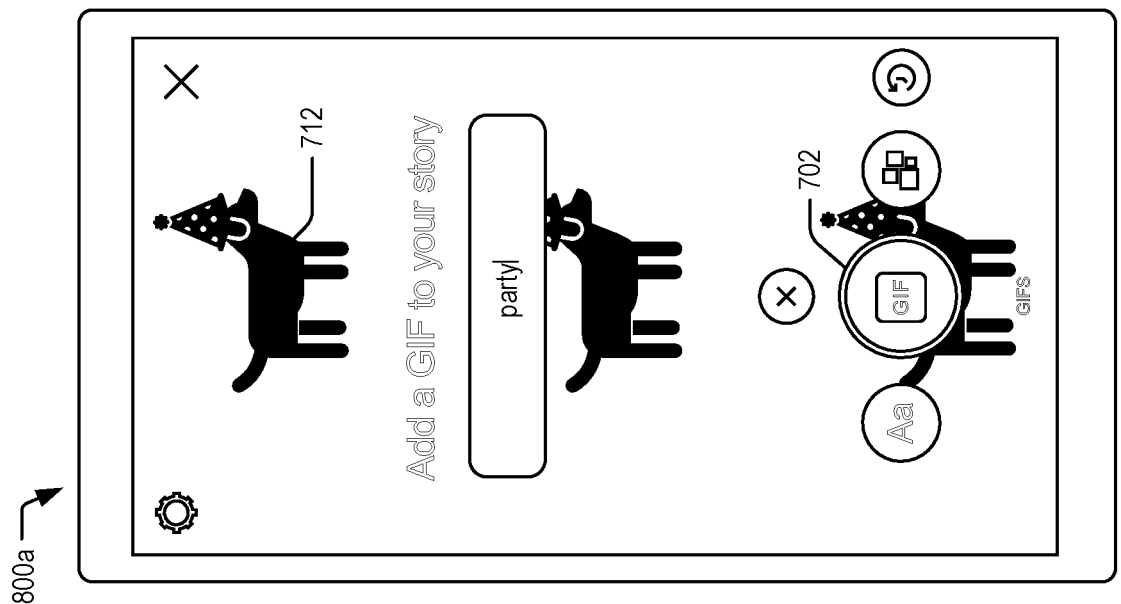

An interface 800a in FIG. 8A illustrates a content interface, which may provide the user 102(1) a preview of how item of ephemeral content will appear once distributed to other users 102(2)-102(n). In the illustrated example, the user has selected the GIF 712 of a dog in a party hat to appear as the background of the item of ephemeral content. In some cases, the selected GIF 712 will appear as the background of the item of ephemeral content, such as in cases where the user 102(1) selects content (e.g., text, a sticker, etc.) to overlay the GIF 712. Additionally or alternatively, the selected GIF 712 may appear in cascading tiles or in another repeated fashion, such as based on a size of the GIF relative to the size of the item of ephemeral content. In some examples, the GIF 712 may appear as a full bleed background of the item of ephemeral content. Further, selection of the GIF feature button 702 may proceed to the next step in generating the item of ephemeral content.

An interface 800b in FIG. 8B illustrates a completed GIF background to be included in the item of ephemeral content, which may be further modified or edited by a user 102(1). For example, icons 802 may provide functionality, when selected, for the user 102(1) to add additional content to further customize the item of ephemeral content, such as filters, downloads, links, stickers, effects, text, and the like.

Figure 9:
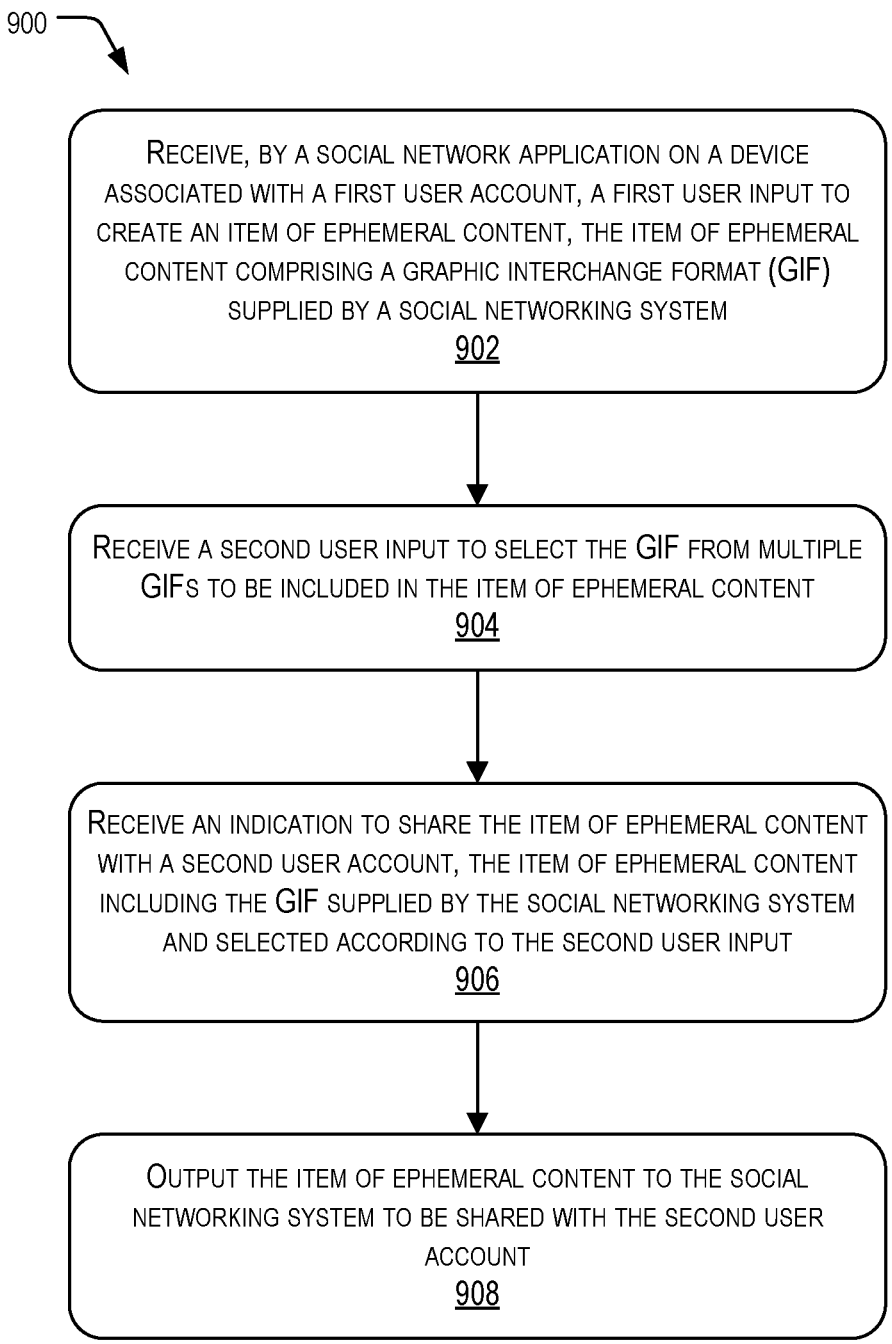
FIG. 9 illustrates an example process for receiving inputs to generate an item of ephemeral content using a GIF feature of a create mode control of an ephemeral content creation functionality.

FIG. 9 illustrates an example process 900 for receiving inputs to generate an item of ephemeral content using a GIF feature of a create mode control of an ephemeral content creation functionality.

An operation 902 includes receiving, by a social network application on a device associated with a first user account, a first user input to create an item of ephemeral content. The item of ephemeral content may include a GIF supplied by a social networking system. In examples, the GIF may be included in the content components 118 of the social networking system 106. The social networking system 106 may send the GIF to the social network application 112 to display as part of the GIF feature of the ephemeral content creation functionality. For example, the social network application 112 may receive a search input, and may send the search input to the social networking system 106. The social networking system 106 may select one or more GIF search results from the content components 118 based at least in part on the search input, and send the one or more GIF search results to the social network application 112.

An operation 904 includes receiving a second user input to select the GIF from multiple GIFs to be included in the item of ephemeral content. For example, the social network application 112 may present multiple GIF search results corresponding to the search input by the user 102(1). The user 102(1) may select the GIF from the multiple GIF search results to be included in the item of ephemeral content. In some examples, the selected GIF may be displayed as a background (e.g., a full-bleed background) of the item of ephemeral content, in multiple instances tiled across the item of ephemeral content, and so on.

An operation 906 includes receiving an indication to share the item of ephemeral content with a second user account, where the item of ephemeral content includes the GIF supplied by the social networking system and selected according to the second user input. For example, the user 102(1) may select which of the users 102(2)-102(n) the item of ephemeral content will be shared with via the social networking system 106, such as all or multiple followers of the user 102(1), one or more individually-selected users, a group of pre-selected "Close Friends", and so forth. An operation 608 includes outputting the item of ephemeral content to the social networking system to be shared with the second user account, as described above.

Example Template Feature

FIGS. 10A-12C are schematic views showing example user interfaces that are usable to implement the techniques described herein for generating content to be shared between users. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the system 100. For example, the interfaces described in this section may be implemented in the context of the system 3200, among others.

FIGS. 10A-12C illustrate example interfaces corresponding to a template feature of a create mode control of an ephemeral content creation functionality. In some examples, the example interfaces depicted in FIGS. 10A-12C may comprise suggestions of content for the user 102(1) to share with the users 102(2)-102(n). For example, an interface 1000a shown in FIG. 10A corresponds to a first user interface that may be displayed upon selection of a template feature 1002 in the social network application 112 (e.g., in Create Mode of Instagram®). The interface 1000a comprises a template that includes a suggestion for the user 102(1) to share ranked pizza toppings with the users 102(2)-102(n). Additionally, the interface 1000a includes a selectable control 1004 that, when selected, causes the social network application 112 to display a different template of multiple templates. The selectable control 1004 is shown in each of the interfaces depicted in the following FIGS. 10B-12B.

Figure 10C:
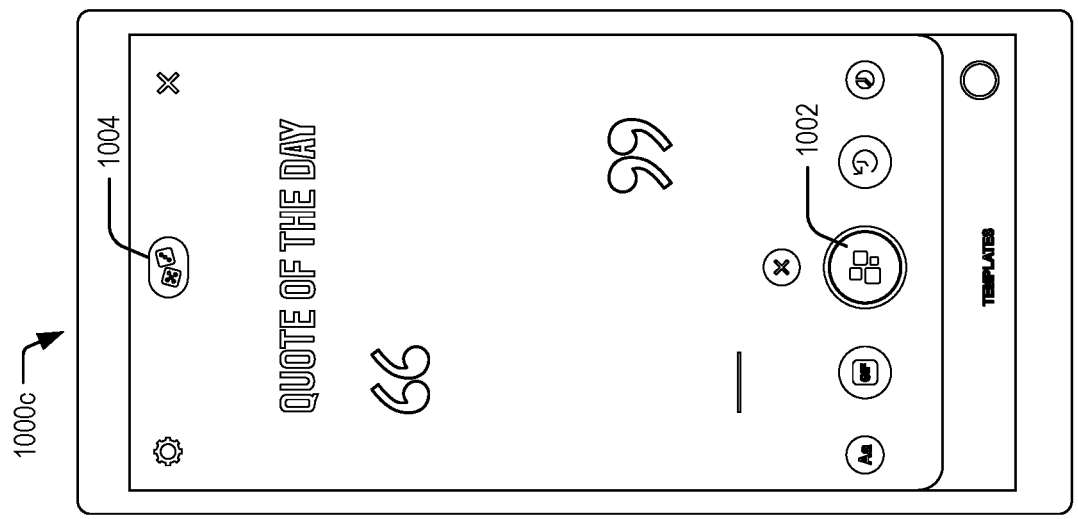
FIGS. 10A-10C, FIGS. 11A-11C, and FIGS. 12A-12C illustrate example interfaces corresponding to a template feature of a create mode control of an ephemeral content creation functionality.
Figure 10B:
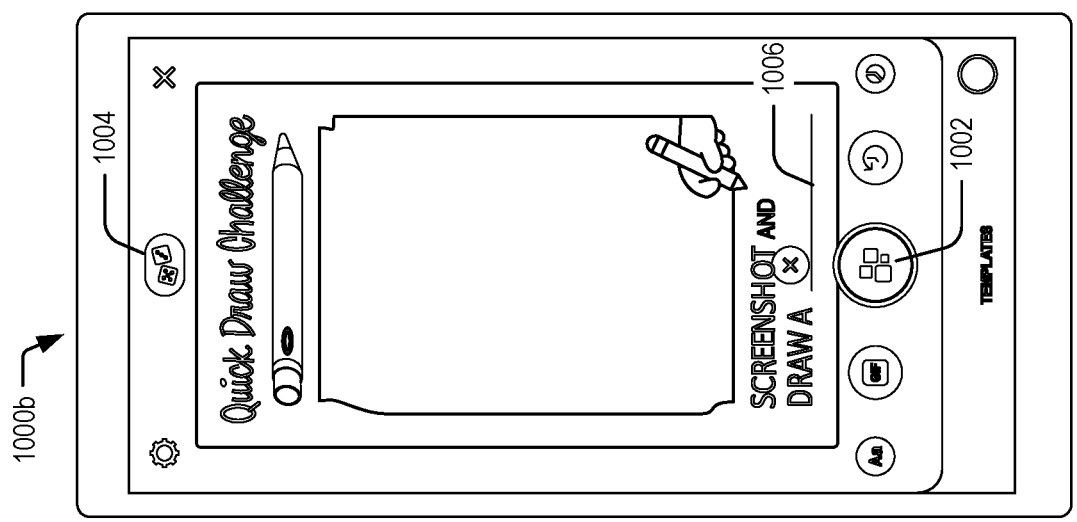
Figure 10A:
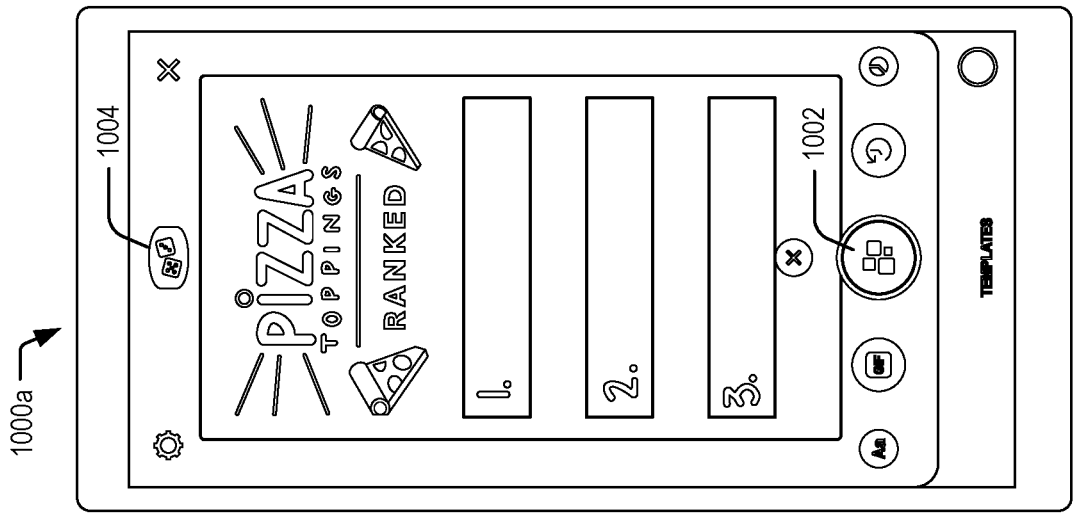

An interface 1000b shown in FIG. 10B corresponds to a second user interface that may be displayed upon selection of a template feature 1002 and/or selection of the selectable control 1004 in the social network application 112. The interface 1000b comprises a template that includes a suggestion for the user 102(1) to share a quick draw challenge. For example, the quick draw challenge template may include a space 1006 in which the user 102(1) may input a topic for the users 102(2)-102(n) to draw on the template.

An interface 1000c shown in FIG. 10C corresponds to a third user interface that may be displayed upon selection of a template feature 1002 and/or selection of the selectable control 1004 in the social network application 112. The interface 1000c comprises a template that includes a suggestion for the user 102(1) to share a quote of the day.

Figure 11C:
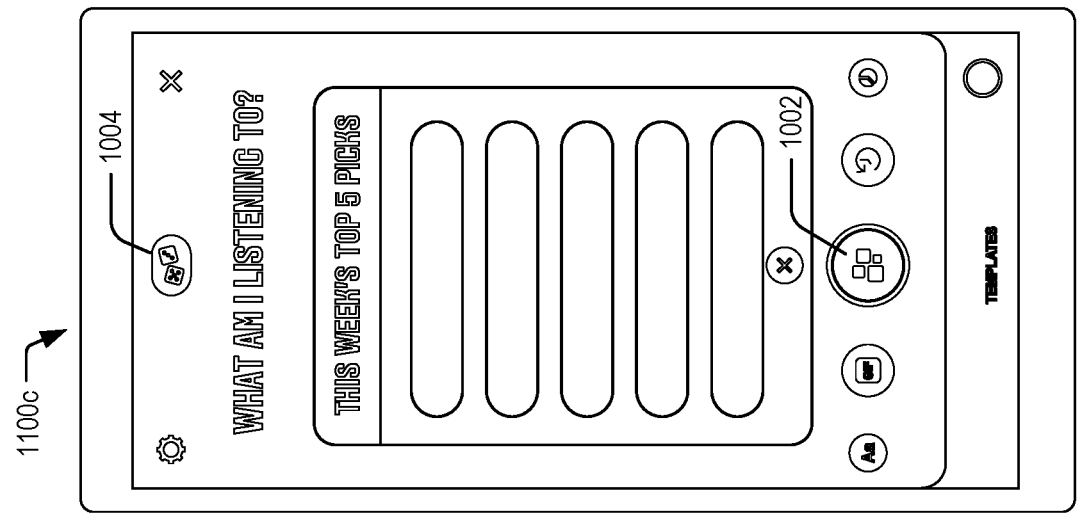
Figure 11B:
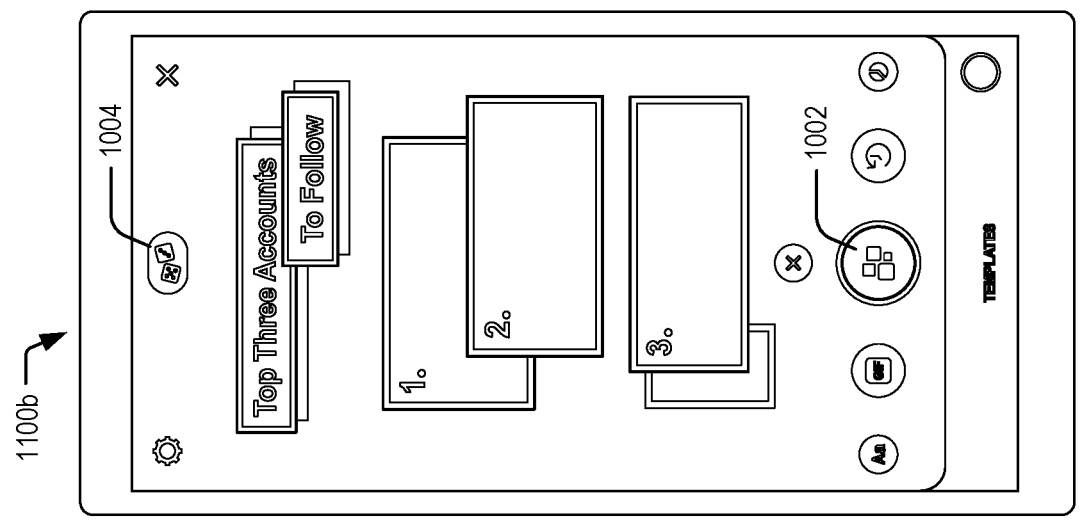
Figure 11A:
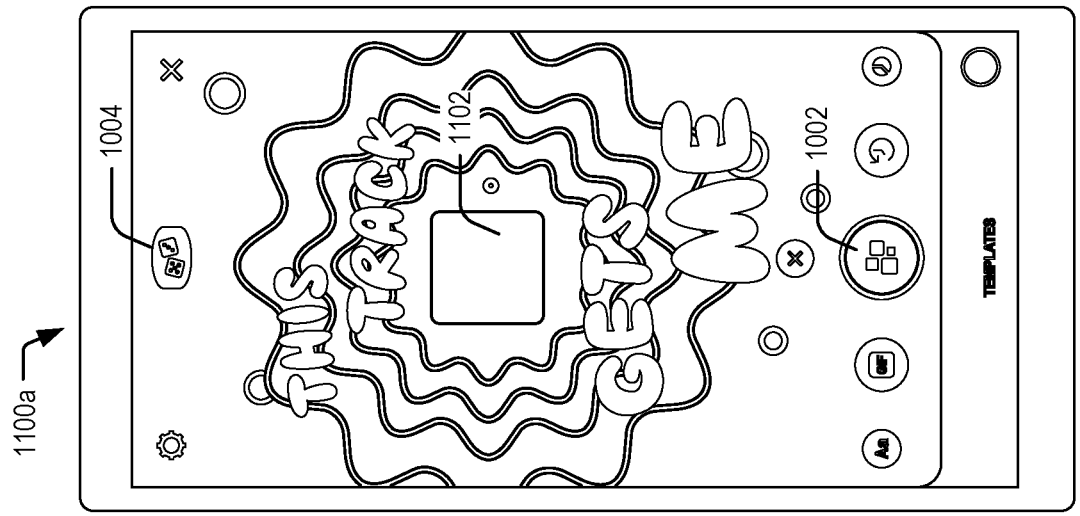

An interface 1100a shown in FIG. 11A corresponds to a fourth user interface that may be displayed upon selection of a template feature 1002 and/or selection of the selectable control 1004 in the social network application 112. The interface 1100a comprises a template that includes a suggestion for the user 102(1) to share a song track (e.g., "this track gets me"). For example, the song track template may include a space 1102 in which the user 102(1) may input text corresponding to a song track, and/or may select a song track from music included in the content components 118 to be included in the item of ephemeral content. For example, upon selection of a song track from the content components 118 of the social networking system 106, an icon corresponding to the song track may be displayed overlaid on the song track template, and the song track may be played when the item of ephemeral content is viewed by the users 102.

An interface 1100b shown in FIG. 11B corresponds to a fifth user interface that may be displayed upon selection of a template feature 1002 and/or selection of the selectable control 1004 in the social network application 112. The interface 1100b comprises a template that includes a suggestion for the user 102(1) to share accounts that the user 102(1) recommends following (e.g., "top three accounts to follow"). For example, the user 102(1) may include selectable "mentions" in the account recommendation template that, when selected by one of the users 102(2)-102(n), directs the user to the selected mentioned user account. In this way, the user may follow the selected mentioned user account as recommended by the user 102(1), view content shared by the selected mentioned user account, and so forth.

An interface 1100c shown in FIG. 11C corresponds to a sixth user interface that may be displayed upon selection of a template feature 1002 and/or selection of the selectable control 1004 in the social network application 112. The interface 1100c comprises a template that includes a suggestion for the user 102(1) to share what the user 102(1) is listening to (e.g., "what am I listening to? this week's top 5 picks"). Similar to the song track template in the interface 1100a, the what am I listening to template may include a spaces in which the user 102(1) may input text corresponding to one or more song tracks, and/or may select one or more song tracks from music included in the content components 118 to be included in the item of ephemeral content. For example, upon selection of a song track from the content components 118 of the social networking system 106, an icon corresponding to the song track may be displayed overlaid on the what am I listening to template, and the song track may be played when the item of ephemeral content is viewed by the users 102.

Figure 12C:
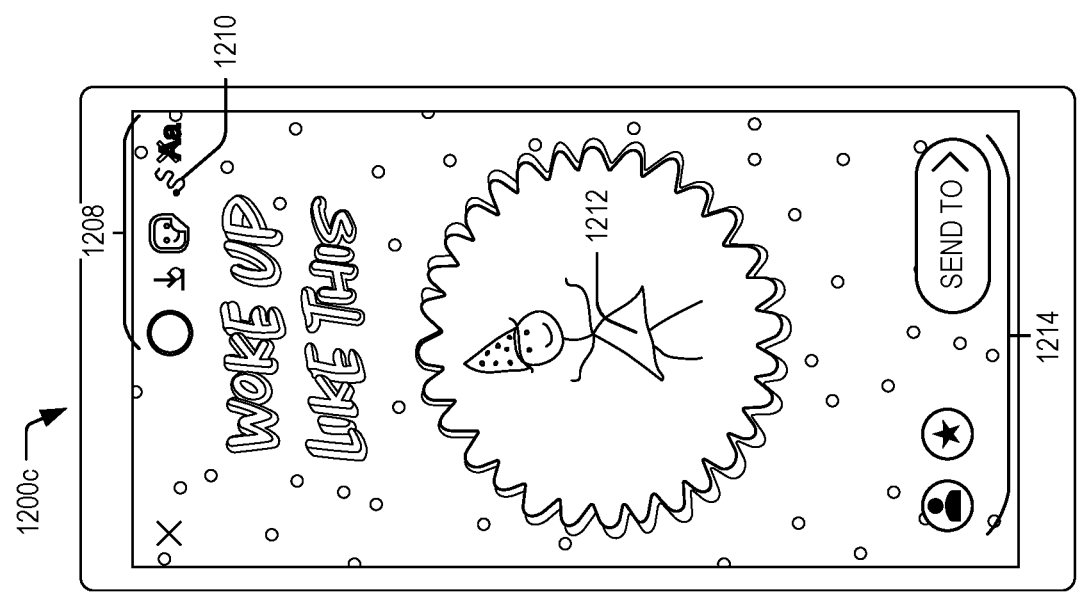
Figure 12B:
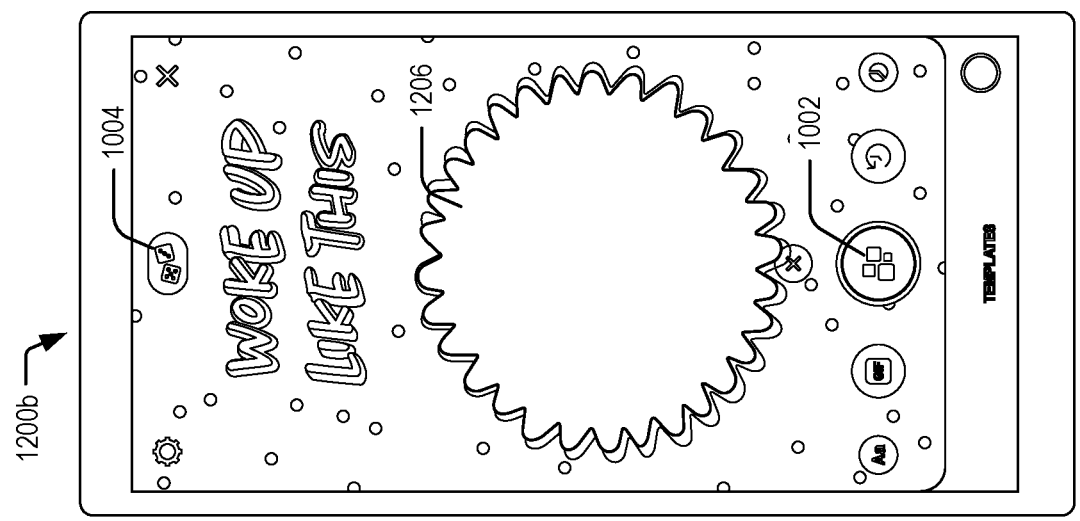
Figure 12A:
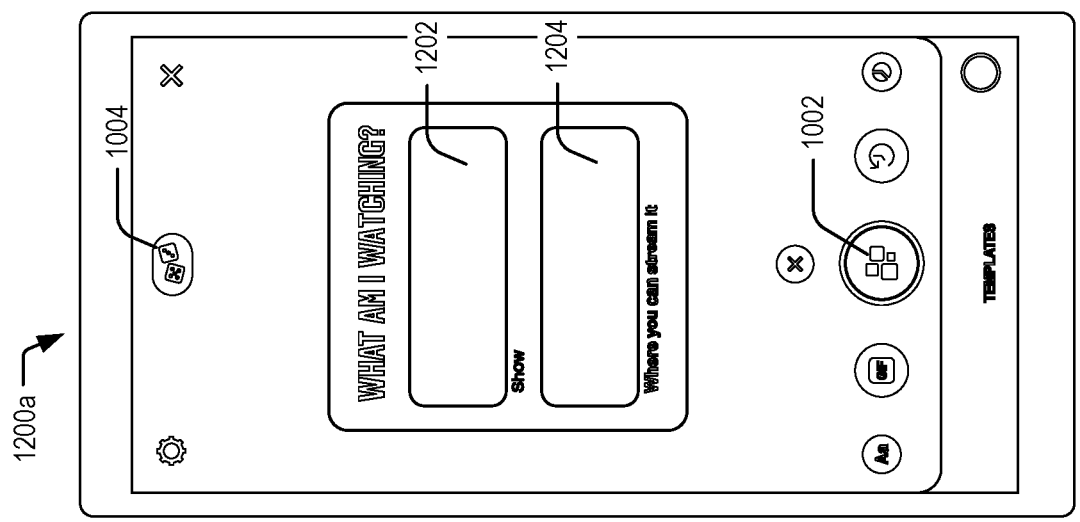

An interface 1200a shown in FIG. 12A corresponds to a seventh user interface that may be displayed upon selection of a template feature 1002 and/or selection of the selectable control 1004 in the social network application 112. The interface 1200a comprises a template that includes a suggestion for the user 102(1) to share what the user 102(1) is watching (e.g., "show" and/or "where you can stream it"). For example, the what am I watching template may include a space 1202 in which the user 102(1) may input text corresponding to a show title, and/or may include a space 1204 in which the user 102(1) may input text corresponding to a streaming service where the show is available to watch.

An interface 1200b shown in FIG. 12B corresponds to an eighth user interface that may be displayed upon selection of a template feature 1002 and/or selection of the selectable control 1004 in the social network application 112. The interface 1200b comprises a template that includes a suggestion for the user 102(1) to share what the user 102(1) looked like when the user woke up (e.g., "I woke up like this"). For example, the I woke up like this template may include a space 1206 in which the user 102(1) may input content from previously posted feed media and/or reel media supplied from the content components 118, an image and/or video captured by a camera of the computing device 104(1), or an image and/or video accessed from storage accessible by the computing device 104(1), to name a few examples.

In some examples, the user 102(1) may select the icon corresponding to the template feature 1002 in any of the interfaces depicted in FIGS. 10A-12B to edit the corresponding template. Using the template pictured in FIG. 12B as an illustrative, non-limiting example, upon selection of the icon corresponding to the template feature 1002, the social networking application 112 may display an interface 1200c that enables the user 102(1) to customize the template. For instance, the user 102(1) may use functionality associated with one or more icons 1208 to add content to customize the item of ephemeral content, such as by changing a color and/or gradient of the background of the template, downloads, stickers, effects, text, music, and the like. In the illustrated example of the interface 1200c, the user 102(1) has used a drawing input 1210 included in the icons 1208 to draw a FIG. 1212 using a touch input to include in the item of ephemeral content. Other examples of techniques for customizing a template included in the item of ephemeral content are also considered. The interface 1200c may also include icons 1214 that, when selected, enable the user 102(1) to share the item of ephemeral content as customized.

Figure 13:
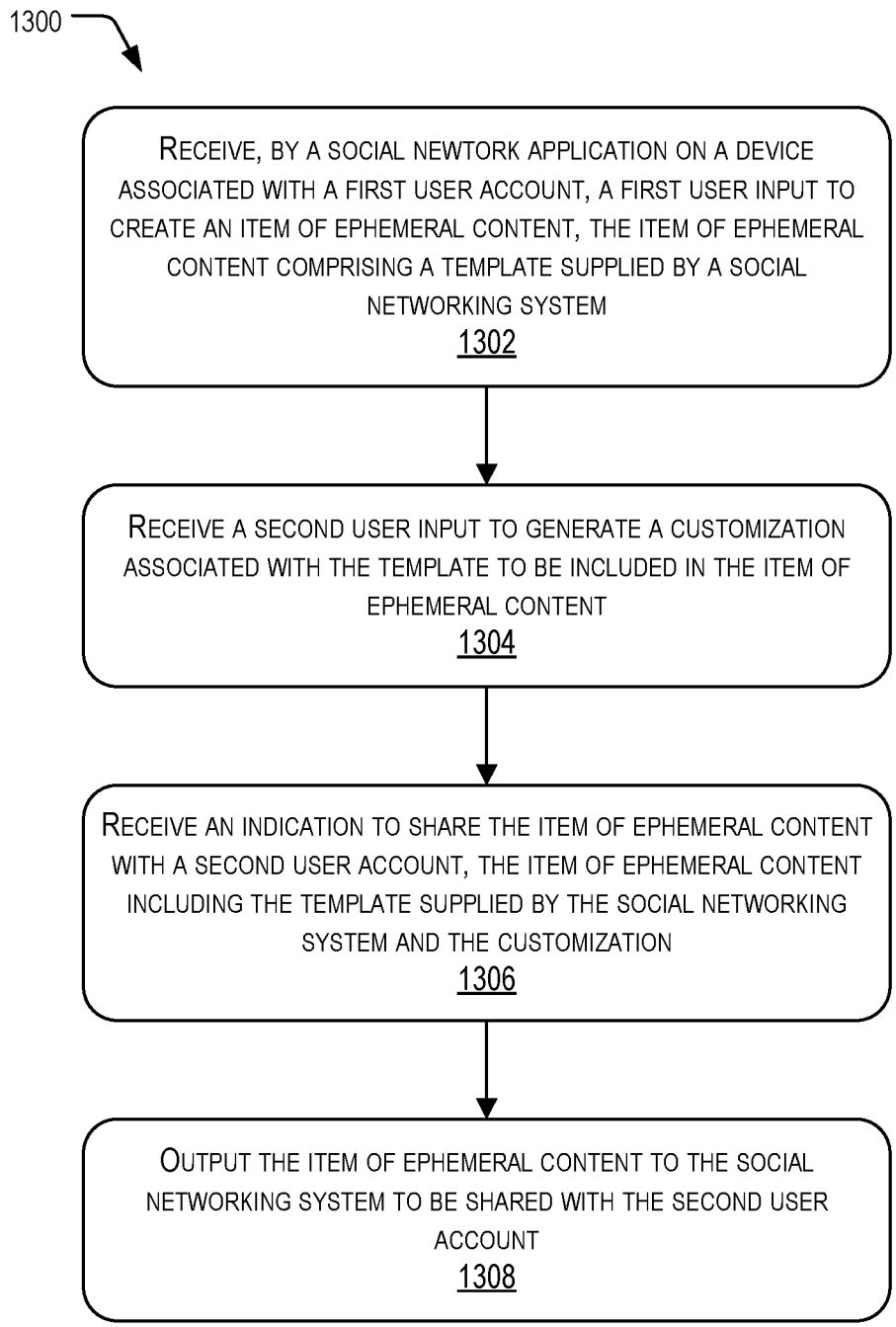
FIG. 13 illustrates an example process for receiving inputs to generate an item of ephemeral content using a template feature of a create mode control of an ephemeral content creation functionality.

FIG. 13 illustrates an example process 1300 for receiving inputs to generate an item of ephemeral content using a template feature of a create mode control of an ephemeral content creation functionality.

An operation 1302 includes receiving, by a social network application on a device associated with a first user account, a first user input to create an item of ephemeral content. The item of ephemeral content may include a template supplied by a social networking system. In examples, the template may be one of multiple templates included in the content components 118 of the social networking system 106. The social networking system 106 may send multiple templates to the social network application 112, where the social network application 112 may display one of the multiple templates as part of the template feature of the ephemeral content creation functionality. In some cases, the social network application 112 may display a selectable control 1004 that enables the user to cycle through viewing an individual one of the multiple templates.

An operation 1304 includes receiving a second user input to generate a customization associated with the template to be included in the item of ephemeral content. For example, upon selection of a particular template of the multiple templates, the social network application 112 may present icons that, when selected, provide different customizations that the user 102(1) may include in the item of ephemeral content. For instance, the user 102(1) may use functionality associated with the one or more icons 1208 to add content to customize the item of ephemeral content, such as by changing a color and/or gradient of the background of the template, downloads, stickers, effects, text, music, drawing using touch input or stylus, and the like.

An operation 1306 includes receiving an indication to share the item of ephemeral content with a second user account, where the item of ephemeral content includes the template supplied by the social networking system and the customization. For example, the user 102(1) may select which of the users 102(2)-102(n) the item of ephemeral content will be shared with via the social networking system 106, such as all or multiple followers of the user 102(1), one or more individually-selected users, a group of pre-selected "Close Friends", and so forth. An operation 1308 includes outputting the item of ephemeral content to the social networking system to be shared with the second user account, as described above.

Example On-This-Day Feature

Figure 14B:
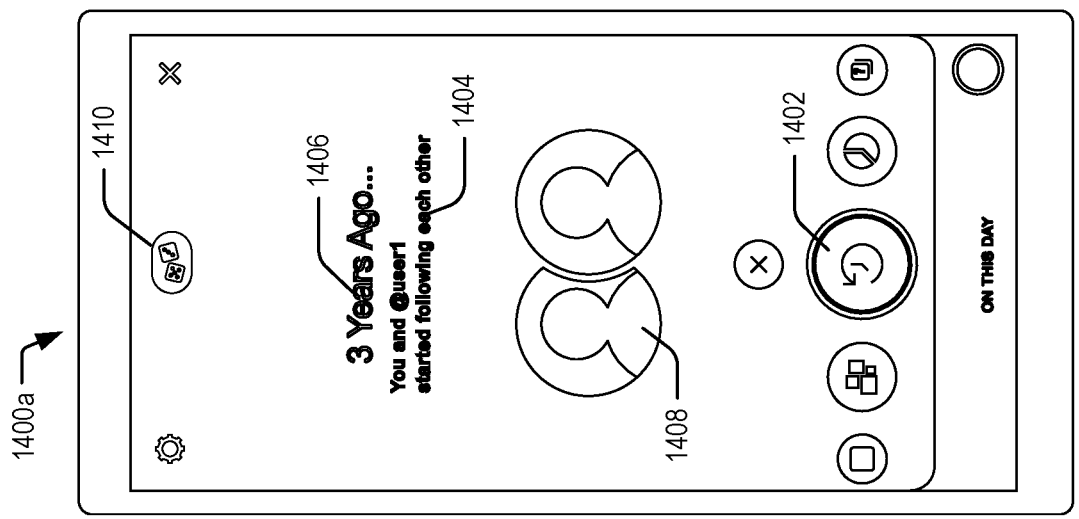
FIGS. 14A and 14B illustrate example interfaces corresponding to an on-this-day feature of a create mode control of an ephemeral content creation functionality.
Figure 14A:
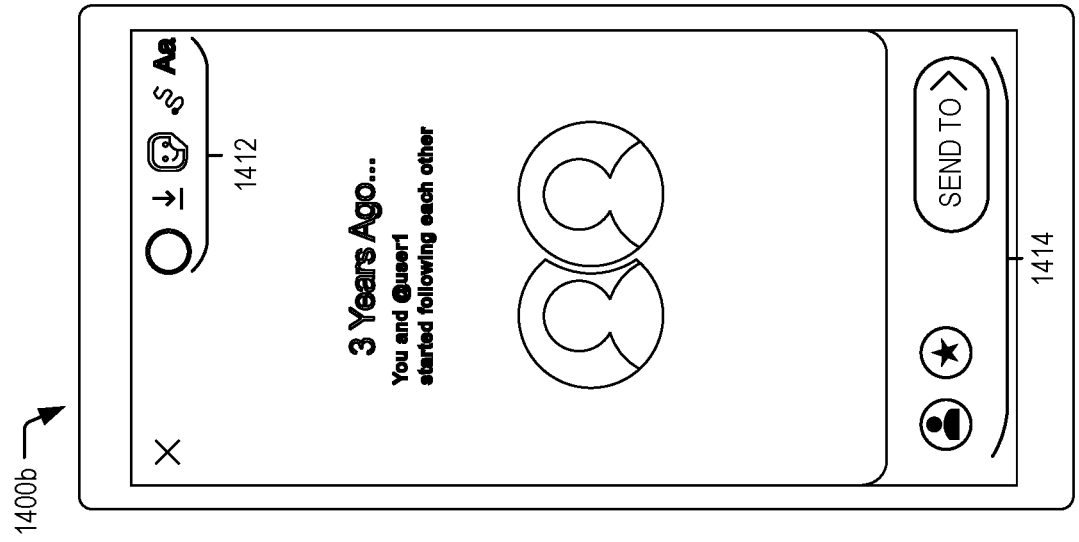

FIGS. 14A and 14B are schematic views showing example user interfaces that are usable to implement the techniques described herein for generating content to be shared between users. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the system 100. For example, the interfaces described in this section may be implemented in the context of the system 3200, among others.

FIGS. 14A and 14B illustrate example interfaces corresponding to an on-this-day feature of a create mode control of an ephemeral content creation functionality. An interface 1400a shown in FIG. 14A corresponds to a first user interface that may be displayed upon selection of an on-this-day feature 1402 in the social network application 112 (e.g., in Create Mode of Instagram®). In some examples, the interface 1400a may include an event 1404 and a date 1406 (e.g., relative to a current date) on which the event 1404 took place.

In some examples, the event 1404 may be an event that took place in association with the social networking system 106, such as when the account of the user 102(1) started following the account of the user 102(2), when the account of the user 102(2) started following the account of the user 102(1), when the user 102(1) liked an item of content shared by the user 102(2), and/or when the user 102(1) shared an item of content, to name a few examples. The date 1406 may be on a multiple of one year, one month, one week, one day, etc. from a current date. Therefore, in some examples, the social network application 112 may display events on dates that occurred on a multiple of a selected unit of time (e.g., one year). Further, the social network application 112 may disable the on-this-day feature 1402 (e.g., by not presenting the on-this-day feature 1402 in the menu 206) on days where no event took place on the selected unit of time in the past. In other words, the social network application 112 may disable the on-this-day feature 1402 if the account of the user 102(1) did not experience an event one year ago, two years ago, three years ago, to n years ago when the account was created.

In some cases, the interface 1400a may include a representation 1408 associated with the event, such as profile pictures of the account of the user 102(1) and the user 102(2) (as shown), the item of content liked and/or shared by the user 102(1), and so forth. In examples, the interface 1400a may include a selectable control 1410 that, when selected, causes the social network application 112 to display a different event and/or a different date. For instance, if the account of the user 102(1) experienced a first event associated with the social networking system 106 one year ago, a second event associated with the social networking system 106 two years ago, and a third event associated with the social networking system 106 three years ago, repeated selection of the selectable control 1410 may cause the social network application 112 to cycle through the first event, the second event, and the third event (and corresponding dates) in the user interface.

In some examples, the user 102(1) may select the icon corresponding to the on-this-day feature 1402 in the interface 1400a to edit the item of ephemeral content including the event 1404 and the date 1406. Upon selection of the icon corresponding to the on-this-day feature 1402, the social networking application 112 may display an interface 1400b that enables the user 102(1) to customize the item of ephemeral content including the event 1404 and the date 1406. For instance, the user 102(1) may use functionality associated with one or more icons 1412 to add content to customize the item of ephemeral content, such as by changing a color and/or gradient of the background of the template, downloads, stickers, effects, text, music, and the like. The interface 1400b may also include icons 1414 that, when selected, enable the user 102(1) to share the item of ephemeral content as customized.

Figure 15:
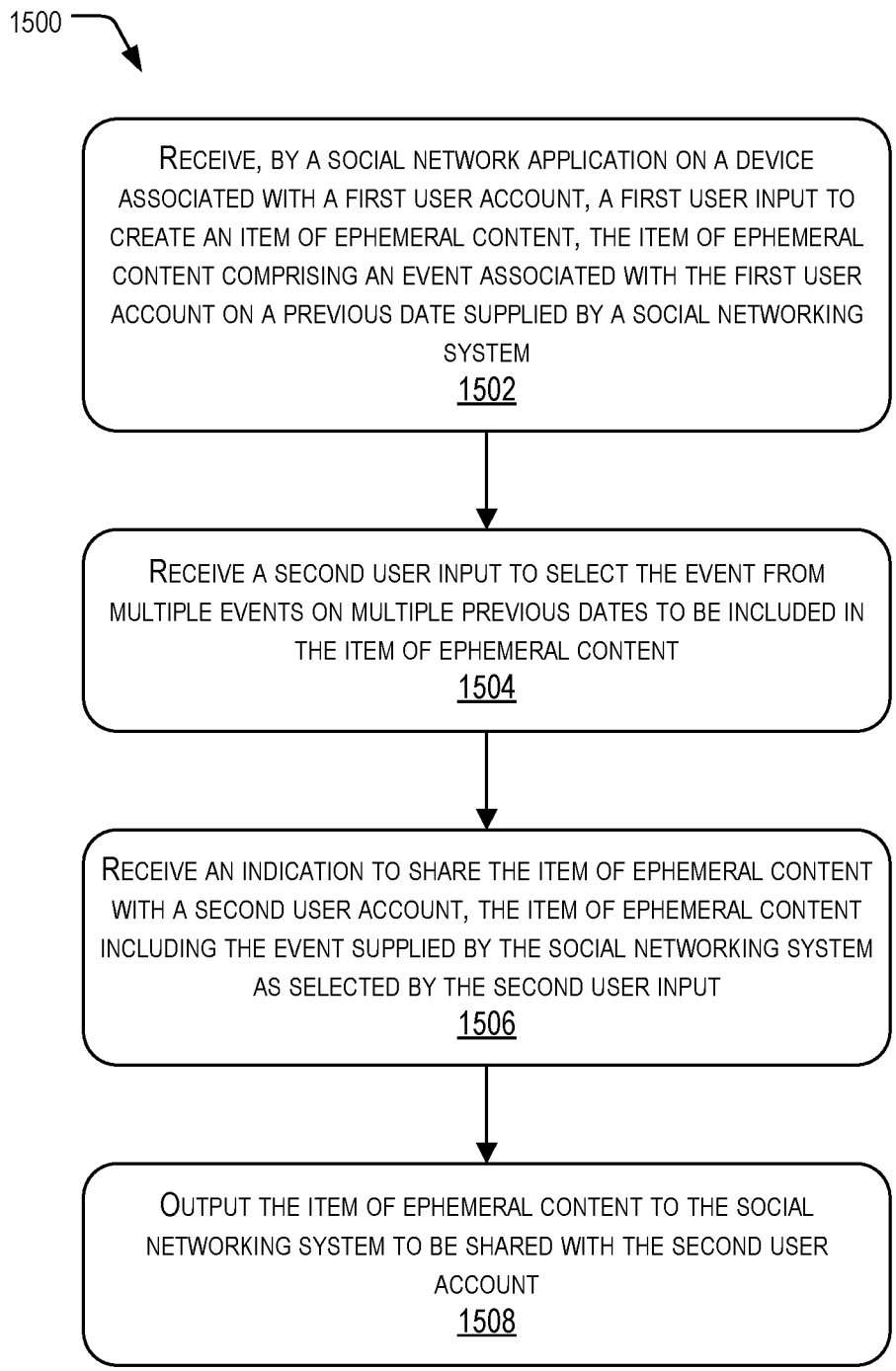
FIG. 15 illustrates an example process for receiving inputs to generate an item of ephemeral content using an on-this-day feature of a create mode control of an ephemeral content creation functionality.

FIG. 15 illustrates an example process 1500 for receiving inputs to generate an item of ephemeral content using an on-this-day feature of a create mode control of an ephemeral content creation functionality.

An operation 1502 includes receiving, by a social network application on a device associated with a first user account, a first user input to create an item of ephemeral content. The item of ephemeral content may include an event associated with the first user account on a previous date, where the event is supplied by a social networking system. In examples, the event and/or the date may be one of multiple events and/or dates included in the content components 118 of the social networking system 106. The social networking system 106 may send multiple events and/or dates to the social network application 112, where the social network application 112 may display one of the multiple event and date combinations as part of the on-this-day feature of the ephemeral content creation functionality. In some cases, the social network application 112 may display a selectable control 1410 that enables the user to cycle through viewing an individual one of the multiple event and date combinations.

An operation 1504 includes receiving a second user input to select the event from multiple events on multiple previous dates to be included in the item of ephemeral content. In some examples, the user 102(1) may select the event and date from the multiple event and date combinations received from the social networking system 106. In some cases, upon selection of a particular event and date combination of the multiple event and date combinations, the social network application 112 may present icons that, when selected, provide different customizations that the user 102(1) may include in the item of ephemeral content. For instance, the user 102(1) may use functionality associated with the one or more icons 1412 to add content to customize the item of ephemeral content, such as by changing a color and/or gradient of the background of the event, downloads, stickers, effects, text, music, GIFs, drawing using touch input or stylus, and the like.

An operation 1506 includes receiving an indication to share the item of ephemeral content with a second user account, where the item of ephemeral content includes the event supplied by the social networking system as selected by the second user input. For example, the user 102(1) may select which of the users 102(2)-102(n) the item of ephemeral content will be shared with via the social networking system 106, such as all or multiple followers of the user 102(1), one or more individually-selected users, a group of pre-selected "Close Friends", and so forth. An operation 1508 includes outputting the item of ephemeral content to the social networking system to be shared with the second user account, as described above.

Example Poll Feature

FIGS. 16A-17B are schematic views showing example user interfaces that are usable to implement the techniques described herein for generating content to be shared between users. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the system 100. For example, the interfaces described in this section may be implemented in the context of the system 3200, among others.

FIGS. 16A-17B illustrate example interfaces corresponding to poll feature of a create mode control of an ephemeral content creation functionality. An interface 1600a shown in FIG. 16A corresponds to a first user interface that may be displayed upon selection of a poll feature 1602 in the social network application 112 (e.g., in Create Mode of Instagram®). In some examples, the interface 1600a may include a topic 1604 for the poll, and an icon 1606 having a first poll answer 1608 and a second poll answer 1610. The social network application 112 may display the topic 1604 and the icon 1606 shown in the interface 1600a as a default topic and icon that are displayed when the user 102(1) selects the poll feature 1602. Additionally, the interface 1600a may include a selectable control 1612 that, when selected, cycles through multiple pre-populated polls supplied from the content components 118 by the social networking system 106 to the social network application 112.

Figure 16C:
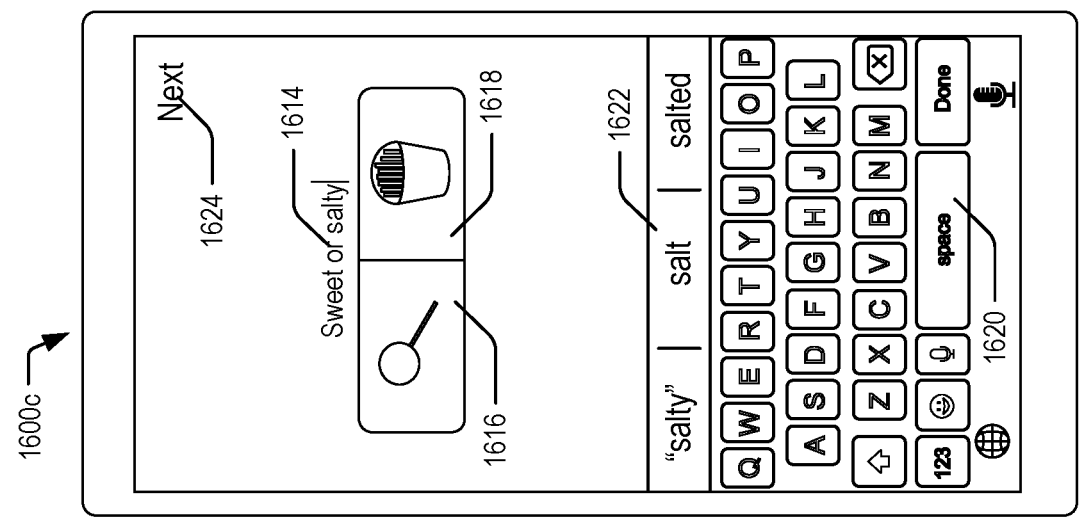
Figure 16B:
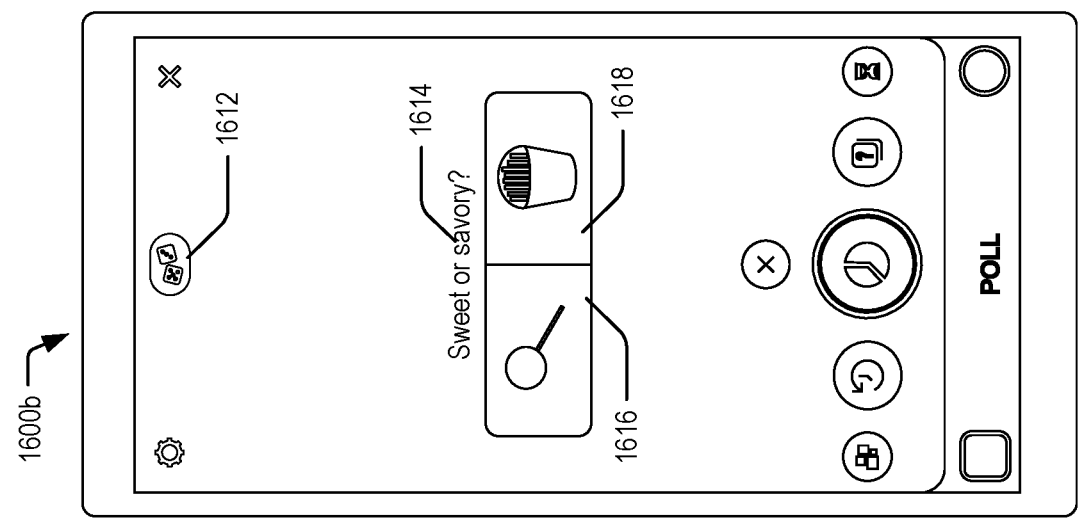
Figure 16A:
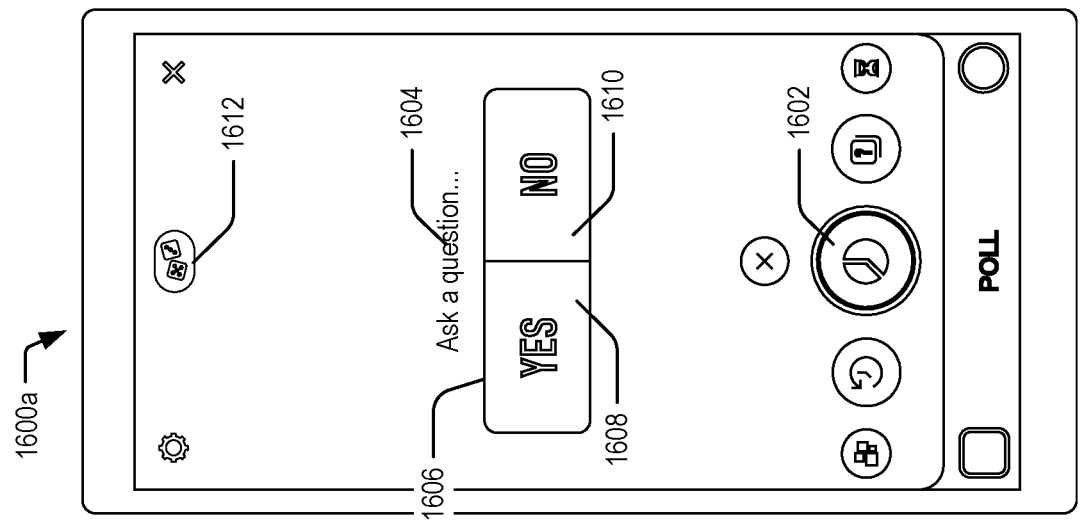

For example, in response to the user 102(1) selecting the selectable control 1612, the social network application 112 may display a user interface 1600b shown in FIG. 16B. The user interface 1600b may include a topic 1614 (e.g., "sweet or savory?"), a first answer 1616 (a lollipop icon), and a second answer 1618 (a French fly icon) prepopulated and output by the social networking system 106 to the social network application 112. In some cases, the user 102(1) may choose the prepopulated poll indicated by the topic 1614, the first answer 1616, and the second answer 1618 to share with one or more other users 102(2)-102(n) via the social networking system 106, by selecting the icon associated with the poll feature 1602. For instance, selecting the icon associated with the poll feature 1602 may cause the social network application 112 to display an interface that includes features similar to those described in relation to FIG. 17A to edit and/or share the item of ephemeral content that includes the poll as depicted in the interface 1600b.

In some instances, however, the user 102(1) may want to change one or more of the components included in the prepopulated poll shown in the interface 1600b. The user 102(1) may select the topic 1614, the first answer 1616, and/or the second answer 1618 in the interface 1600b (e.g., by way of a touch input) to edit one or more of these components of the poll. Upon receiving an input to edit one or more of the components of the poll, the social network application 112 may display an interface 1600c shown in FIG. 16C. The interface 1600c may include a keyboard 1620 and/or selectable suggestions 1622 of text and/or emoticons to include in the topic 1614, the first answer 1616, and/or the second answer 1618. In the illustrated example, the user 102(1) has changed the text of the topic 1614 from "sweet or savory" to "sweet or salty" using the keyboard 1620. In some examples, the user 102(1) may select an icon 1624 ("Next") to complete the item of ephemeral content including the poll, as customized.

Responsive to receiving the selection of the icon 1624, the social network application 112 may display an interface 1700a shown in FIG. 17A that enables the user 102(1) to further edit and/or share the item of ephemeral content including the poll. For instance, the user 102(1) may use functionality associated with one or more icons 1702 to add content to customize the item of ephemeral content, such as by changing a color and/or gradient of the background of the poll, downloads, stickers, effects, text, music, GIFs, and the like. The interface 1700a may also include icons 1704 that, when selected, enable the user 102(1) to share the item of ephemeral content including the poll.

In some examples, the social network application 112 may provide functionality to view results of the poll, such as how many users responded to the poll, which users responded to the poll, and how individual users responded to the poll. An interface 1700b shown in FIG. 17B illustrates an example of a poll results interface following the user 102(1) sharing the poll shown in the interface 1700a. For example, a representation 1706 is included in the interface 1700b, where the representation corresponds to the poll for which the results are displayed. The interface 1700b may include a icon 1708 noting the number of users who viewed the item of ephemeral content that included the poll. In some examples, the interface 1700b may include selectable controls 1710 that enable the user 102(1) to download the results of the poll, share the results of the poll (e.g., outside of the social networking system 106 such as by SMS message, email, and the like), and/or delete the results of the poll, to name a few examples.

In some cases, the interface 1700b may include a result count 1712 that includes a number of users who selected the first answer (in this case, 3 users) and a number of users who selected the second answer (in this case, 1 user). In examples, the interface 1700b may also include a selectable control 1714 to share the results of the poll with one or more of the users 102(2)-102(n) of the social networking system 106. For instance, in response to selection of the selectable control 1714, the social network application 112 may share the results of the poll as an item of ephemeral content in reel media, an item of feed media, and so forth.

In examples, the interface 1700b may include a representation 1716 depicting how individual users responded to the poll. For instance, the representation 1716 may include a username associated with a user account proximate the response provided by a user associated with the user account. In some cases, the interface 1700b may provide one or more selectable controls 1718 that enable the user 102(1) to send a message (e.g., a direct message via the social networking system 106) to a particular user that responded to the poll. Although not explicitly pictured, the social networking system 106 may send a notification (e.g., a push notification, an instruction to display an icon in a user interface of the social network application 112, etc.) to the social network application 112 on the computing device 104(1) when one of the user(s) 102(2)-102(n) responds to the poll via the social network application 112 on the computing device(s) 104(2)-104(m).

Figure 18:
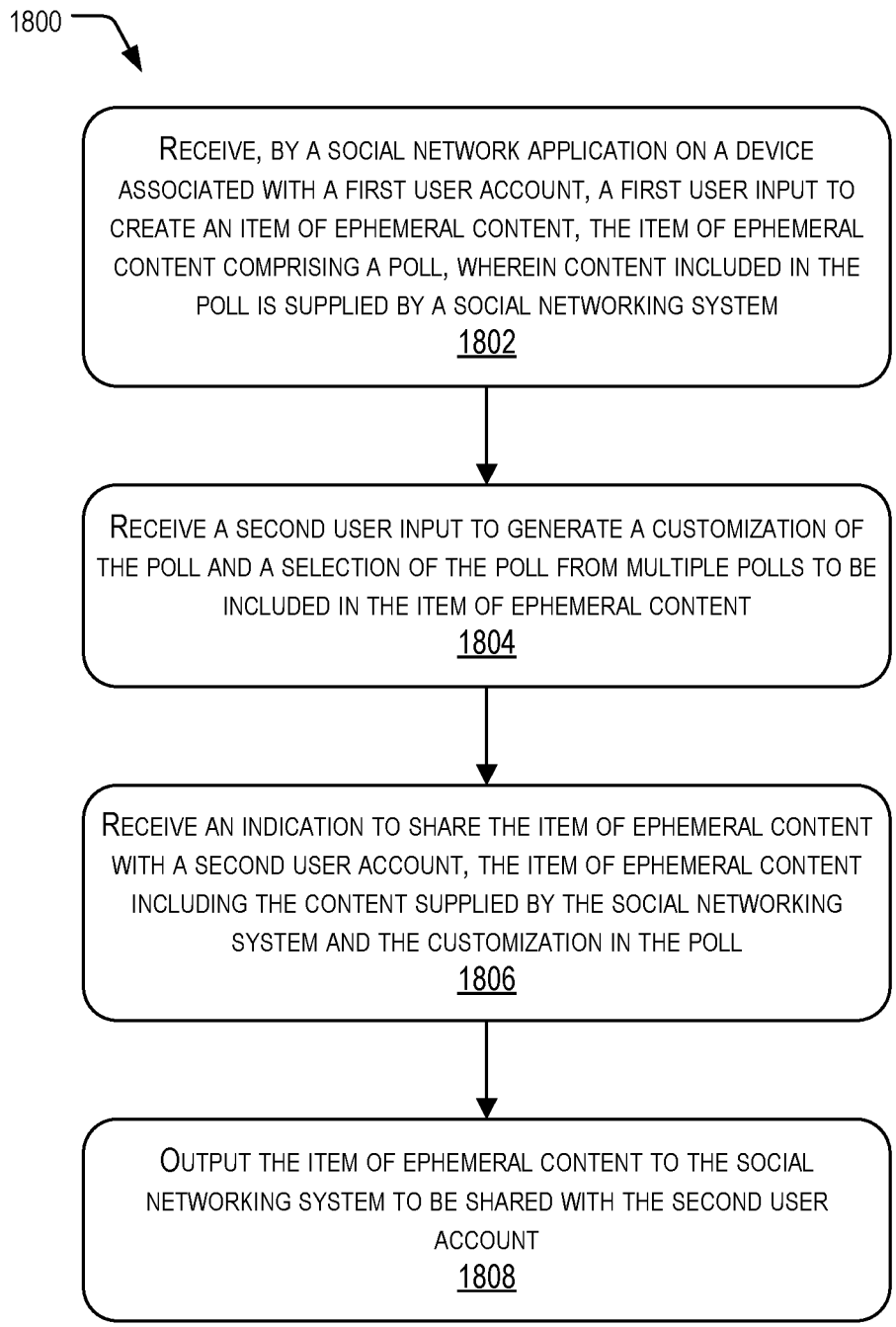
FIG. 18 illustrates an example process for receiving inputs to generate an item of ephemeral content using a poll feature of a create mode control of an ephemeral content creation functionality.

FIG. 18 illustrates an example process 1800 for receiving inputs to generate an item of ephemeral content using a poll feature of a create mode control of an ephemeral content creation functionality.

An operation 1802 includes receiving, by a social network application on a device associated with a first user account, a first user input to create an item of ephemeral content. The item of ephemeral content may include a poll, where content included in the poll is supplied by a social networking system. In examples, the poll may be one of multiple polls included in the content components 118 of the social networking system 106. The social networking system 106 may send multiple polls to the social network application 112, where the social network application 112 may display one of the multiple polls as part of the poll feature of the ephemeral content creation functionality. In some cases, the social network application 112 may display a selectable control 1612 that enables the user to cycle through viewing an individual one of the multiple polls.

An operation 1804 includes receiving a second user input to generate a customization of the poll and a selection of the poll from multiple polls to be included in the item of ephemeral content. In some examples, the user 102(1) may select the poll from the multiple polls received from the social networking system 106. In some cases, upon selection of a particular poll of the multiple polls, the social network application 112 may receive a selection from the user 102(1) to customize the topic 1614, the first answer 1616, and/or the second answer 1618 of the poll. Alternatively or additionally, the social network application 112 may present icons that, when selected, provide different customizations that the user 102(1) may include in the item of ephemeral content. For instance, the user 102(1) may use functionality associated with the one or more icons 1702 to add content to customize the item of ephemeral content, such as by changing a color and/or gradient of the background of the poll, downloads, stickers, effects, text, music, GIFs, drawing using touch input or stylus, and the like.

An operation 1806 includes receiving an indication to share the item of ephemeral content with a second user account, where the item of ephemeral content includes the content supplied by the social networking system and the customization in the poll. For example, the user 102(1) may select which of the users 102(2)-102(n) the item of ephemeral content will be shared with via the social networking system 106, such as all or multiple followers of the user 102(1), one or more individually-selected users, a group of pre-selected "Close Friends", and so forth. An operation 1808 includes outputting the item of ephemeral content to the social networking system to be shared with the second user account, as described above.

Example Question Feature

FIGS. 19A-20B are schematic views showing example user interfaces that are usable to implement the techniques described herein for generating content to be shared between users. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the system 100. For example, the interfaces described in this section may be implemented in the context of the system 3200, among others.

FIGS. 19A-20B illustrate example interfaces corresponding to a question feature of a create mode control of an ephemeral content creation functionality. An interface 1900a shown in FIG. 19A corresponds to a first user interface that may be displayed upon selection of a question feature 1902 in the social network application 112 (e.g., in Create Mode of Instagram®). In some examples, the interface 1900a may include a question 1904, and an answer field 1906. The answer field 1906 may enable the users 102(2)-102(n) to provide a text input response to the question 1904 when the user 102(1) shares the item of ephemeral content is shared via the social networking system 106. The social network application 112 may display the question 1904 shown in the interface 1900a as a default question that is displayed when the user 102(1) selects the question feature 1902. Additionally, the interface 1900a may include a selectable control 1908 that, when selected, cycles through multiple pre-populated questions supplied from the content components 118 by the social networking system 106 to the social network application 112.

Figures 19A, 19B, 19C:
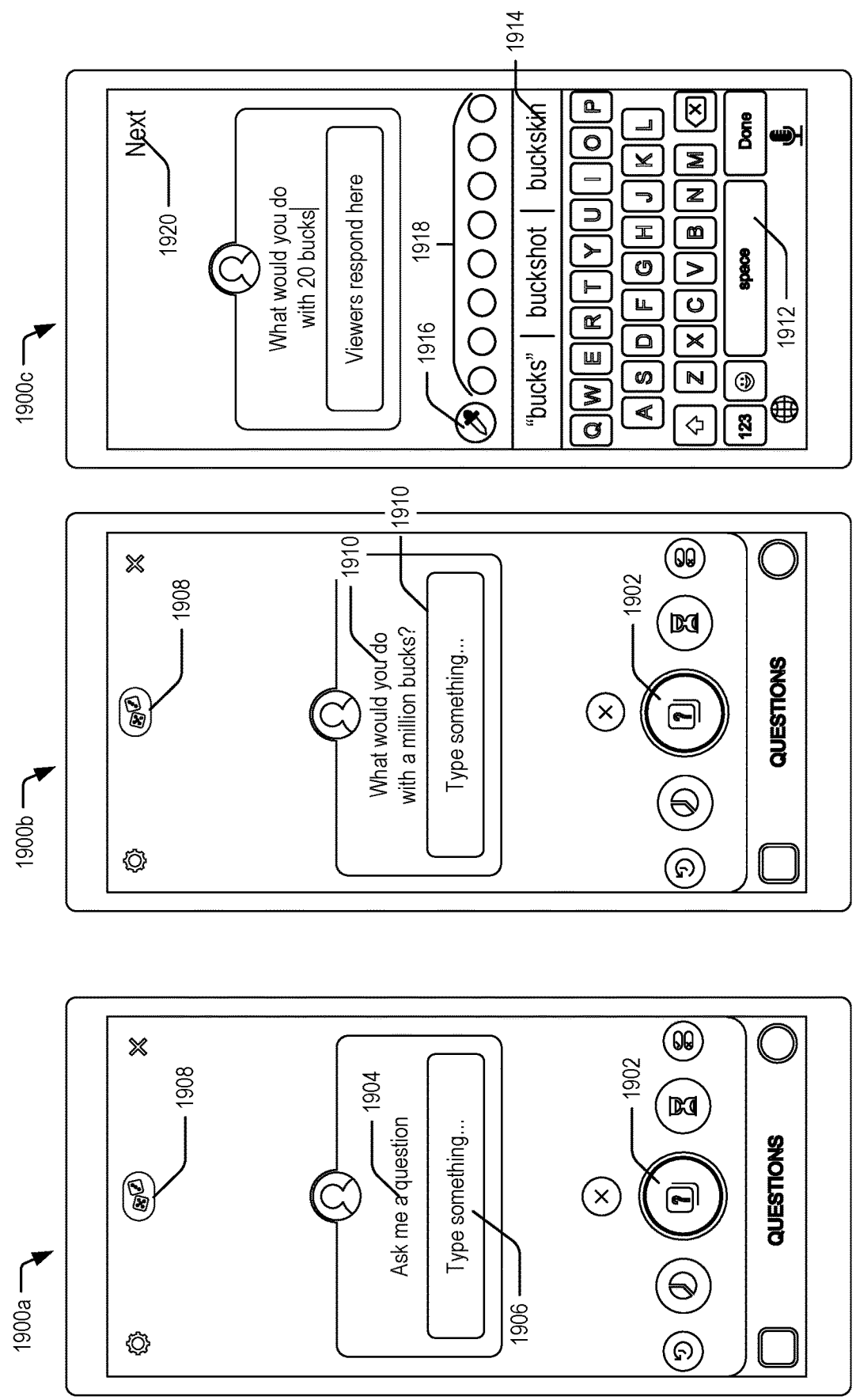
FIGS. 19A-19C and FIGS. 20A and 20B illustrate example interfaces corresponding to a question feature of a create mode control of an ephemeral content creation functionality.

For example, in response to the user 102(1) selecting the selectable control 1908, the social network application 112 may display a user interface 1900b shown in FIG. 19B. The user interface 1900b may include a prepopulated question 1910 (e.g., "what would you do with a million bucks?") prepopulated and output by the social networking system 106 to the social network application 112. In some cases, the user 102(1) may choose the prepopulated question 1910 to share with one or more other users 102(2)-102(n) via the social networking system 106, by selecting the icon associated with the question feature 1902. For instance, selecting the icon associated with the question feature 1902 may cause the social network application 112 to display an interface that includes features similar to those described in relation to FIG. 20A to edit and/or share the item of ephemeral content that includes the question as depicted in the interface 1900b.

In some instances, however, the user 102(1) may want to change an aspect of the prepopulated question 1910 shown in the interface 1900b. The user 102(1) may select the prepopulated question 1910 in the interface 1900b (e.g., by way of a touch input) to edit the prepopulated question 1910. Upon receiving an input to edit the prepopulated question 1910, the social network application 112 may display an interface 1900c shown in FIG. 19C. The interface 1900c may include a keyboard 1912 and/or selectable suggestions 1914 of text and/or emoticons to include in the question 1910. In the illustrated example, the user 102(1) has changed the text of the question 1910 from "what would you do with a million bucks?" to "what would you do with 20 bucks" using the keyboard 1912. Additionally, in some cases, the interface 1900c may include an icon 1916 that, when selected, causes the social network application 112 to remove the keyboard 1912 from being displayed in the interface 1900c, and enables the user 102(1) to select a color of a background of the item of ephemeral content to use as a color of the icon including the question 1910 and the answer field 1906. Further, the interface 1900c may include multiple selectable colors 1918 that the user 102(1) may select to change the color of the icon including the question 1910 and the answer field 1906. In some examples, the user 102(1) may select an icon 1920 ("Next") to complete the item of ephemeral content including the question, as customized.

Figure 20B:
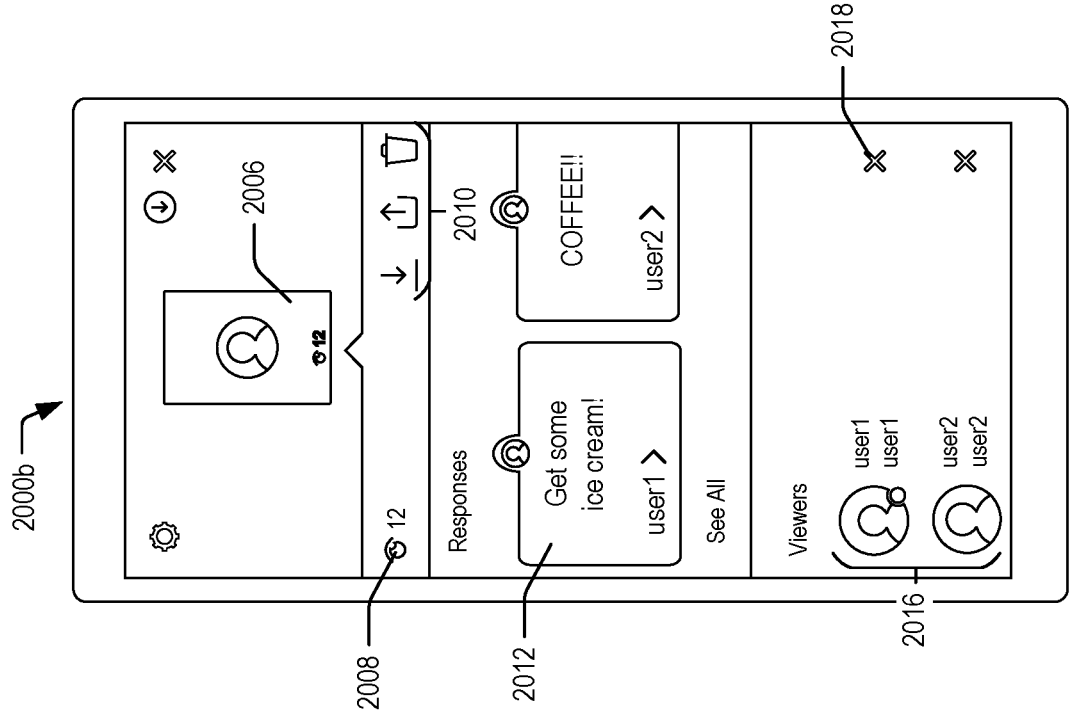
Figure 20A:
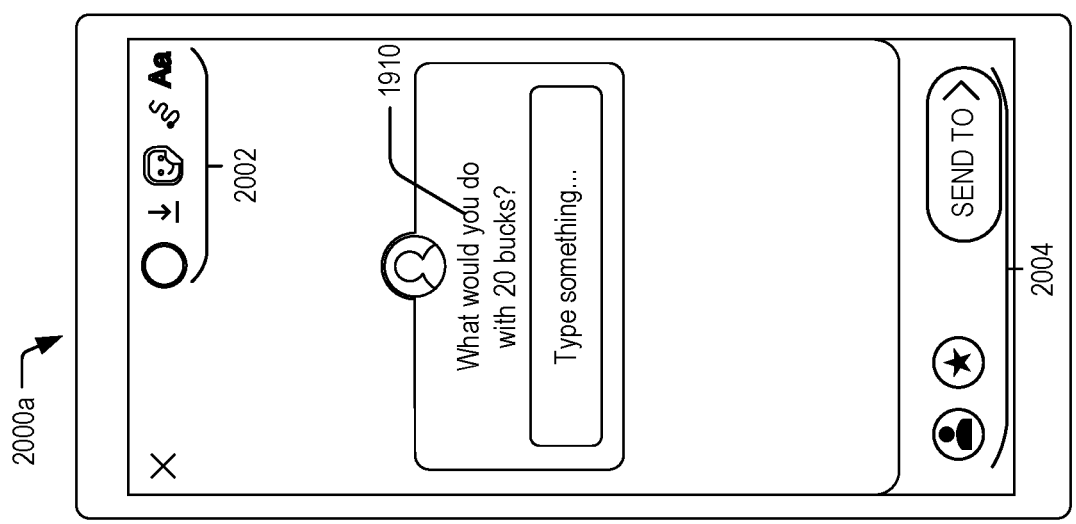

Responsive to receiving the selection of the icon 1920, the social network application 112 may display an interface 2000a shown in FIG. 20A that enables the user 102(1) to further edit and/or share the item of ephemeral content including the question. For instance, the user 102(1) may use functionality associated with one or more icons 2002 to add content to customize the item of ephemeral content, such as by changing a color and/or gradient of the background of the question, downloads, stickers, effects, text, music, GIFs, and the like. The interface 2000a may also include icons 2004 that, when selected, enable the user 102(1) to share the item of ephemeral content including the question.

In some examples, the social network application 112 may provide functionality to view results of the question, such as how many users viewed the question, which users responded to the question, and how individual users responded to the question. An interface 2000b shown in FIG. 20B illustrates an example of a question results interface following the user 102(1) sharing the question shown in the interface 2000a. For example, a representation 2006 is included in the interface 2000b, where the representation corresponds to the question 1910 for which the results are displayed. The interface 2000b may include an icon 2008 noting the number of users who viewed the item of ephemeral content that included the question. In some examples, the interface 2000b may include selectable controls 2010 that enable the user 102(1) to download the results of the question, share the results of the question (e.g., outside of the social networking system 106 such as by SMS message, email, and the like), and/or delete the results of the question, to name a few examples.

In some cases, the interface 2000b may include one or more answer representations 2012 that depict answers provided by the users 102(2)-102(n) to the question 1910. In examples, the user 102(1) may select a representation of the one or more representations 2012 (e.g., by a touch input) to share with one or more of the users 102(2)-102(n) via the social networking system 106. For example, the user 102(1)

may select answers supplied by the users 102(2)-102(*n*) using the one or more representations 2012 to share as an item of ephemeral content in reel media, an item of feed media, and so forth. In examples, the user 102(1) may use a gesture (e.g., a horizontal swipe gesture) to view additional representations corresponding to responses supplied by the users 102(2)-102(*n*) in the interface 2000*b*.

In examples, the interface 2000*b* may include a representation 2014 depicting how individual users viewed the question 1910. For instance, the representation 2014 may include a username associated with a user account that viewed the question 1910. In some cases, the interface 2000*b* may provide one or more selectable controls 2018 that enable the user 102(1) to remove an individual user from the interface 2000*b* who viewed the question. Although not explicitly pictured, the social networking system 106 may send a notification (e.g., a push notification, an instruction to display an icon in a user interface of the social network application 112, etc.) to the social network application 112 when one of the user(s) 102(2)-102(*n*) responds to the question via the social network application 112 on the computing device(s) 104(2)-104(*m*).

Figure 21:
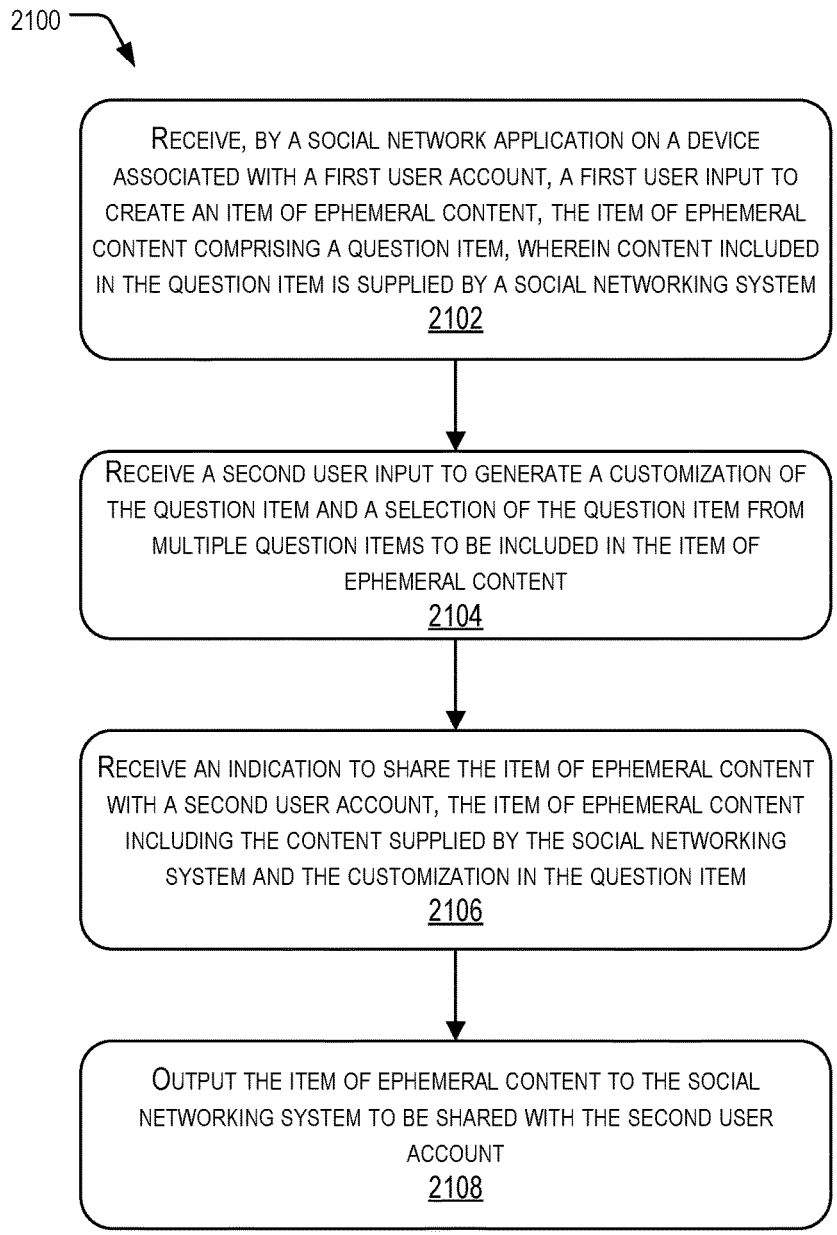
FIG. 21 illustrates an example process for receiving inputs to generate an item of ephemeral content using a question feature of a create mode control of an ephemeral content creation functionality.

FIG. 21 illustrates an example process 2100 for receiving inputs to generate an item of ephemeral content using a question feature of a create mode control of an ephemeral content creation functionality.

An operation 2102 includes receiving, by a social network application on a device associated with a first user account, a first user input to create an item of ephemeral content. The item of ephemeral content may include a question item, where content included in the question item is supplied by a social networking system. In examples, the question item may be one of multiple question items included in the content components 118 of the social networking system 106. The social networking system 106 may send multiple question items to the social network application 112, where the social network application 112 may display one of the multiple question items as part of the question feature of the ephemeral content creation functionality. In some cases, the social network application 112 may display a selectable control 1908 that enables the user to cycle through viewing an individual one of the multiple question items.

An operation 2104 includes receiving a second user input to generate a customization of the question item and a selection of the question item from multiple question items to be included in the item of ephemeral content. In some examples, the user 102(1) may select the question item from the multiple question items received from the social networking system 106. In some cases, upon selection of a particular question item of the multiple question items, the social network application 112 may receive a selection from the user 102(1) to customize the question 1910. Alternatively or additionally, the social network application 112 may present icons that, when selected, provide different customizations that the user 102(1) may include in the item of ephemeral content. For instance, the user 102(1) may use functionality associated with the one or more icons 2002 to add content to customize the item of ephemeral content, such as by changing a color and/or gradient of the background of the question item, downloads, stickers, effects, text, music, GIFs, drawing using touch input or stylus, and the like.

An operation 2106 includes receiving an indication to share the item of ephemeral content with a second user account, where the item of ephemeral content includes the content supplied by the social networking system and the customization of the question item. For example, the user 102(1) may select which of the users 102(2)-102(*n*) the item of ephemeral content will be shared with via the social networking system 106, such as all or multiple followers of the user 102(1), one or more individually-selected users, a group of pre-selected "Close Friends", and so forth. An operation 2108 includes outputting the item of ephemeral content to the social networking system to be shared with the second user account, as described above.

Example Countdown Icon and Feature

FIGS. 22A-24C are schematic views showing example user interfaces that are usable to implement the techniques described herein for generating content to be shared between users. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the system 100. For example, the interfaces described in this section may be implemented in the context of the system 3200, among others.

FIGS. 22A-24C illustrate example interfaces corresponding to countdown feature of a normal mode control and a create mode control of an ephemeral content creation functionality. Similar to FIG. 2A above, an interface 2200*a* shown in FIG. 22A corresponds to a first user interface that may be displayed upon selection of an ephemeral content creation functionality of the social network application 112 (e.g., Stories of Instagram®). For example, the interface 2200*a* may be displayed in response to a gesture (e.g., a horizontal swipe gesture) from a "home" screen and/or a feed of the social network application 112. In other examples, the interface 2200*a* may be displayed by selection of a button, icon, or other control, by voice command, or by other user input. The interface 2200*a* may include functionality similar to that described in relation to FIG. 2A, and/or in relation to a normal mode control 2202 as described throughout this disclosure. For instance, the interface 2200*a* may include a selectable control 2204 that, when selected, causes the computing device 104(1) to capture an image and/or a video using a camera associated with the computing device 104(1).

Figure 22C:
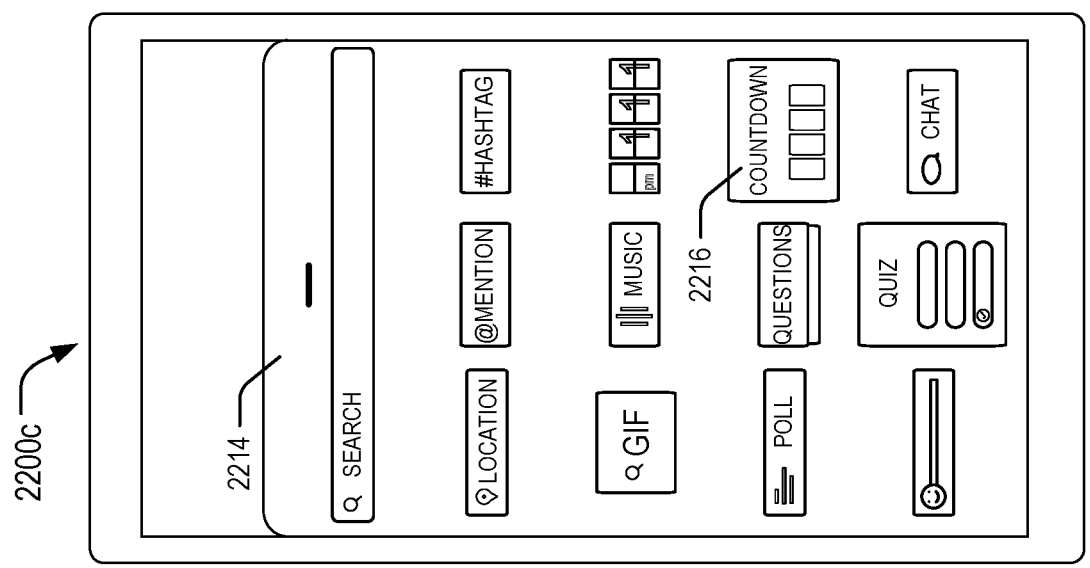
Figure 22B:
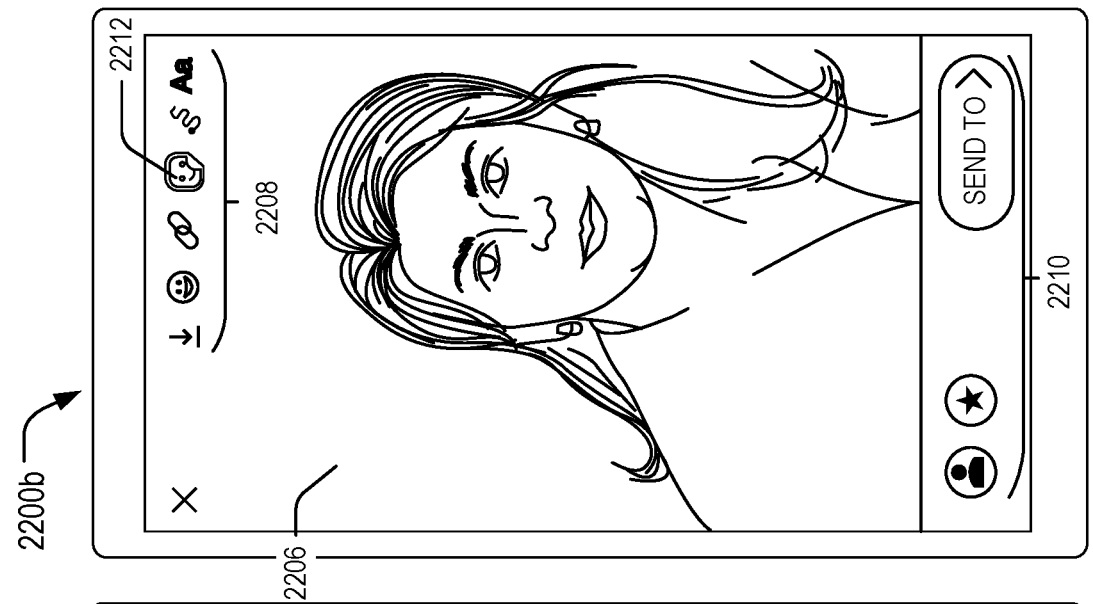
Figure 22A:
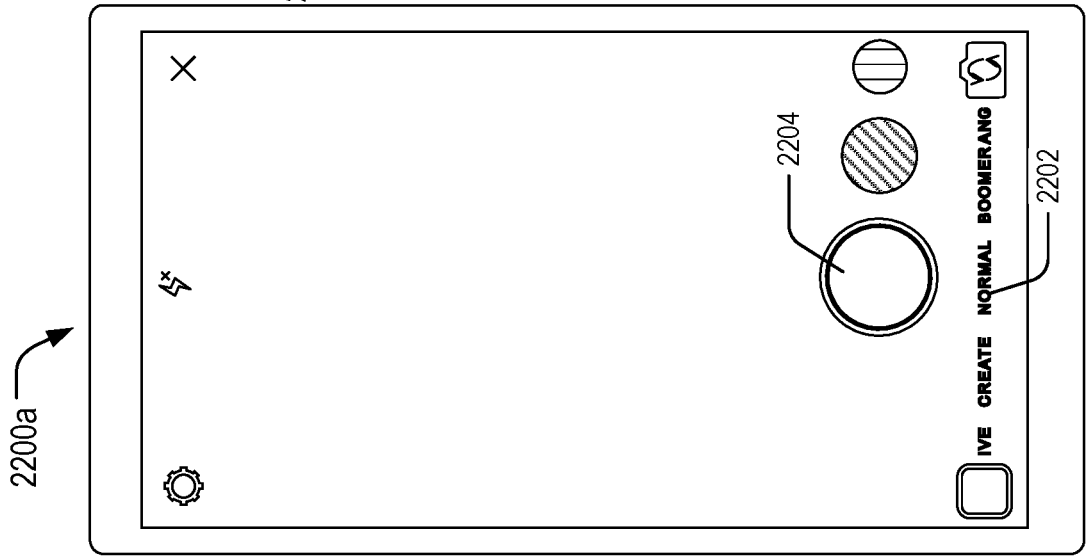

An interface 2200*b* shown in FIG. 22B depicts an image 2206 captured as a result of a selection of the selectable control 2204. Additionally, the interface 2200*b* includes icons 2208 that, when selected, provide functionality associated with the item of ephemeral content. For example, the icons 2208 may be selectable to download (e.g., to storage accessible by the computing device 104(1)) the item of ephemeral content, to apply a filter to the image 2206, options to control branded content (e.g., to tag a business partner included in the item of ephemeral content, to allow the business partner to promote the item of ephemeral content, etc.), to add icons (also referred to as "stickers") to the item of ephemeral content, to add a drawing input to the item of ephemeral content, to add a text input to the item of ephemeral content, and so forth. The interface 2200*b* may also include icons 2210 that, when selected, enable the user 102(1) to share the item of ephemeral content including the image 2206.

As noted above, the icons 2208 may include an icon 2212 that, when selected, enables the user 102(1) to add an icon or sticker to the item of ephemeral content. For example, upon selection of the icon 2212, the social network application 112 may display an interface 2200c shown in FIG. 22C. The interface 2200c includes a menu 2214 of icons supplied from the content components 118 of the social networking system 106. In some examples, the menu 2214 includes an icon 2216 that, when selected from the menu 2214, enables the user 102(1) to add a countdown icon to the item of ephemeral content.

An interface 2300a shown in FIG. 23A illustrates customization options supplied via the social network application 112 responsive to the selection of the icon 2216 to add a countdown icon to the item of ephemeral content. The interface 2300a includes a countdown icon 2302 that is customizable by the user 102(1). For example, the interface 2300a may include a keyboard 2304 and/or selectable suggestions 2306 of text and/or emoticons to include in the countdown icon 2302. In the illustrated example, the user 102(1) has customized a topic 2308 of the countdown 2302 to recite "the weekend" followed by a celebration emoticon using the keyboard 2304. In examples, the interface 2300a may also include a selectable control 2310 that, when selected, cycles through colors, patterns, and/or gradients of a background of the countdown icon 2302.

In addition to customizing the topic 2308 of the countdown icon 2302, the user 102(1) may also customize a time that the countdown icon dynamically counts down to. For example, the social network application 112 may display an interface 2300b shown in FIG. 23B in response to the user 102(1) selecting (e.g., via a touch input) one of multiple time indicators 2312 included in the countdown icon 2302 as shown in the interface 2300a. The interface 2300b includes a menu 2314 that enables the user 102(1) to select a date associated with the topic 2308 of the countdown icon 2302.

For example, the menu 2314 may allow the user 102(1) to scroll through months, days, and years to select an end date for the topic 2308 of the countdown icon 2302. As the user 102(1) changes and selects the end date using the menu 2314, the time indicators 2312 may dynamically update to reflect an amount of time from a current time to the selected end date. While the time indicators 2312 are shown in hours, minutes, and seconds, other time indicators are contemplated as well, including (but not limited to): days, hours, minutes; weeks, days, hours; months, weeks, days; years, months, days; and so forth. Additionally, while three time indicators are shown, any number of time indicators (e.g., 1, 2, 4, 5, etc.) are considered. Further, the interface 2300b may include a toggle 2316 that may switch between the event associated with the topic 2308 to be an all-day event, or to be at a specific time of day. In some examples, the user 102(1) may select an icon 2318 ("Done") to complete the countdown icon 2302, and add the countdown icon 2302 as completed to the item of ephemeral content.

Responsive to receiving the selection of the icon 2318, the social network application 112 may display an interface 2300c shown in FIG. 23C that enables the user 102(1) to further edit and/or share the item of ephemeral content including the image 2206 and the countdown icon 2302. The countdown icon 2302 may appear overlaid on the image 2206 in response to receiving selection of the icon 2308. In some examples, the countdown icon 2302 may dynamically update an amount of time to the event corresponding to the topic 2308 as shown in the time indicators 2312 in the interface 2300c. The interface 2300c may include the icons 2208 and the icons 2210 as well, providing functionality to further edit and/or share the item of ephemeral content as described above.

Once shared with the user(s) 102(2)-102(n), the countdown icon 2302 may dynamically update an amount of time to the event corresponding to the topic 2308 as shown in the time indicators 2312, such that the user(s) 102(2)-102(n) viewing the item of ephemeral content are shown a current amount of time to the event corresponding to the topic 2308 when viewed. In some examples, the countdown icon 2302 may include a selectable control when viewed by the user(s) 102(2)-102(n) (not explicitly shown) that, when selected, allows the user(s) 102(2)-102(n) to follow the countdown, and/or be alerted when the countdown ends (e.g., using a push notification or other notification type). For instance, consider an example in which the user 102(1) is operating a user account of a business and creates the countdown icon 2302 to indicate an amount of time to a product release of the business. In this example, the social networking system 106 may output a notification to user accounts of the user(s) 102(2)-102(n) when the product releases (e.g., when the countdown expires), so that the user(s) 102(2)-102(n) may be reminded to visit the business's website and purchase the desired product. In some cases, the social networking system 106 may output a notification to the user account of the user 102(1) responsive to another user 102(2) following the countdown.

Figure 24C:
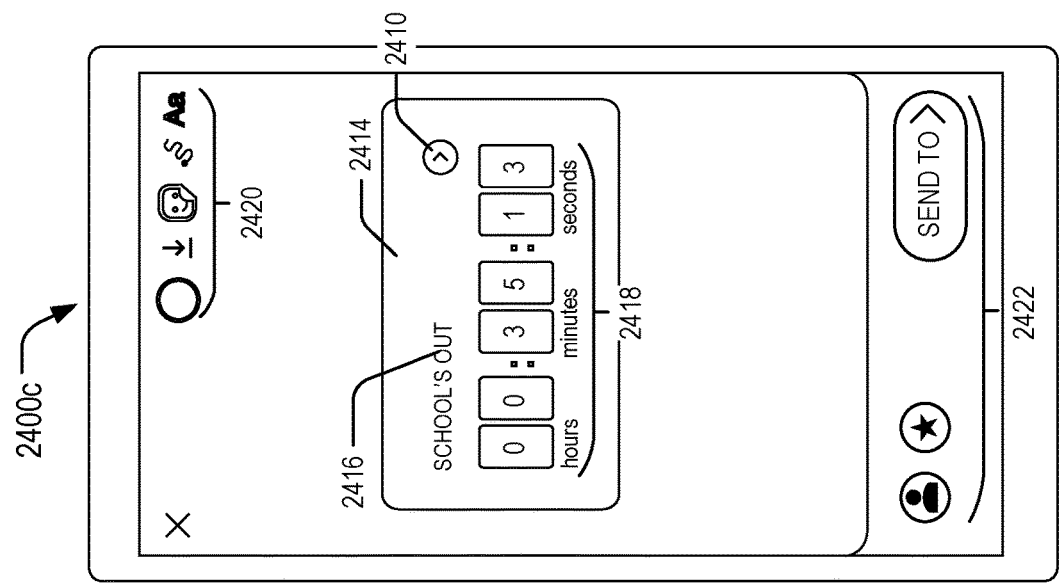
Figure 24B:
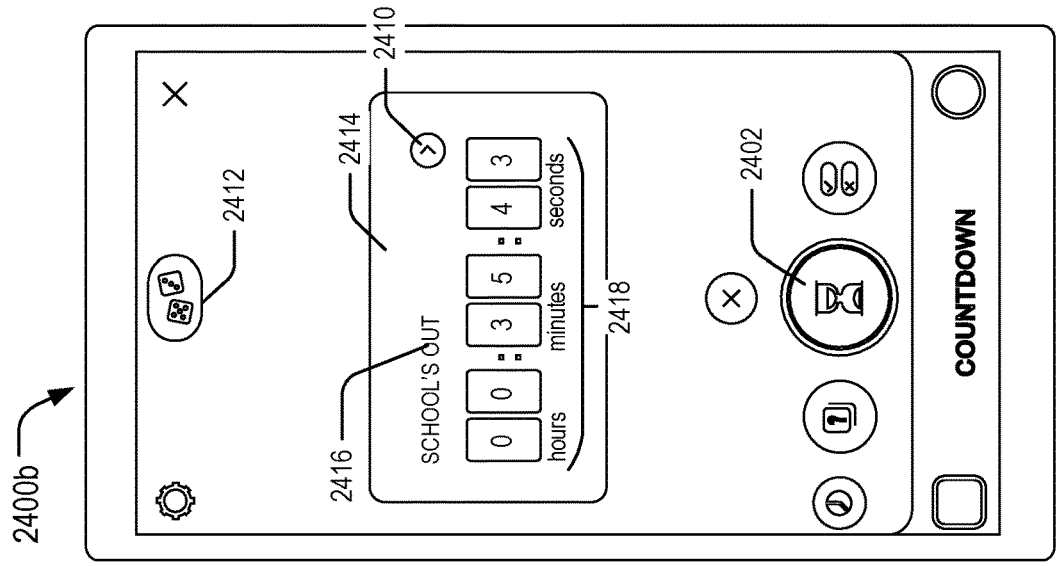
Figure 24A:
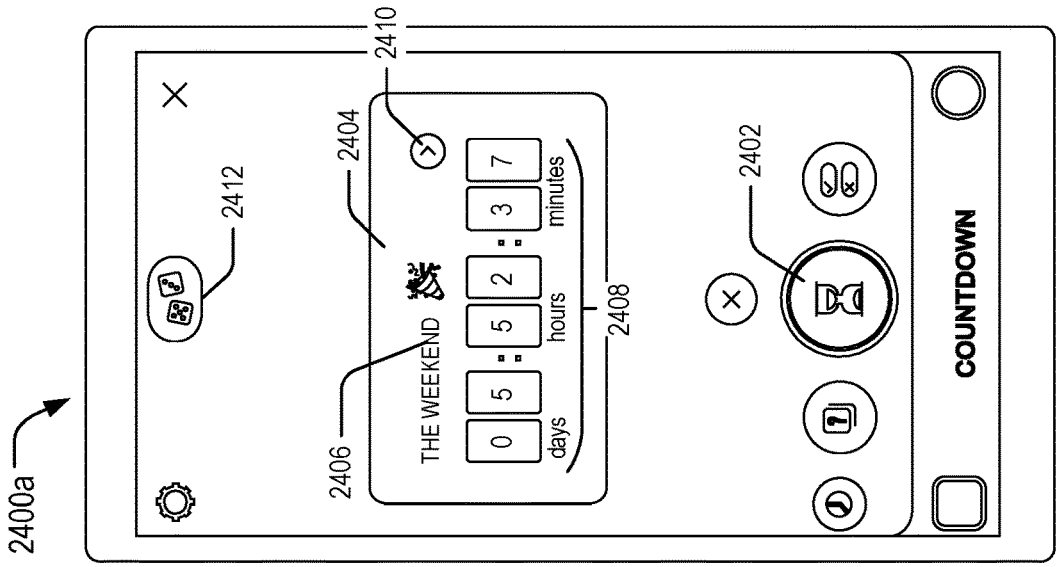

An interface 2400a shown in FIG. 24A corresponds to a first user interface that may be displayed upon selection of a countdown feature 2402 in the social network application 112 (e.g., in Create Mode of Instagram®). In some examples, the interface 2400a may include a prepopulated countdown 2404. For instance, the prepopulated countdown 2404 includes a topic 2406 corresponding to an event, and time indicators 2408 that dynamically update (e.g., by counting down) to a time associated with the event. In the example shown, the topic 2406 is populated with "the weekend," and the time indicators 2408 indicate a number of days, a number of hours, and a number of minutes until the event corresponding to the topic 2406. The social networking system 106 may provide the topic 2406 and/or the time indicators 2408 from the content components 118 to the social network application 112. In some examples, the prepopulated countdown 2404 may include a icon 2410 that, when shared with and viewed by the user(s) 102(2)-102(n), enables the user(s) 102(2)-102(n) to follow the countdown, as described above.

In some cases, the social network application 112 may display the prepopulated countdown 2404 shown in the interface 2400a as a default countdown that is displayed when the user 102(1) selects the countdown feature 2402. Additionally, the interface 2400a may include a selectable control 2412 that, when selected, cycles through multiple pre-populated countdowns supplied from the content components 118 by the social networking system 106 to the social network application 112.

For example, in response to the user 102(1) selecting the selectable control 2412, the social network application 112 may display a user interface 2400b shown in FIG. 24B. The user interface 2400b may include a prepopulated countdown 2414 prepopulated and output by the social networking system 106 to the social network application 112. The prepopulated countdown 2414 includes a topic 2416 corresponding to an event, and time indicators 2418 that dynamically update (e.g., by counting down) to a time associated with the event. In the example shown, the topic 2416 is populated with "school's out," and the time indicators 2418 indicate a number of hours, a number of minutes, and a number of seconds until the event corresponding to the topic 2416. The social networking system 106 may provide the topic 2416 and/or the time indicators 2418 from the content components 118 to the social network application 112.

In some cases, the user 102(1) may choose the prepopulated countdown 2404 and/or the prepopulated countdown 2414 to share with one or more other users 102(2)-102(n) via the social networking system 106, by selecting the icon associated with the countdown feature 2402. For instance, selecting the icon associated with the countdown feature 2402 may cause the social network application 112 to display an interface 2400c shown in FIG. 24C that enables the user 102(1) to further edit and/or share the item of ephemeral content including the selected prepopulated countdown 2414. For instance, the user 102(1) may use functionality associated with one or more icons 2420 to add content to customize the item of ephemeral content, such as by changing a color and/or gradient of the background of the question, downloads, stickers, effects, text, music, GIFs, and the like. The interface 2400c may also include icons 2422 that, when selected, enable the user 102(1) to share the item of ephemeral content including the selected prepopulated countdown 2414. In some examples, the time indicators 2418 may continue to dynamically update in the interface 2400c, as well as continuing to update when the item of ephemeral content is shared and viewed by the user(s) 102(2)-102(n).

In some instances, however, the user 102(1) may want to change an aspect of the prepopulated countdown 2404 and/or the prepopulated countdown 2414 shown in the respective interfaces 2400a and 2400b. The user 102(1) may select the prepopulated countdown 2404 and/or the prepopulated countdown 2414 (e.g., by way of a touch input) to edit the prepopulated countdown 2404 and/or the prepopulated countdown 2414. Upon receiving an input to edit the prepopulated countdown 2404 and/or the prepopulated countdown 2414, the social network application 112 may display an interface similar to the interface 2300a shown in FIG. 23A. The user 102(1) may edit the topic 2406 of the prepopulated countdown 2404 and/or the topic 2416 of the prepopulated countdown 2414 using the functionality described in relation to FIG. 23A. Upon receiving a selection of a time indicator as described above, the social network application 112 may display an interface similar to the interface 2300b shown in FIG. 23B. The user 102(1) may edit the time indicators 2408 of the prepopulated countdown 2404 and/or the time indicators 2418 of the prepopulated countdown 2414 using the functionality described in relation to FIG. 23B. In response to receiving a selection of the icon 2318, the social network application 112 may return to the interface 2400c, enabling the user 102(1) to further edit and/or share the item of ephemeral content including the prepopulated countdown 2404 and/or the prepopulated countdown 2414 as customized.

Figure 25:
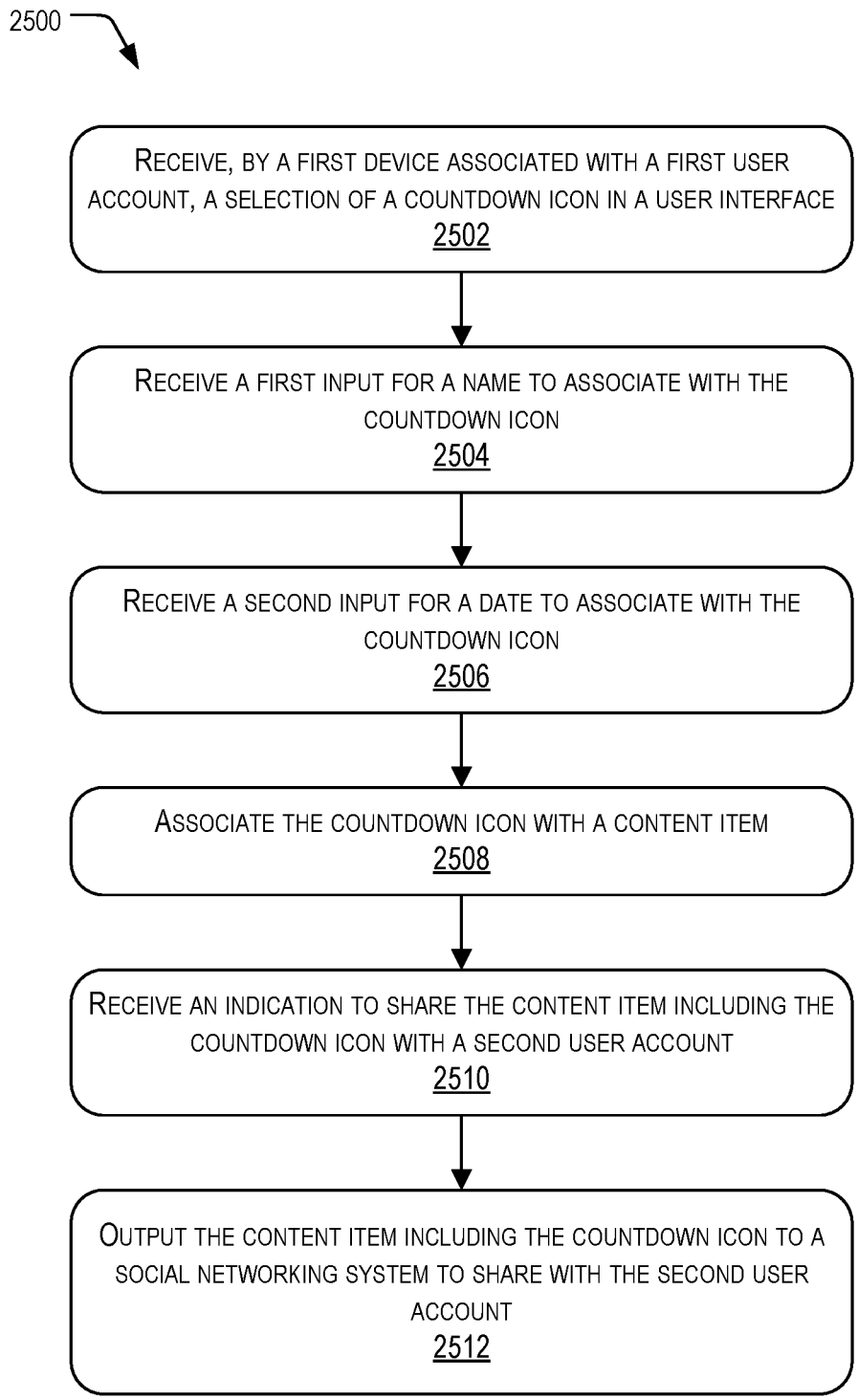
FIG. 25 illustrates an example process for receiving inputs to generate an item of ephemeral content using a countdown feature of a normal mode control of an ephemeral content creation functionality.

FIG. 25 illustrates an example process 2500 for receiving inputs to generate an item of ephemeral content using a countdown feature of a normal mode control of an ephemeral content creation functionality.

An operation 2502 includes receiving, by a first device associated with a first user account, a selection of a countdown icon in a user interface. For example, the social network application 112 may receive a selection of an ephemeral content creation functionality, followed by a selection of a content item (e.g., by capturing an image using a camera associated with the computing device 104(1), from storage accessible by the computing device 104(1), etc.) to include in an item of ephemeral content. The social network application 112 may receive a selection of the icon 2212 to add an icon and/or sticker to the item of ephemeral content, present the menu 2214 in response to the selection, and receive a selection of a countdown icon (e.g., the icon 2216) from the menu 2214.

An operation 2504 includes receiving a first input for a name to associate with the countdown icon. In some examples, the name may correspond to the topic 2308, which may be input using the keyboard 2304, selection of a suggestion provided by the social networking system 106, a voice input, and the like.

An operation 2506 includes receiving a second input for a date to associate with the countdown icon. For instance, the user 102(1) may select the date using the menu 2314 to choose a month, a day, and/or a year to associate with the countdown icon. In some cases, the user 102(1) may select to have the event be an all-day event, which may cause a time associated with the countdown icon be automatically populated using a preset time (e.g., noon, midnight, 9:00 AM, etc.). Alternatively or additionally, the user 102(1) may select a time on the selected date to associate with the countdown icon.

An operation 2508 includes associating the countdown icon with a content item. As discussed above, the user 102(1) may select the content item by capturing an image using a camera associated with the computing device 104(1), from storage accessible by the computing device 104(1), and so forth. The social network application 112 may associate the countdown icon with the content item by overlaying the countdown icon on the content item, for instance.

An operation 2510 includes receiving an indication to share the content item including the countdown icon with a second user account. For example, the user 102(1) may select which of the users 102(2)-102(n) the content item will be shared with via the social networking system 106, such as all or multiple followers of the user 102(1), one or more individually-selected users, a group of pre-selected "Close Friends", and so forth. An operation 2512 includes outputting the content item including the countdown icon to a social networking system to be shared with the second user account, as described above.

Figure 26:
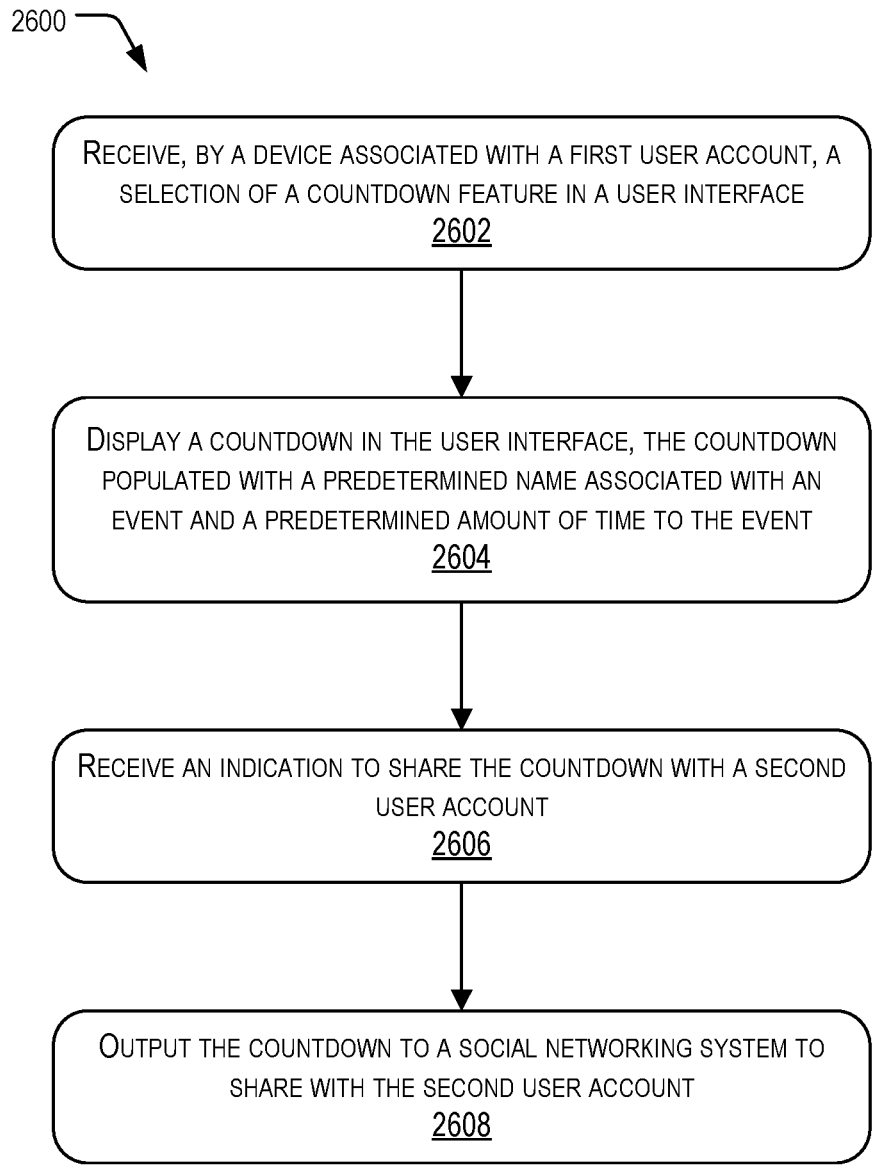
FIG. 26 illustrates an example process for receiving inputs to generate an item of ephemeral content using a countdown feature of a create mode control of an ephemeral content creation functionality.

FIG. 26 illustrates an example process 2600 for receiving inputs to generate an item of ephemeral content using a countdown feature of a create mode control of an ephemeral content creation functionality.

An operation 2602 includes receiving, by a device associated with a first user account, a selection of a countdown feature in a user interface. In some examples, the countdown feature may be included in a create mode control of an ephemeral content creation functionality of the social network application 112.

An operation 2604 includes displaying a countdown in the user interface, where the countdown is populated with a predetermined name associated with an event and a predetermined amount of time to the event. In some examples, the name may correspond to the topic 2406 and/or the topic 2416, provided by the social networking system 106 from the content components 118 to the social network application. Similarly, the predetermined amount of time may correspond to a predetermined time provided by the social networking system 106 from the content components 118 to the social network application. The social network application 112 may dynamically update an amount of time remaining until the event in the time indicators 2408 and/or 2418 after receiving and displaying the countdown from the social networking system 106.

An operation 2606 includes receiving an indication to share the countdown with a second user account. For example, the user 102(1) may select which of the users 102(2)-102(*n*) the countdown will be shared with via the social networking system 106, such as all or multiple followers of the user 102(1), one or more individually-selected users, a group of pre-selected "Close Friends", and so forth. In some examples, the user 102(1) may choose to share the countdown independent of a content item (e.g., an image and/or a video) accessed by the computing device 104(1), such as via a camera associated with the computing device 104(1) and/or storage accessible by the computing device 104(1). An operation 2608 includes outputting the content item including the countdown icon to a social networking system to be shared with the second user account, as described above.

Example Quiz Icon and Feature

FIGS. 27A-29C are schematic views showing example user interfaces that are usable to implement the techniques described herein for generating content to be shared between users. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the system 100. For example, the interfaces described in this section may be implemented in the context of the system 3200, among others.

FIGS. 27A-29C illustrate example interfaces corresponding to quiz feature of a normal mode control and a create mode control of an ephemeral content creation functionality. Similar to FIG. 2A above, an interface 2700*a* shown in FIG. 27A corresponds to a first user interface that may be displayed upon selection of an ephemeral content creation functionality of the social network application 112 (e.g., Stories of Instagram®). For example, the interface 2700*a* may be displayed in response to a gesture (e.g., a horizontal swipe gesture) from a "home" screen and/or a feed of the social network application 112. In other examples, the interface 2700*a* may be displayed by selection of a button, icon, or other control, by voice command, or by other user input. The interface 2700*a* may include functionality similar to that described in relation to FIG. 2A, and/or in relation to a normal mode control 2702 as described throughout this disclosure. For instance, the interface 2700*a* may include a selectable control 2704 that, when selected, causes the computing device 104(1) to capture an image and/or a video using a camera associated with the computing device 104(1).

Figure 27C:
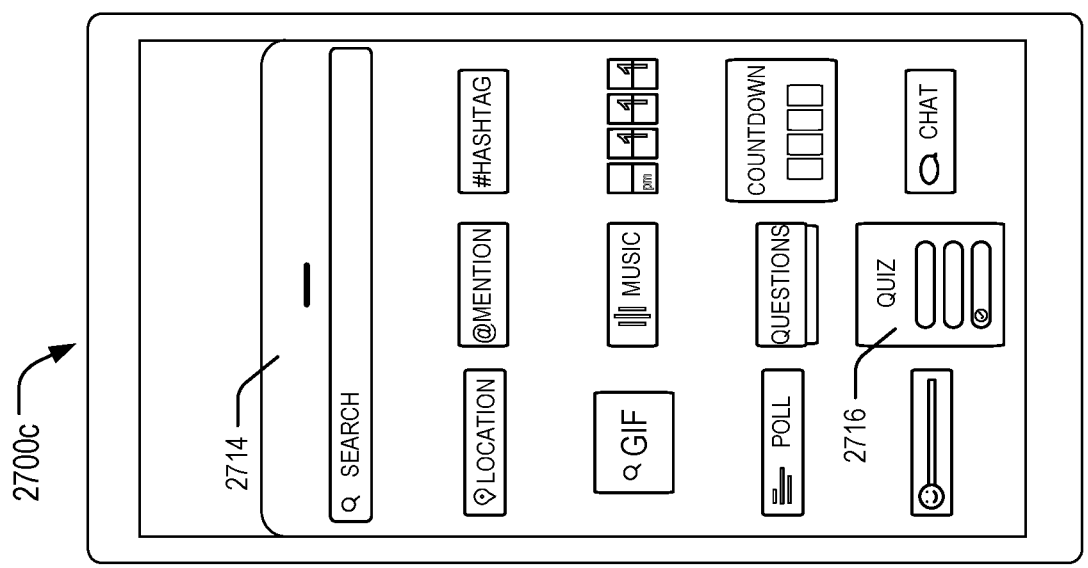
Figure 27B:
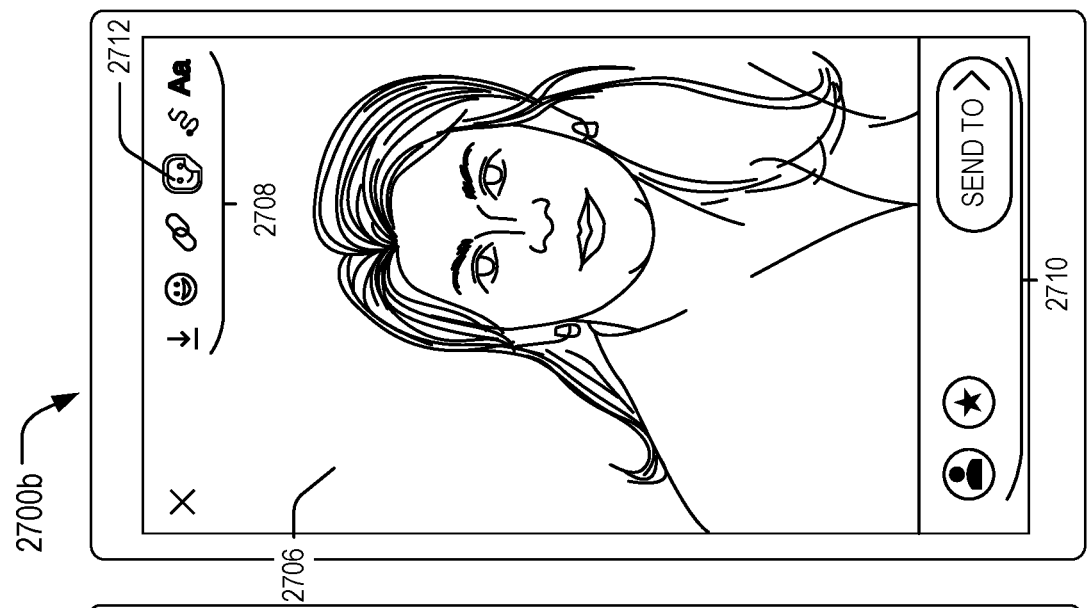
Figure 27A:
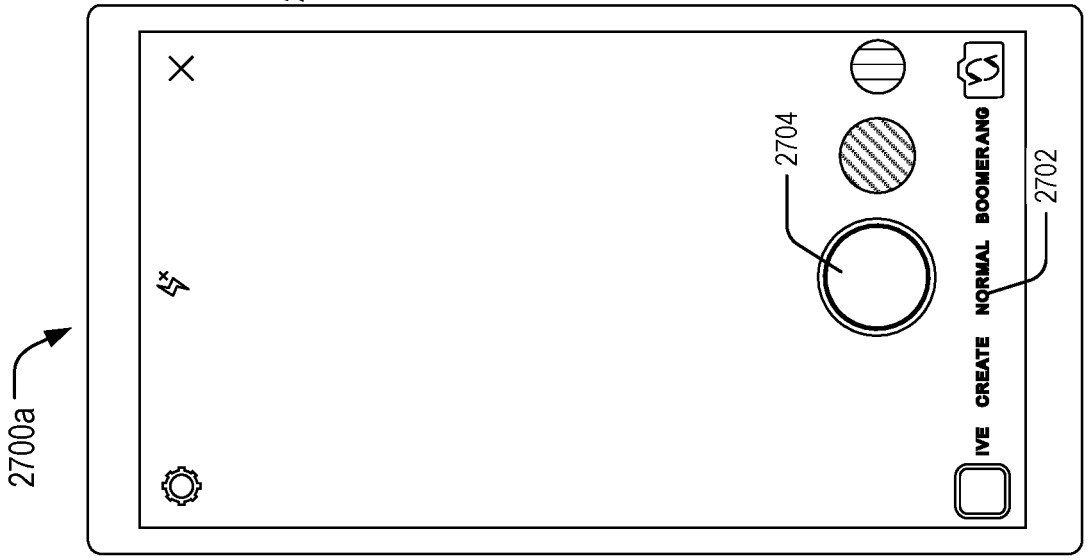

An interface 2700*b* shown in FIG. 27B depicts an image 2706 captured as a result of a selection of the selectable control 2704. Additionally, the interface 2700*b* includes icons 2708 that, when selected, provide functionality associated with the item of ephemeral content. For example, the icons 2708 may be selectable to download (e.g., to storage accessible by the computing device 104(1)) the item of ephemeral content, to apply a filter to the image 2706, options to control branded content (e.g., to tag a business partner included in the item of ephemeral content, to allow the business partner to promote the item of ephemeral content, etc.), to add icons (also referred to as "stickers") to the item of ephemeral content, to add a drawing input to the item of ephemeral content, to add a text input to the item of ephemeral content, and so forth. The interface 2700*b* may also include icons 2710 that, when selected, enable the user 102(1) to share the item of ephemeral content including the image 2706.

As noted above, the icons 2708 may include an icon 2712 that, when selected, enables the user 102(1) to add an icon or sticker to the item of ephemeral content. For example, upon selection of the icon 2712, the social network application 112 may display an interface 2700*c* shown in FIG. 27C. The interface 2700*c* includes a menu 2714 of icons supplied from the content components 118 of the social networking system 106. In some examples, the menu 2714 includes an icon 2716 that, when selected from the menu 2714, enables the user 102(1) to add a countdown icon to the item of ephemeral content.

Figure 28C:
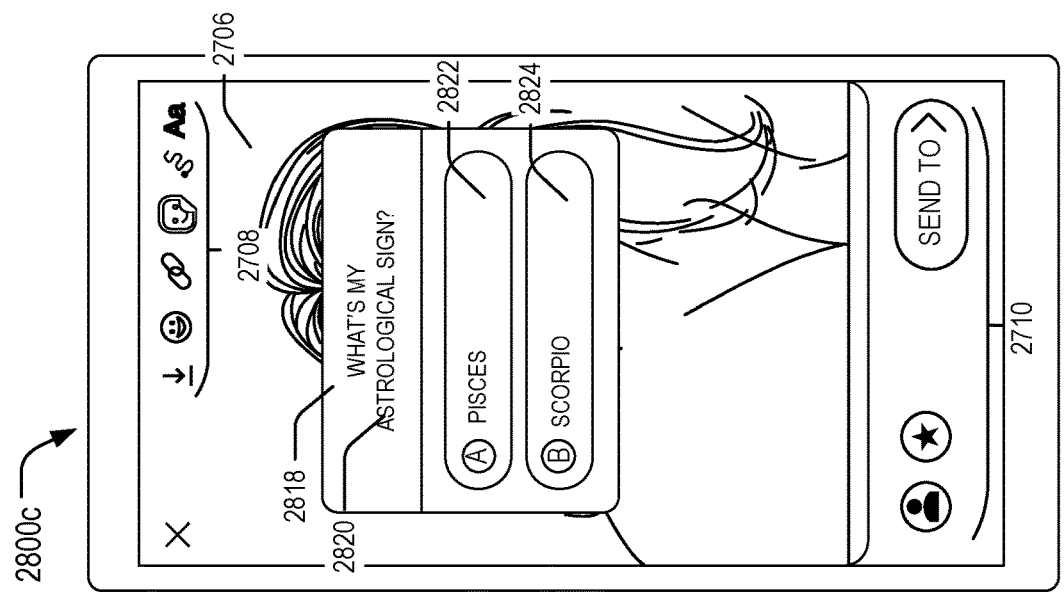
Figure 28B:
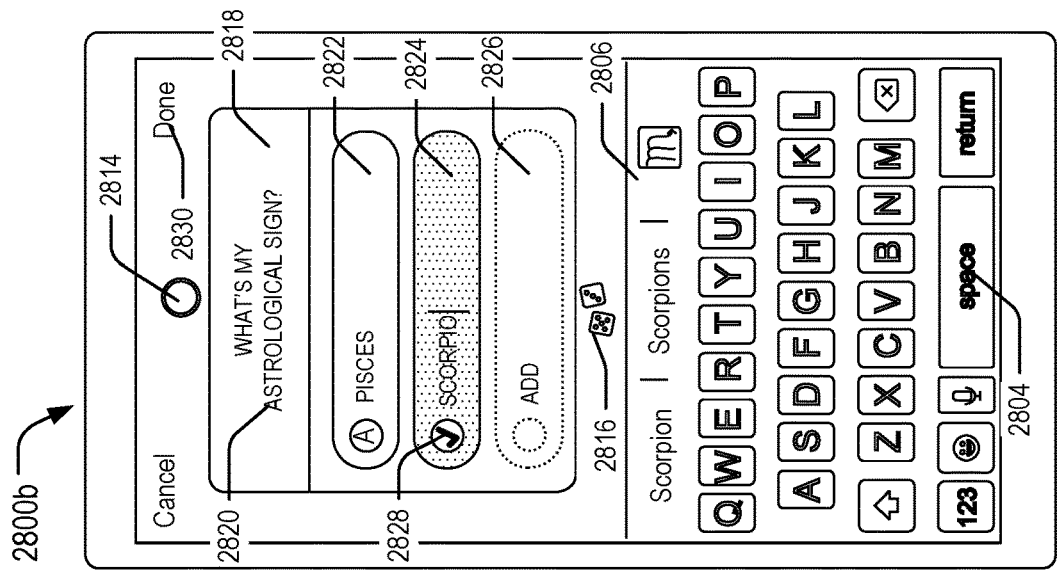
Figure 28A:
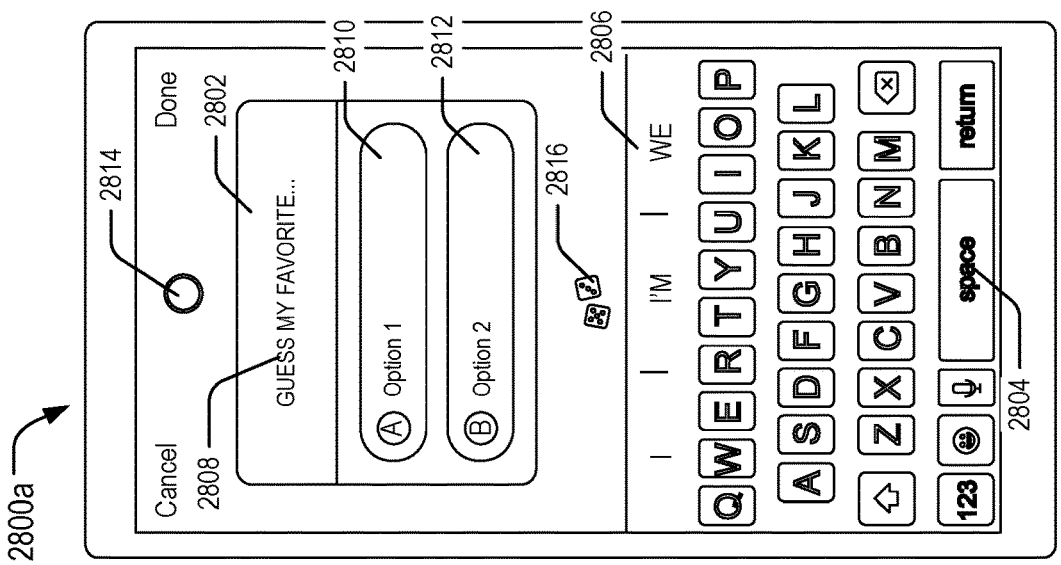

An interface 2800*a* shown in FIG. 28A illustrates customization options supplied via the social network application 112 responsive to the selection of the icon 2716 to add a quiz icon to the item of ephemeral content. The interface 2800*a* includes a quiz icon 2802 that is customizable by the user 102(1). In the illustrated example, the quiz 2802 may be a default quiz presented upon selection of the icon 2716. The quiz 2802 may include a topic 2808, a first answer 2810, and a second answer 2812.

In some cases, the interface 2800*a* may include a keyboard 2804 and/or selectable suggestions 2806 of text and/or emoticons to include in the quiz icon 2802. The user 102(1) may customize the topic 2808, the first answer 2810, the second answer 2812, and/or any additional answers added to the quiz icon 2802 using the keyboard 2804. In examples, the interface 2800*a* may also include a selectable control 2814 that, when selected, cycles through colors, patterns, and/or gradients of a background of the quiz icon 2802. In some cases, the interface 2800*a* may include a selectable control 2816 that, when selected, cycles through prepopulated quiz topics supplied from the content components 118 of the social networking system 106 that replace the topic 2808 in the quiz icon 2802.

For example, the social network application 112 may display an interface 2800*b* shown in FIG. 28B in response to the user 102(1) selecting (e.g., via a touch input) the selectable control 2816 shown in the interface 2800*a*. The interface 2800*b* depicts a quiz icon 2818 received from the content components 118 of the social networking system 106. The quiz icon 2818 may be prepopulated with a topic 2820 (e.g., "what's my astrological sign?"). In some examples, the user 102(1) may use the keyboard 2804 to customize the topic 2820, a first answer 2822, and/or a second answer 2824 of the quiz icon 2818 (e.g., by selecting the topic 2820, the first answer 2822, and/or the second answer 2824 of the quiz icon using a touch input). In some cases, the interface 2800*a* may include a selectable field 2826 that, when selected, enables the user 102(1) to add an additional answer to the quiz icon 2818.

Responsive to receiving at least an input to include as the first answer 2822 and a second input to include as the second answer 2824, the social network application 112 may provide an indication 2828 of a correct answer to the quiz icon 2818. For example, the second answer 2824 is shown in the interface 2800*b* as being the correct answer to the quiz icon 2818, which may be a default selection and/or selected by the user 102(1). The user 102(1) may select an alternate answer as the correct answer to the quiz icon 2818, such as by using a touch input. In some examples, the user 102(1) may select an icon 2830 ("Done") to complete the quiz icon 2818, and add the quiz icon 2818 as completed to the item of ephemeral content.

Responsive to receiving the selection of the icon 2830, the social network application 112 may display an interface 2800c shown in FIG. 28C that enables the user 102(1) to further edit and/or share the item of ephemeral content including the image 2706 and the quiz icon 2818. The quiz icon 2818 may appear overlaid on the image 2706 in response to receiving selection of the icon 2830. The interface 2800c may include the icons 2708 and the icons 2710 as well, providing functionality to further edit and/or share the item of ephemeral content as described above.

Once shared with the user(s) 102(2)-102(n), the quiz icon 2818 may enable the user(s) 102(2)-102(n) to answer the quiz in the social network application 112 on the computing devices 104(2)-104(m). In some examples, the item of ephemeral content that includes the quiz icon 2818 may display an indication when the user(s) 102(2)-102(n) select a correct answer (e.g., a same or similar indication as the indication 2828, a confetti animation, and/or some other indication of success), and/or may display an indication when the user(s) 102(2)-102(n) select an incorrect answer (e.g., an "x" over the selected incorrect answer, along with a same or similar indication as the indication 2828, to name but one example). In some cases, the social networking system 106 may output a notification to the user account of the user 102(1) responsive to another user 102(2) responding to the quiz in the quiz icon 2818.

An interface 2900a shown in FIG. 29A corresponds to a first user interface that may be displayed upon selection of a quiz feature 2902 in the social network application 112 (e.g., in Create Mode of Instagram®). In some examples, the interface 2900a may include a prepopulated quiz 2904. For instance, the prepopulated quiz 2904 includes a topic 2906, a first answer 2908, and a second answer 2910. Although two answers are shown in the prepopulated quiz 2904, examples are considered with more than two (e.g., 3, 4, 5, etc.) answers to the quiz. In the example shown, the topic 2906 is populated with "what's my astrological sign?" while the first answer 2908 and the second answer 2910 include indications for the user 102(1) to select and add inputs for the respective answers. The social networking system 106 may provide the topic 2906 from the content components 118 to the social network application 112. In some examples, the social network application 112 may present a similar interface to the interface 2800b (e.g., including the keyboard 2804 and/or the selectable suggestions 2806) responsive to receiving a selection of the first answer 2908 and/or the second answer 2910, allowing the user 102(1) to customize the answers corresponding to the suggested topic 2906.

In some cases, the social network application 112 may display the prepopulated quiz 2904 shown in the interface 2900a as a default quiz that is displayed when the user 102(1) selects the quiz feature 2902. Additionally, the interface 2900a may include a selectable control 2912 that, when selected, cycles through multiple pre-populated quiz topics supplied from the content components 118 by the social networking system 106 to the social network application 112.

In some cases, the user 102(1) may choose the prepopulated quiz 2904 and the customized first answer 2908 and second answer 2910 to share with one or more other users 102(2)-102(n) via the social networking system 106, by selecting the icon associated with the quiz feature 2902. For instance, selecting the icon associated with the quiz feature 2902 may cause the social network application 112 to display an interface 2900b shown in FIG. 29B that enables the user 102(1) to further edit and/or share the item of ephemeral content including the selected prepopulated quiz 2904. For instance, the user 102(1) may use functionality associated with one or more icons 2914 to add content to customize the item of ephemeral content, such as by changing a color and/or gradient of the background of the question, downloads, stickers, effects, text, music, GIFs, and the like. The interface 2900b may also include icons 2916 that, when selected, enable the user 102(1) to share the item of ephemeral content including the selected prepopulated quiz 2904.

In some instances, however, the user 102(1) may want to change an aspect of the prepopulated quiz 2904 shown in the interfaces 2900a and 2900b, as mentioned above. The user 102(1) may select the prepopulated quiz 2904 (e.g., by way of a touch input) to edit the prepopulated quiz 2904. Upon receiving an input to edit the prepopulated quiz 2904, the social network application 112 may display an interface similar to the interface 2800b shown in FIG. 28B. The user 102(1) may edit the topic 2906 of the prepopulated quiz 2904 using the functionality described in relation to FIG. 28B. In response to receiving a selection of the icon 2830, the social network application 112 may return to the interface 2900b, enabling the user 102(1) to further edit and/or share the item of ephemeral content including the prepopulated quiz 2904 as customized.

In some examples, the social network application 112 may provide functionality to view results of the quiz, such as how many users viewed the quiz, which users responded to the quiz, and how individual users responded to the quiz. An interface 2900c shown in FIG. 29C illustrates an example of a quiz results interface following the user 102(1) sharing the quiz 2904 shown in the interface 2900b, and/or the quiz icon 2818 shown in the interface 2800c. For example, a representation 2918 is included in the interface 2900c, where the representation corresponds to the quiz icon 2818 and/or the quiz 2904 for which the results are displayed. The interface 2900c may include an icon 2920 noting the number of users who viewed the item of ephemeral content that included the quiz. In some examples, the interface 2900c may include selectable controls 2922 that enable the user 102(1) to download the results of the quiz, share the results of the quiz (e.g., outside of the social networking system 106 such as by SMS message, email, and the like), and/or delete the results of the quiz, to name a few examples.

In some cases, the interface 2900c may include a first answer representation 2924 and a second answer representation 2926 that show how many of the users 102(2)-102(n) responded to the first answer 2908 and the second answer 2910 (and/or any additional number of answers included in the quiz), respectively. In examples, the interface 2900c may include a representation 2928 depicting how individual users responded to the quiz. For instance, the representation 2928 may include a username associated with a user account proximate the response provided by a user associated with the user account. In some cases, the interface 2900c may provide one or more selectable controls 2930 that enable the user 102(1) to send a message (e.g., a direct message via the social networking system 106) to a particular user that responded to the quiz. Although not explicitly pictured, the social networking system 106 may send a notification (e.g., a push notification, an instruction to display an icon in a user interface of the social network application 112, etc.) to the social network application 112 on the computing device 104(1) when one of the user(s) 102(2)-102(n) responds to the quiz via the social network application 112 on the computing device(s) 104(2)-104(m).

Figure 30:
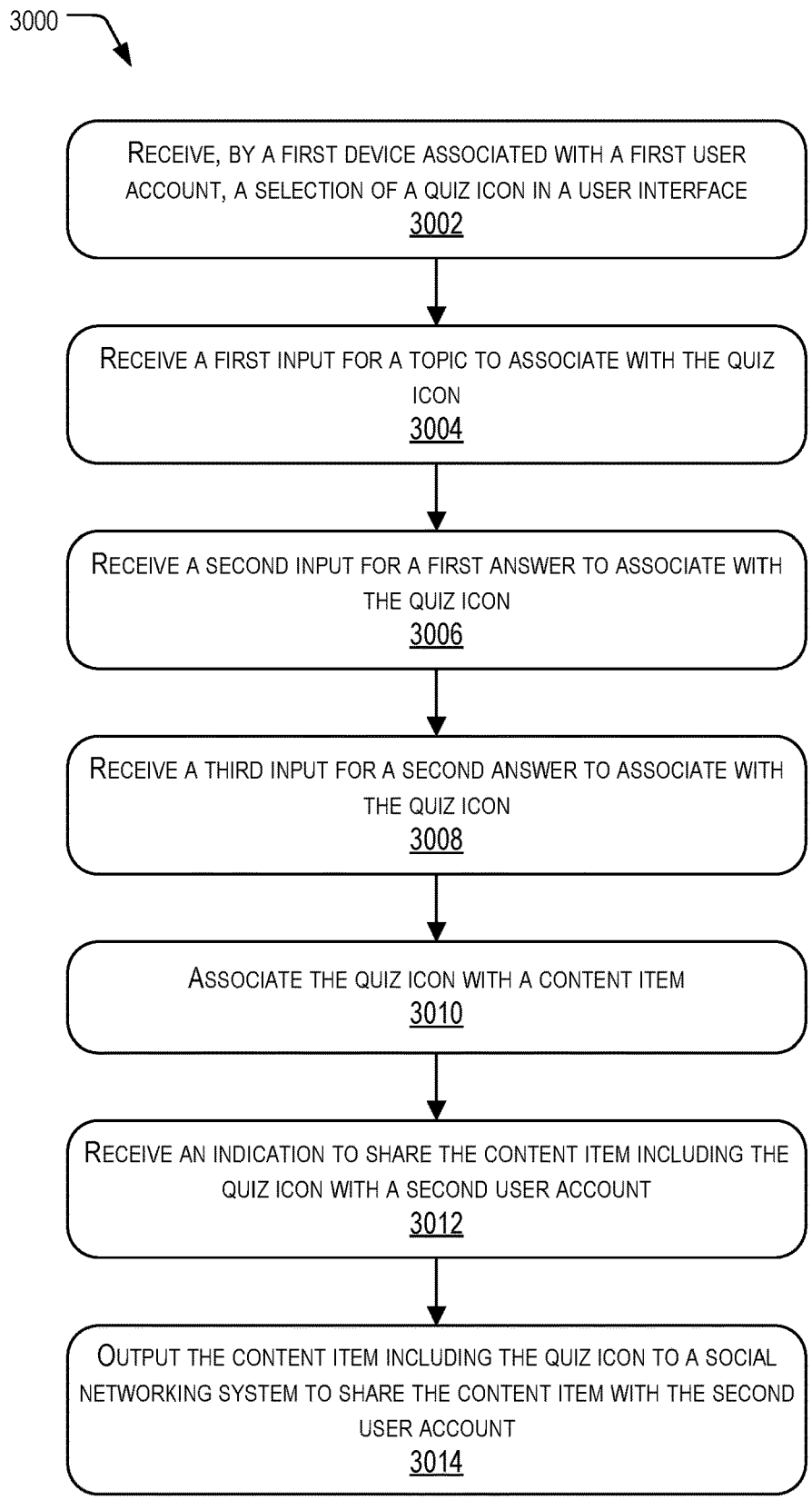
FIG. 30 illustrates an example process for receiving inputs to generate an item of ephemeral content using a quiz feature of a normal mode control of an ephemeral content creation functionality.

FIG. 30 illustrates an example process 3000 for receiving inputs to generate an item of ephemeral content using a quiz feature of a normal mode control of an ephemeral content creation functionality.

An operation 3002 includes receiving, by a first device associated with a first user account, a selection of a quiz icon in a user interface. For example, the social network application 112 may receive a selection of an ephemeral content creation functionality, followed by a selection of a content item (e.g., by capturing an image using a camera associated with the computing device 104(1), from storage accessible by the computing device 104(1), etc.) to include in an item of ephemeral content. The social network application 112 may receive a selection of the icon 2712 to add an icon and/or sticker to the item of ephemeral content, present the menu 2714 in response to the selection, and receive a selection of a quiz icon (e.g., the icon 2716) from the menu 2714.

An operation 3004 includes receiving a first input for a topic to associate with the quiz icon. In some examples, the user 102(1) may input the topic using the keyboard 2804, selection of a suggestion provided by the social networking system 106 in response to selection of the selectable control 2816, a voice input, and the like.

An operation 3006 includes receiving a second input for a first answer to associate with the quiz icon. An operation 3008 includes receiving a third input for a second answer to associate with the quiz icon. In some examples, the user 102(1) may input the first answer and/or the second answer using the keyboard 2804, selection of a suggestion provided by the social networking system 106 in response to selection of the selectable control 2816, a voice input, and the like.

An operation 3010 includes associating the quiz icon with a content item. As discussed above, the user 102(1) may select the content item by capturing an image using a camera associated with the computing device 104(1), from storage accessible by the computing device 104(1), and so forth. The social network application 112 may associate the quiz icon with the content item by overlaying the quiz icon on the content item, for instance.

An operation 3012 includes receiving an indication to share the content item including the quiz icon with a second user account. For example, the user 102(1) may select which of the users 102(2)-102(n) the content item will be shared with via the social networking system 106, such as all or multiple followers of the user 102(1), one or more individually-selected users, a group of pre-selected "Close Friends", and so forth. An operation 3014 includes outputting the content item including the quiz icon to a social networking system to be shared with the second user account, as described above.

Figure 31:
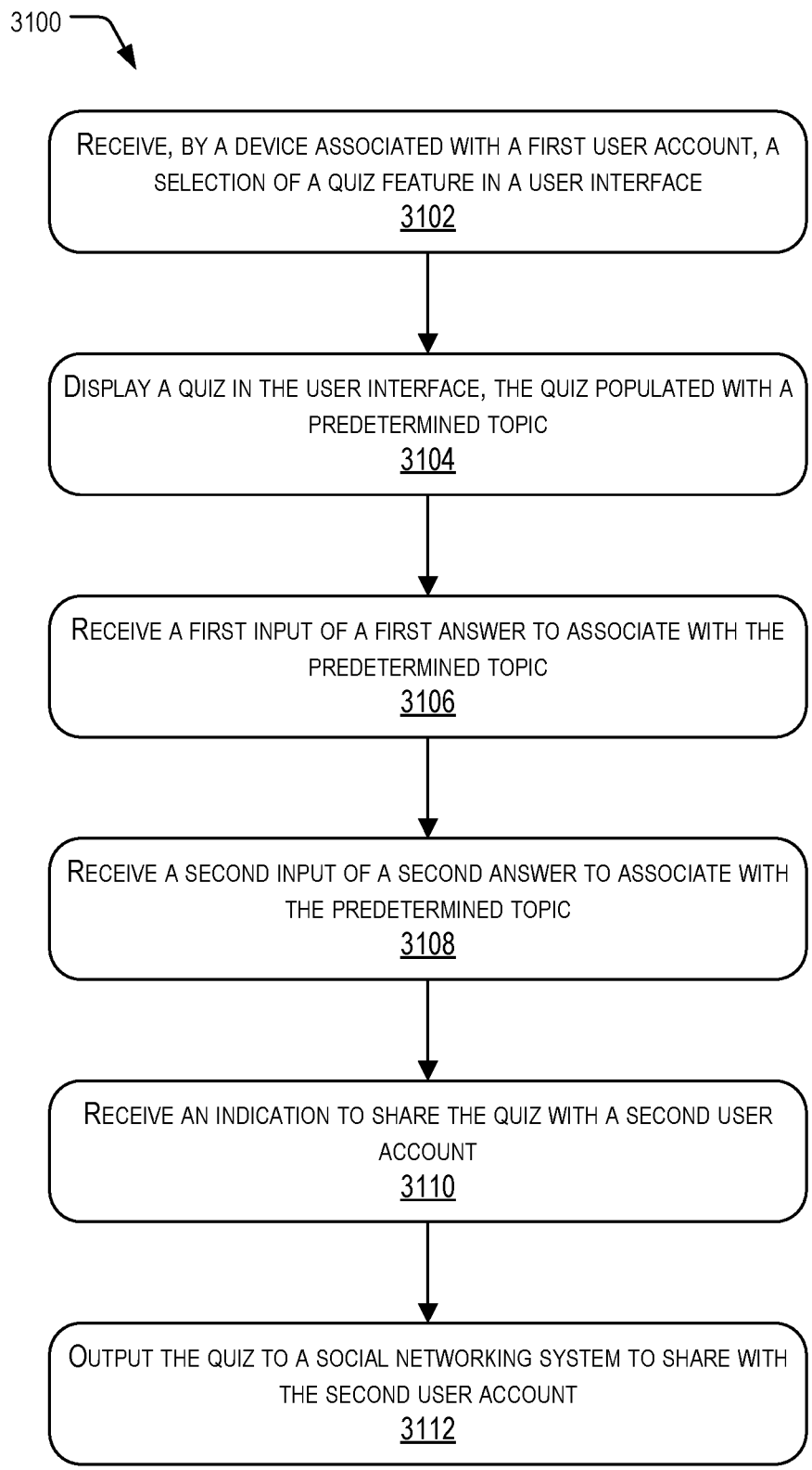
FIG. 31 illustrates an example process for receiving inputs to generate an item of ephemeral content using a quiz feature of a create mode control of an ephemeral content creation functionality.

FIG. 31 illustrates an example process 3100 for receiving inputs to generate an item of ephemeral content using a quiz feature of a create mode control of an ephemeral content creation functionality.

An operation 3102 includes receiving, by a device associated with a first user account, a selection of a quiz feature in a user interface. In some examples, the quiz feature may be included in a create mode control of an ephemeral content creation functionality of the social network application 112.

An operation 3104 includes displaying a quiz in the user interface, where the quiz is populated with a predetermined topic. In some examples, the social networking system 106 may supply the predetermined topic from the content components 118 to the social network application 112. In some cases, the user 102(1) may select the selectable control 2912 to cycle through multiple predetermined topics provided by the social networking system 106 from the content components 118 to the social network application 112.

An operation 3106 includes receiving a first input for a first answer to associate with the predetermined topic. An operation 3108 includes receiving a second input for a second answer to associate with the predetermined topic. In some examples, the user 102(1) may input the first answer and/or the second answer using the keyboard 2804, selection of a suggestion provided by the social networking system 106 in response to selection of the selectable control 2816, a voice input, and the like.

An operation 3110 includes receiving an indication to share the content item including the quiz with a second user account. For example, the user 102(1) may select which of the users 102(2)-102(n) the quiz will be shared with via the social networking system 106, such as all or multiple followers of the user 102(1), one or more individually-selected users, a group of pre-selected "Close Friends", and so forth. An operation 3112 includes outputting the quiz to a social networking system to be shared with the second user account, as described above.

Example Shoutouts Feature

Figure 32:
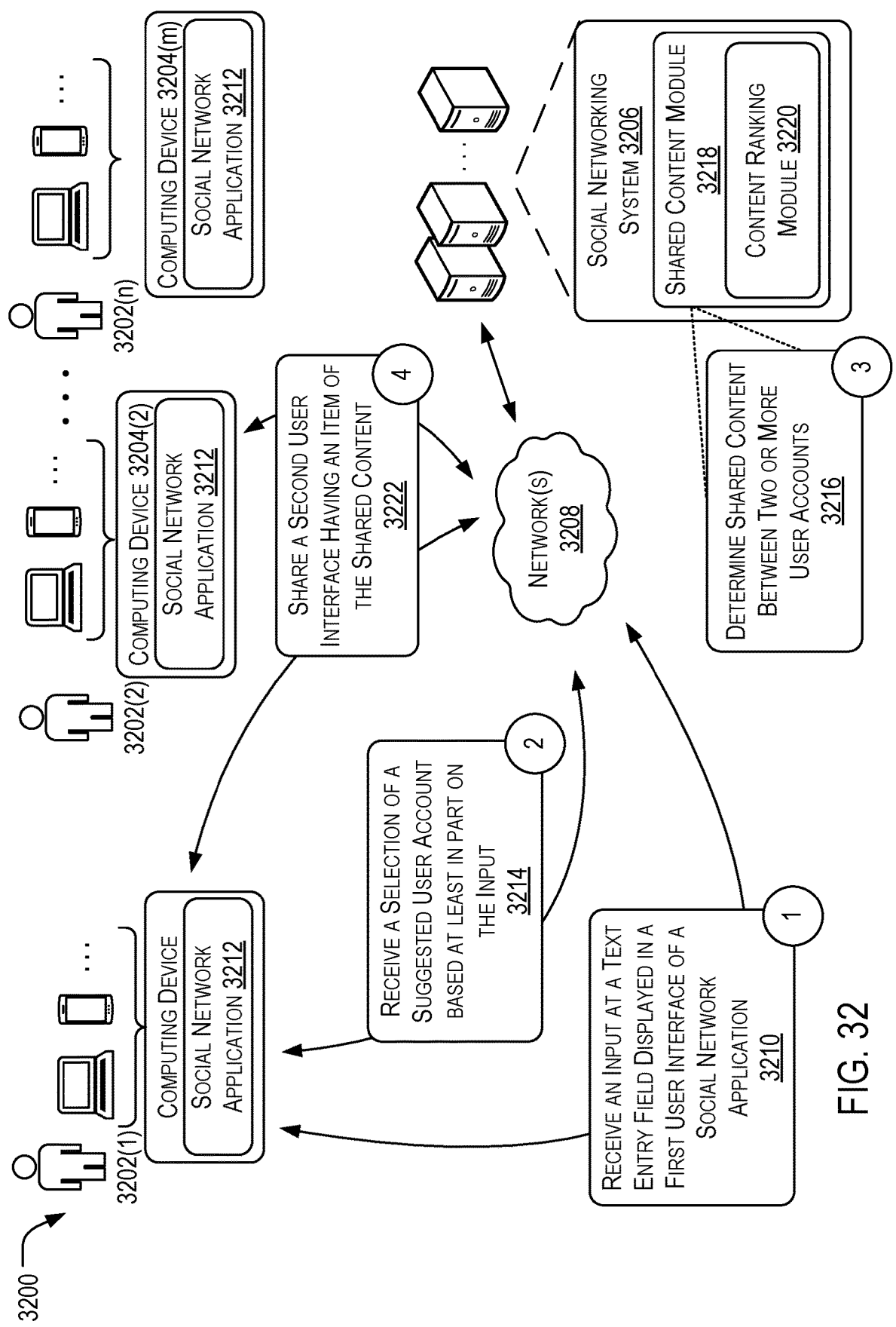
FIG. 32 is a schematic view of an example system usable to implement example techniques described herein.

FIG. 32 is a schematic view of an example computing system 3200 usable to implement example techniques described herein to select content shared between users via the system 3200. In some examples, the system 3200 may include users 3202(1), 3202(2), . . . 3202(n) (collectively "users 3202") to interact using computing devices 3204(1), 3204(2), . . . 104(m) (collectively "computing devices 3204") with a social networking system 3206 via a network 3208. In this example, n and m are non-zero integers greater than 32.

Each of the computing devices 3204 includes one or more processors and memory storing computer executable instructions to implement the functionality discussed herein attributable to the various computing devices. In some examples, the computing devices 3204 may include desktop computers, laptop computers, tablet computers, mobile devices (e.g., smart phones or other cellular or mobile phones, mobile gaming devices, portable media devices, etc.), or other suitable computing devices. The computing devices 3204 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 3208.

The network 3208 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 3204 may access the social networking system 3206 and/or communicate with one another.

The social networking system 3206 may include one or more servers or other computing devices, any or all of which may include one or more processors and memory storing computer executable instructions to implement the functionality discussed herein attributable to the social networking system or digital platform. The social networking system 3206 may enable its users 3202 (such as persons or organizations) to interact with the social networking system 3206 and with each other via the computing devices 3204. The social networking system 3206 may, with input from a user, create and store in the social networking system 3206 a user account associated with the user. The user account may include demographic information, communication-channel information, and information on personal interests of the user. The social networking system 3206 may also, with input from a user, create and store a record of relationships of the user with other users of the social networking system 3206, as well as provide services (e.g., posts, comments, photo-sharing, messaging, tagging, mentioning of other users or entities, games, etc.) to facilitate social interaction between or among the users 3202.

The social networking system 3206 may be configured to provide content creation techniques to the users 3202. For instance, the social networking system 3206 may be configured to select content shared between users that may be used to generate a Shoutout or other content item based on selections made by a user 3202(1).

For example, at operation 3210, (indicated by "1"), a social network application 3212 of the computing device 3204(1) may receive an input at a text entry field displayed in a first user interface of the social network application 3212. For example, the social network application 3212 may display the first user interface associated with creating a Shoutout. The first user interface may include a text entry field that enables the user 3202(1) to enter (e.g., via a digital or analog keyboard, voice input, or other input mechanism) a name associated with a second user account. In examples, the name may be a username of the second user account, or a name of a user associated with the second user account (e.g., given name, pseudonym, etc.). In some cases, the input may correspond to a portion of the name associated with the second user account. The social network application 3212 may send the input to the social networking system 3206, which may determine one or more user accounts associated with the users 3202(2)-3202(n) that may correspond to the input. Alternatively or additionally, the social network application 3212, may determine one or more user accounts associated with the users 3202(2)-3202(n) that may correspond to the input, without sharing the input with the social networking system 3206.

In some cases, the social network application 3212 may provide additional functionality as part of the first user interface, allowing the user 3202(1) to customize different aspects of the first user interface. For example, the social network application 3212 may provide a selectable control to change a salutation associated with the Shoutout. For instance, example salutations may include "Happy Birthday," "Thanks," "Happy Anniversary," "Congratulations," "Happy Holidays," "Miss You," and so forth. In some examples, the social network application 3212 may display animations associated with the respective salutations, such as a confetti burst with "Happy Birthday," floating hearts with "Happy Anniversary," or shining stars with "Thanks," to name a few examples.

At operation 3214 (indicated by "2"), the social network application 3212 of the computing device 3204(1) may receive a selection of a suggested user account, where the suggested user account is based at least in part on the input. For instance, once the social network application 3212 receives a portion of a name associated with a second user account, the social network application 3212 may populate a portion of the first user interface with one or more suggested user accounts that may correspond to the input. The suggested user account(s) displayed in the first user interface may include username(s) associated with the suggested user account(s), profile image(s) associated with the suggested user account(s), or other indicators that identify the suggested user account(s). In some examples, the suggested user account(s) may correspond to user accounts associated with the users 3202(2)-3202(n).

In some examples, the suggested user account(s) displayed in the first user interface of the social network application 3212 may be selectable by the user 3202(1). The user 3202(1) may select a suggested user account (e.g., a user account associated with the user 3202(2)) by completing typing (or speaking) the name associated with a suggested user account, selecting a suggested user account displayed in the first user interface with an input (e.g., touch input, mouse input, etc.), and the like. In response to receiving the selection, the social network application 3212 may send the selection of the suggested user account to the social networking system 3206.

At operation 3216 (indicated by "3"), a shared content module 3218 of the social networking system 3206 may determine shared content between two or more user accounts. Continuing with the above example in which the first user 3202(1) selects a user account associated with the second user 3202(2), the shared content module 3218 may determine shared content between the first user account associated with the first user 3202(1) and a second user account associated with the second user 3202(2). As discussed above, shared content refers to content associated with two (or more) user accounts, which in this case may correspond to the first user account associated with the first user 3202(1) and the second user account associated with the second user 3202(2).

In some examples, the shared content may be based on one of the two user accounts tagging the other in a post, one of the two user accounts liking the other's post, one of the two user accounts commenting on the other's post, and so forth. The shared content module 3218 may identify shared content by determining content that falls into one or more of these examples. Alternatively or additionally, the shared content module 3218 may employ facial recognition techniques to identify content that includes the second user 3202(2) and may also include the user 3202(1), that was previously distributed by the user accounts of the user(s) 3202(1) and/or 3202(2). Other techniques that the shared content module 3218 may use to determine shared content may include comparisons of locations associated with the user accounts at a time an item of content was generated, voice recognition of the user 3202(1) and/or the user 3202(2) in an item of content, and so on.

In many cases, the shared content module 3218 may identify multiple items of shared content between the first user account and the second user account. In such cases, a content ranking module 3220 of the shared content module 3218 may score and/or rank the multiple items of shared content based on a number of factors including (but not limited to) engagement with each of the multiple items of shared content, whether there is a person detected in each of the multiple items of shared content, recency of each of the multiple items of shared content, and so forth. In but one example, the content ranking module 3220 may assign a score to each of the multiple items of shared content on a scale between 0 and 1 (although any suitable scale may be used). The content ranking module 3220 may assign a score to reel media (e.g., ephemeral media, stories, and the like) according to the following:

| | |
|---|---|
| Base Score | 0.4 |
| If reshared | Adjust score to 0.9 |
| If has_person | Add 0.6 to Base Score |
| If same_day | Add 0.2 to cumulative score |

Where the range of the reel media score will be between 0.4 and 1.0. Additionally, in some cases, the content ranking module 3220 may assign a score to feed media (e.g., profile posts) according to the following:

Engagement Score=(likes$_{count}$+5*comments$_{count}$)*(1+ ((max$_{time}$−current$_{time}$)/(max$_{time}$−min$_{time}$))

Feed Media Score=(Engagement Score− min$_{Engagement\ Score}$)/(max$_{Engagement\ Score}$− min$_{Engagement\ Score}$)

Where the feed media score may add 0.2 if the post was made on the same day, and the feed media score is a score between 0 and 1. The maximum time and minimum time may correspond to the most recent and least recent times that individual ones of the multiple items of shared content were previously distributed. Additionally, the maximum and minimum engagement scores may correspond to the highest and lowest engagement scores for individual ones of the multiple items of shared content. In some examples, the content ranking module 3220 may filter out reel media that comprises music added to the reel media, and/or filter out reel media containing reshares of content originally shared by a third-party user account. In examples, the content ranking component 3220 may rank the multiple items of shared content based on scores assigned to individual ones of the multiple items of shared content (e.g., lowest to highest, highest to lowest, etc.).

At operation 3222 (indicated by "4"), the social networking system 3206 shares a second user interface having an item of shared content with at least the first user account associated with the user 3202(1). The social network application 3212 may display the second user interface with the item of shared content included. If a single item of shared content is received, the social network application 3212 may populate the Shoutout to include the single item of shared content. In some examples, the second user interface may include multiple items of shared content ranked as by the content ranking module 3220, such that a highest ranked (e.g., highest scoring) item of shared content appears in a top or top-left portion of the second user interface. Additional item(s) of shared content may follow down and/or down and to the right based on descending scores assigned to the respective items of shared content.

The social network application 3212 may, in some cases, receive one or more selections of items of shared content presented to the user 3202(1) in the second user interface. In some examples, the social network application 3212 may generate the Shoutout based on an order of selections of items of shared content by the user 3202(1). For instance, a first item of shared content selected first by the user 3202(1) may appear first in the Shoutout, a second item of shared content selected second by the user 3202(1) may appear second in the Shoutout, a third item of shared content selected third by the user 3202(1) may appear third in the Shoutout, and so forth. In some cases, the social network application 3212 may populate the Shoutout with the selected multiple items of content to play sequentially in the selected order when viewed in the social network application 3212. Other formats for multiple shared content items within a Shoutout are also considered, including allowing viewing users to swipe through multiple content items within the Shoutout, displaying the multiple content items in a tile format within the Shoutout, and so forth.

In some examples, the user 3202(1) may want to also include media stored in other locations (e.g., locally on the computing device 3204(1) and/or on a cloud storage system accessible by the computing device 3204(1)). Therefore, the social network application 3212 may provide a selectable option in the second user interface that, when selected by the user 3202(1), gives the user access to select content items stored in other locations to include in the Shoutout. In some cases, the social network application 3212 may display each of the selected content items in the selected order in a portion of the second user interface, and may enable the user 3202(1) to change the order of the selected content items (e.g., by dragging a content item to a different place in the order). Additionally, in some cases, the social network application 3212 may provide the user 3202(1) with selectable controls to add stickers, overlay text, emojis, GIFs, and the like to the Shoutout.

The operation 3222 may also include sharing the Shoutout with one or more of the users 3202(2)-3202(n). For example, the user 3202(1) may select an option in the second user interface to share the Shoutout with followers of the user 3202(1). The social networking application 3212 may send the completed Shoutout, including selected shared content and any additional content such as stickers, overlay text, emojis, GIFs, and the like, to the social networking system 3206. The social networking system 3206 may then distribute the Shoutout to the users 3202(2)-3202(n) identified by the user 3202(1). When the computing devices 3204(2)-3204(m) display the Shoutout to the users 3202(2)-3202(n), the social network application 3212 may display the selected shared content in a sequential order (or in another display fashion as described above), allowing the users 3202(2)-3202(n) to view the selected shared content in a single post rather than in individual posts shared by the user 3202(1).

FIGS. 33A-34C are schematic views showing example user interfaces that are usable to implement the techniques described herein for selecting content shared between users. The interfaces and/or the notifications may be generated by a computing device of a social networking system (e.g., social networking system 3206) and transmitted to one or more user computing devices (e.g., computing devices 3204) for presentation, and/or the interfaces may be generated by the one or more user computing devices based at least in part on instructions received from the social networking system 3206. As discussed above, the interfaces described in this section may, but need not, be implemented in the context of the system 3200.

FIGS. 33A-33C illustrate example interfaces usable to present and select a user to send a Shoutout message. Interface 3300a shown in FIG. 33A corresponds to a first user interface that may be displayed upon selection of a Shoutouts feature 3302 in the social network application 3212 (e.g., in Create Mode of Instagram®). The interface 3300a may include a selectable control 3304, which, when selected, may cause a salutation 3306 associated with the Shoutout, a color of a background of the Shoutout, and/or an animation associated with the Shoutout to change. Additionally, in some examples, the interface 3300a may include a text entry field 3308. The text entry field 3308 may include an indicator 3310 (in this example, an "@" symbol) that indicates to the user 3202(1) to enter a name associated with another user account of the social networking system 3206 in the text entry field 3308.

Interface 3300b shown in FIG. 33B illustrates a keyboard 3312 which may be displayed upon selection of the text entry field 3308 of FIG. 33A. In this example, the user 3202(1) has entered a username "username00" in the text entry field 3308, such as by using the keyboard 3312. In some cases, the social network application 3212 may display suggested user accounts 3314 upon receiving at least a portion of the username entered in the text entry field 3308. The social networking system 3206 may determine the suggested user accounts 3314 determined based on a similarity between text entered into the text entry field 3308 and user names or names included in the user accounts of the respective users, as described above. The social network application 3212 may receive a selection of the user account associated with "username00" in the interface 3300b, such as by selection of an icon 3316 of the user account, and/or selection of an icon 3318 ("Next") to proceed to the next step of generating the Shoutout.

Interface 3300c in FIG. 33C illustrates a content selection interface, which may provide functionality for the user 3202(1) to select shared content to be included in the Shoutout. The interface 3300c includes a content preview 3320, which may provide a preview of how the shared content will look once the Shoutout is distributed to other users 3202(2)-3202(n). Additionally, in examples, the interface 3300c includes one or more content thumbnails 3322, which may show individual items of shared content that are to be included in the Shoutout. An emphasized thumbnail 3324 may correspond to an item of shared content that is currently being displayed in the content preview 3320. Icons 3326 may provide functionality, when selected, for the user 3202(1) to add additional content to further customize the Shoutout, such as filters, downloads, links, stickers, effects, text, and the like. Additionally, an icon 3328 may, when selected by the user 3202(1), enable the user to select content to include in the Shoutout from the social networking system 3206.

Figure 34C:
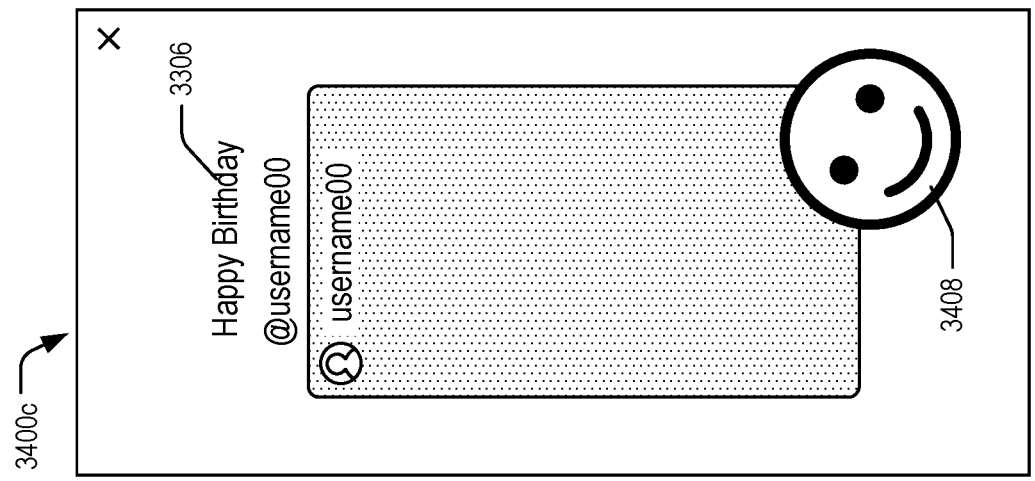
FIGS. 34A-34C illustrate example interfaces usable to select content to include in a Shoutout message.
Figure 34B:
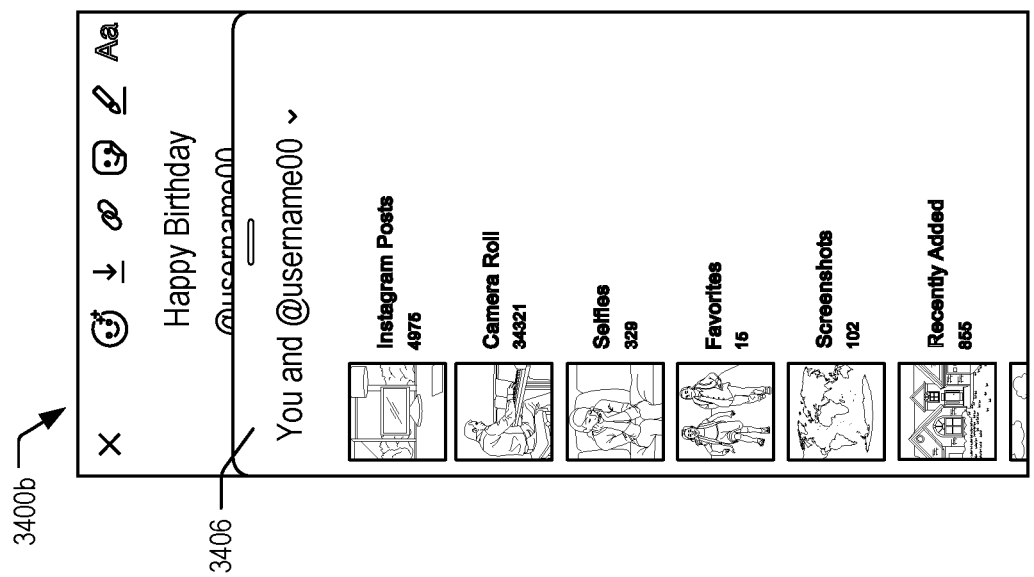
Figure 34A:
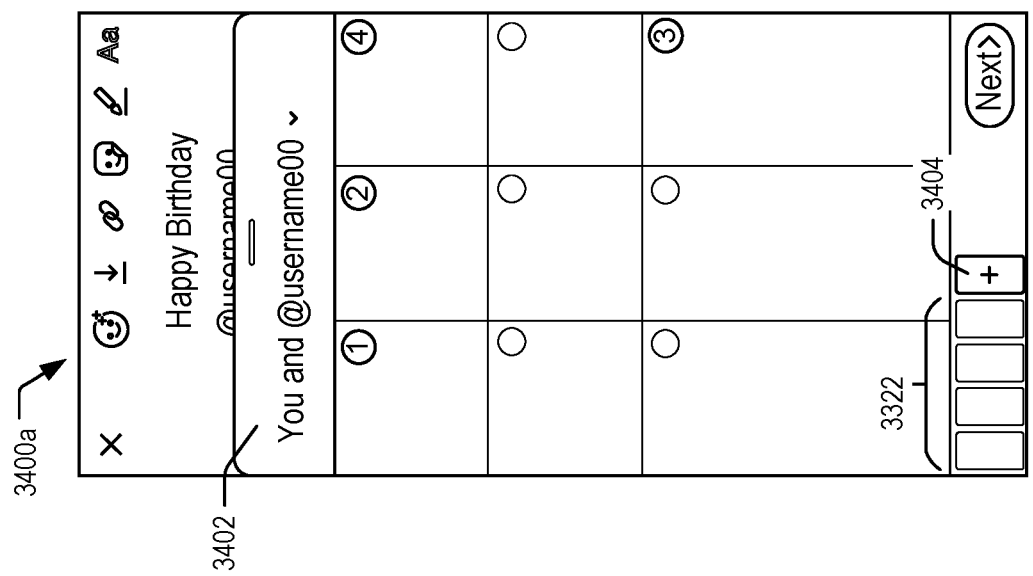

For instance, interface 3400a in FIG. 34A illustrates a menu 3402 that may be displayed in response to the user 3202(1) selecting the icon 3328. The menu 3402 may include tiles that depict different items of content shared between the user account of the user 3202(1) and the selected user account. In this example, the user 3202(1) has selected four items of shared content to be included in the Shoutout from previously distributed shared content between the two users via the social networking system 3206 (indicated by the numbers "1," "2," "3," and "4"). In some cases, the numbers may correspond to an order in which the user 3202(1) selected the items of shared content, and may in turn dictate the order in which the items of shared content are presented in the Shoutout. Further, the items of shared content may be displayed in the order according to the numbers in the content thumbnails 3322. In some examples, the user 3202(1) may wish to select content from additional sources to be included in the Shoutout, such as from storage of the computing device 3204(1), and/or a cloud storage platform. Accordingly, the user 3202(1) may select an icon 3404 to access content stored in other locations to include in the Shoutout.

Interface 3400b in FIG. 3B illustrates a menu 3406 that may be displayed in response to the user 3202(1) selecting the icon 3404. The menu 3406 may include selectable options of content locations that are accessible to the social network application 3212. As noted above, the menu may access content stored on storage of the computing device 3204(1) and/or cloud storage locations, to name a few examples. In the menu 3406, the additional content has been categorized as well, e.g., as Instagram® posts, camera roll, selfies, favorites, screenshots, recently added, and so forth.

Interface 3400c in FIG. 34C illustrates a completed Shoutout that may be viewed by the user 3202(1), and/or distributed to one or more of the users 3202(2)-3202(n) via the social networking system 3206 as described above. In examples, the Shoutout includes the salutation 3306 selected in the interface 3300a, the username of the user account selected in interface 3300b, the shared content selected in interfaces 3300c-3400b, and a sticker 3408 that may have been selected by the user 3202(1) to overlay a portion of the Shoutout. Although not explicitly pictured, the Shoutout may also include one or more animations associated with the salutation 3306 as well.

Figure 35:
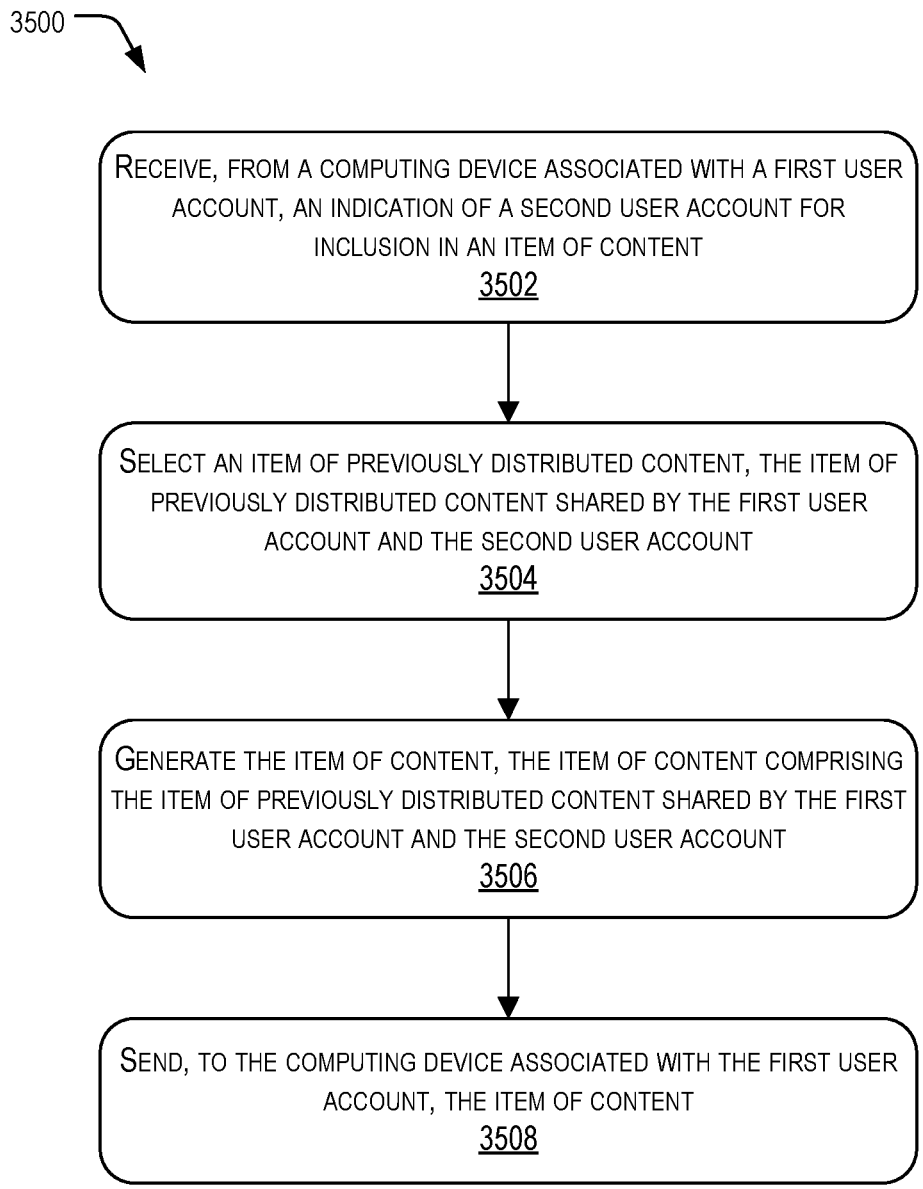
FIG. 35 illustrates an example process for generating a Shoutout message based on content shared between user accounts.

FIG. 35 illustrates an example process 3500 for generating a Shoutout message based on content shared between user accounts. Various methods are described with reference to the example system of FIG. 32 for convenience and ease of understanding. However, the methods described are not limited to being performed using the system of FIG. 32 and may be implemented using systems and devices other than those described herein. For example, the methods may be performed using the system of FIG. 1.

An operation 3502 includes receiving, from a computing device associated with a first user account, an indication of a second user account for inclusion in an item of content. For example, the user 3202(1) may input at least a portion of a name associated with a user account of the user 3202(2) into a text entry field displayed by the computing device 3204(1). In some cases, the social network application 3212 may display, in response to the input in the text entry field, suggested user accounts that correspond to the input. The user 3202 may select, from the suggested user accounts, the user account of the user 3202(2) (e.g., via a touch input).

An operation 3504 includes selecting an item of previously distributed content, the item of previously distributed content shared by the first user account and the second user account. As discussed above, shared content refers to content associated with two (or more) user accounts, which in this case may correspond to the first user account associated with the first user 3202(1) and the second user account associated with the second user 3202(2). In some examples, the shared content may be based on one of the two user accounts tagging the other in a post, one of the two user accounts liking the other's post, one of the two user accounts commenting on the other's post, and so forth. In cases where there are multiple shared items of content, the content ranking component 3220 may rank the shared items of content, as described above.

An operation 3506 includes generating the item of content, the item of content comprising the item of previously distributed content shared by the first user account and the second user account. If a single item of shared content is received, the social network application 3212 may populate the Shoutout to include the single item of shared content. In examples where multiple items of shared content are received, the social network application 3212 may generate the Shoutout based on an order of selections of items of shared content by the user 3202(1). For instance, a first item of shared content selected first by the user 3202(1) may appear first in the Shoutout, a second item of shared content selected second by the user 3202(1) may appear second in the Shoutout, a third item of shared content selected third by the user 3202(1) may appear third in the Shoutout, and so forth. In some cases, the social network application 3212 may populate the Shoutout with the selected multiple items of content to play sequentially in the selected order when viewed in the social network application 3212.

An operation 3508 includes sending, to the computing device associated with the first user account, the item of content. In examples, the user 3202(1) may select an option to share the Shoutout with followers of the user 3202(1). The social networking application 3212 may send the completed Shoutout, including selected shared content and any additional content such as stickers, overlay text, emojis, GIFs, and the like, to the social networking system 3206. The social networking system 3206 may then distribute the Shoutout to the users 3202(2)-3202(n) identified by the user 3202(1). When the computing devices 3204(2)-3204(m) display the Shoutout to the users 3202(2)-3202(n), the social network application 3212 may display the selected shared content in a sequential order (or in another display fashion as described above), allowing the users 3202(2)-3202(n) to view the selected shared content in a single post rather than in individual posts shared by the user 3202(1).

Figure 36:
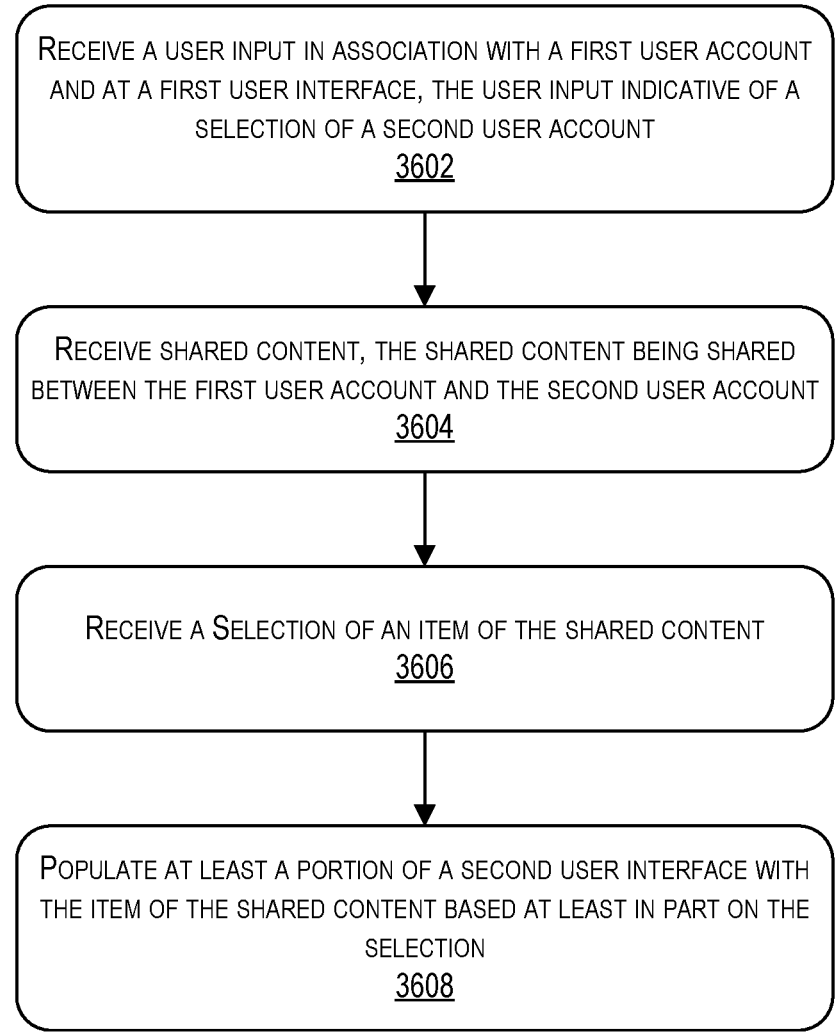
FIG. 36 illustrates an example process for receiving selections usable to generate a Shoutout message.

FIG. 36 illustrates an example process 3600 for receiving selections usable to generate a Shoutout message.

An operation 3602 includes receiving a user input in association with a first user account and at a first user interface, the user input indicative of a selection of a second user account. For example, the user 3202(1) may input at least a portion of a name associated with a user account of the user 3202(2) into a text entry field displayed by the computing device 3204(1). In some cases, the social network application 3212 may display, in response to the input in the text entry field, suggested user accounts that correspond to the input. The user 3202 may select, from the suggested user accounts, the user account of the user 3202 (2) (e.g., via a touch input).

An operation 3604 includes receiving shared content, the shared content being shared between the first user account and the second user account. As discussed above, shared content refers to content associated with two (or more) user accounts, which in this case may correspond to the first user account associated with the first user 3202(1) and the second user account associated with the second user 3202(2). In some examples, the shared content may be based on one of the two user accounts tagging the other in a post, one of the two user accounts liking the other's post, one of the two user accounts commenting on the other's post, and so forth. In cases where there are multiple shared items of content, the content ranking component 3220 may rank the shared items of content, as described above.

An operation 3606 includes receiving a selection of an item of the shared content. For instance, the social network application 3212 may receive multiple items of shared content from the social networking system 3206, in an order ranked by the content ranking component 3220. The social network application 3212 may receive a selection, by the user 3202(1), of one or more if the items of shared content received from the social networking system 3206 to include in the Shoutout.

An operation 3608 includes populating at least a portion of a second user interface with the item of the shared content based at least in part on the selection. If a single item of shared content is received, the social network application 3212 may populate the Shoutout to include the single item of shared content. In examples where multiple items of shared content are received, the social network application 3212 may generate the Shoutout based on an order of selections of items of shared content by the user 3202(1). For instance, a first item of shared content selected first by the user 3202(1) may appear first in the Shoutout, a second item of shared content selected second by the user 3202(1) may appear second in the Shoutout, a third item of shared content selected third by the user 3202(1) may appear third in the Shoutout, and so forth. In some cases, the social network application 3212 may populate the Shoutout with the selected multiple items of content to play sequentially in the selected order when viewed in the social network application 3212.

Example System and Device

Figure 37:
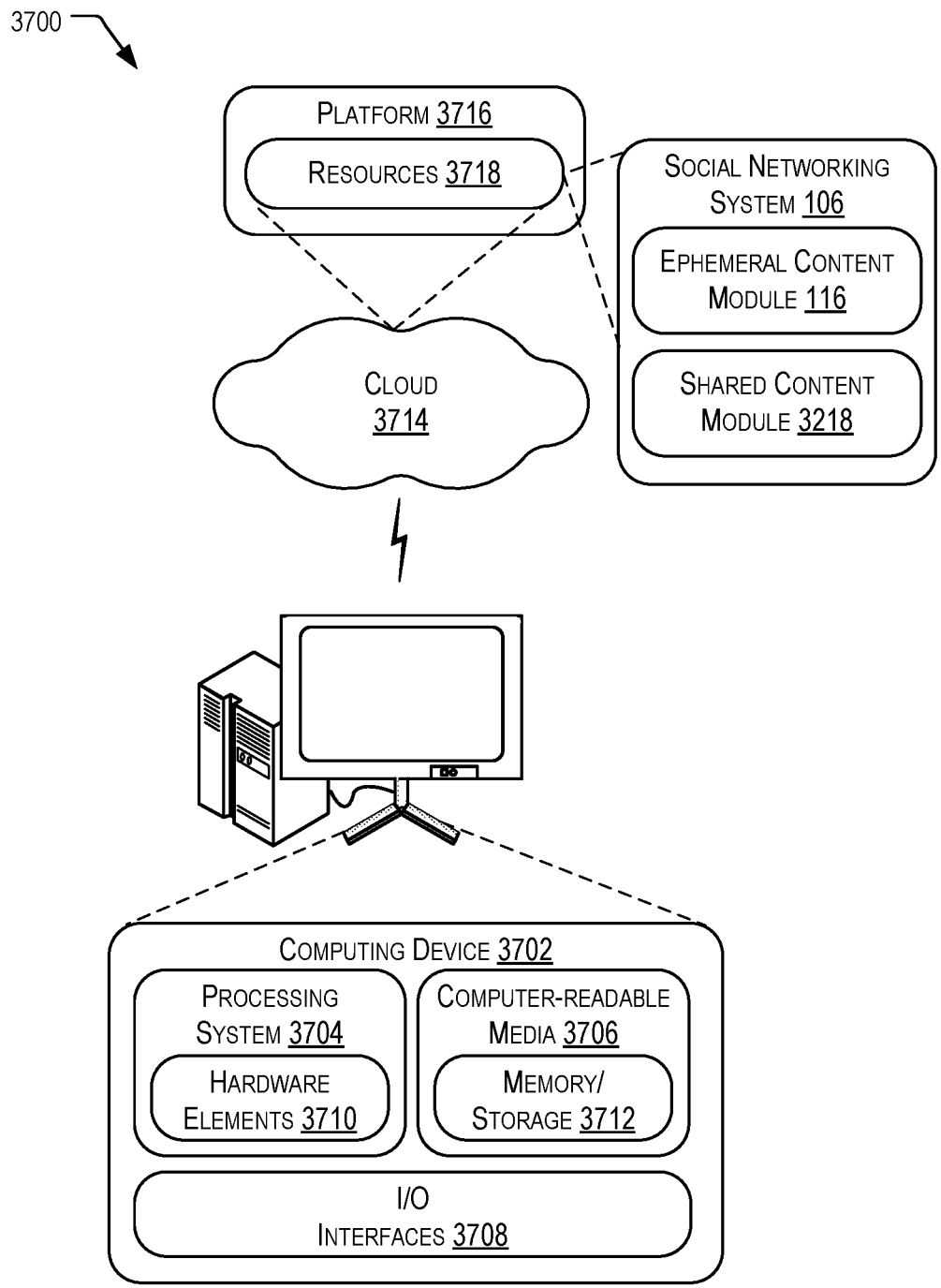
FIG. 37 illustrates an example system and device which may be used to implement the techniques described herein.

FIG. 37 illustrates an example system generally at 3700 that includes an example computing device 3702 that is representative of one or more computing systems and/or devices that may implement the various techniques described herein. This is illustrated through inclusion of the social networking system 106, the ephemeral content module 116, and the shared content module 3218. The computing device 3702 may be, for example, a server of a service provider, a device associated with a client (e.g., a client device), an on-chip system, and/or any other suitable computing device or computing system.

The example computing device 3702 as illustrated includes a processing system 3704, one or more computer-readable media 3706, and one or more I/O interface 3708 that are communicatively coupled, one to another. Although not shown, the computing device 3702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 3704 is representative of functionality to perform one or more operations using hardware. Accordingly, the processing system 3704 is illustrated as including hardware element 3710 that may be configured as processors, functional blocks, and so forth. This may include implementation in hardware as an application specific integrated circuit or other logic device formed using one or more semiconductors. The hardware elements 3710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 3706 is illustrated as including memory/storage 3712. The memory/storage 3712 represents memory/storage capacity associated with one or more computer-readable media. The memory/storage component 3712 may include volatile media (such as random access memory (RAM)) and/or nonvolatile media (such as read only memory (ROM), Flash memory, optical disks, magnetic disks, and so forth). The memory/storage component 3712 may include fixed media (e.g., RAM, ROM, a fixed hard drive, and so on) as well as removable media (e.g., Flash memory, a removable hard drive, an optical disc, and so forth). The computer-readable media 3706 may be configured in a variety of other ways as further described below.

Input/output interface(s) 3708 are representative of functionality to allow a user to enter commands and information to computing device 3702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 3702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 3702. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 3702, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 3710 and computer-readable media 3706 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 3710. The computing device 3702 may be configured to implement particular instructions and/or functions corresponding to the software and/or hardware modules. Accordingly, implementation of a module that is executable by the computing device 3702 as software may be achieved at least partially in hardware, e.g., through use of computer-readable storage media and/or hardware elements 3710 of the processing system 3704. The instructions and/or functions may be executable/operable by one or more articles of manufacture (for example, one or more computing devices 3702 and/or processing systems 3704) to implement techniques, modules, and examples described herein.

The techniques described herein may be supported by various configurations of the computing device 3702 and are not limited to the specific examples of the techniques described herein. This functionality may also be implemented all or in part through use of a distributed system, such as over a "cloud" 3714 via a platform 3716 as described below.

The cloud 3714 includes and/or is representative of a platform 3716 for resources 3718. The platform 3716 abstracts underlying functionality of hardware (e.g., servers) and software resources of the cloud 3714. The resources 3718 may include applications and/or data that can be utilized while computer processing is executed on servers that are remote from the computing device 3702. Resources 3718 can also include services provided over the Internet and/or through a subscriber network, such as a cellular or Wi-Fi network.

The platform 3716 may abstract resources and functions to connect the computing device 3702 with other computing devices. The platform 3716 may also be scalable to provide a corresponding level of scale to encountered demand for the resources 3718 that are implemented via the platform 3716. Accordingly, in an interconnected device embodiment, implementation of functionality described herein may be distributed throughout multiple devices of the system 3700. For example, the functionality may be implemented in part on the computing device 3702 as well as via the platform 3716 which may represent a cloud computing environment 3714.

Conclusion

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, at a social network application associated with a first user account, a selection of a countdown icon in a first user interface, the first user interface comprising a first selectable control that is selectable to cycle through prepopulated countdown icons displayed in the first user interface;
displaying, by the social network application, a countdown icon in the first user interface, the countdown populated with a predetermined name associated with an event, a predetermined amount of time to the event, and a selectable option that, when selected, causes a user account associated with a selection to receive a reminder when a date associated with the countdown is reached;
displaying, by the social network application in a second user interface, the countdown comprising the selectable option and a second selectable control that is selectable to add a visual customization to an associated content item, wherein the second user interface omits the first selectable control;
receiving, at the social network application, an indication to share the countdown icon with a second user account;
outputting the countdown icon to a social networking system to share with the second user account; and
updating, by the social networking application, the countdown icon to reflect a number of hours, a number of minutes, or a number of seconds from a current time until the hour, the minute, or the second associated with the countdown icon.

2. The method of claim 1, wherein the countdown icon is dynamically updated prior to and after outputting to the social networking system.

3. The method of claim 1, wherein the countdown icon further includes a second selectable option that, when selected by the user associated with the second user account, enables the second user account to reshare the countdown icon with a third user account via the social networking system.

4. The method of claim 3, further comprising receiving, at the social network application, a second notification of selection of the second selectable option by the user associated with the second user account.

5. The method of claim 1, further comprising:
receiving, at the social network application, a request to include a number of days with the countdown icon,
wherein the updating further comprises updating, by the social network application, the countdown icon to reflect a number of days from a current time until the number of days associated with the countdown icon.

6. The method of claim 1, further comprising:
receiving an input of a customized name to associate with the countdown icon; and
wherein outputting the countdown icon comprises outputting the countdown icon including the customized name.

7. The method of claim 1, wherein outputting the countdown icon comprises outputting the countdown icon unassociated with an image or a video.

8. The method of claim 1, further comprising:
receiving, at the social network application, a request to associate the countdown icon with a content item;
in response to the request, associating the countdown icon with a content item, wherein the indication to share the countdown icon comprises an indication to share the content item.

9. A system comprising:
one or more processors; and
one or more computer-readable media storing instructions that, when executed by the one or more processors, cause the one or more processors to perform operations comprising:
receiving, at a social network application associated with a first user account, a selection of a countdown feature in a first user interface, the first user interface comprising a first selectable control that is selectable to cycle through prepopulated countdown icons displayed in the first user interface;
displaying, by the social network application, a countdown in the first user interface, the countdown populated with a predetermined name associated with an event, a predetermined amount of time to the event, and a selectable option that, when selected, causes a user account associated with a selection to receive a reminder when a date associated with the countdown is reached;
displaying, by the social network application in a second user interface, the countdown comprising the selectable option and a second selectable control that is selectable to add a visual customization to an associated content item, wherein the second user interface omits the first selectable control;
receiving, at the social network application, an indication to share the countdown with a second user account;
outputting the countdown to a social networking system to share with the second user account;
receiving, at the social network application, a notification that a user associated with the second user account selected the selectable option to receive the reminder; and
updating the countdown to reflect at least one of an hour, a minute, or a second from a current time to a time associated with the event.

10. The system of claim 9, the operations further comprising:
displaying, by the social network application, a third selectable control in the first user interface, that when selected, enables a user to customize the countdown;
receiving a selection of the third selectable control;
receiving a first input of a customized name to associate with the countdown; and
receiving a second input of a date to associate with the countdown,
wherein outputting the countdown comprises outputting the countdown including the customized amount of time based at least in part the date associated with the countdown.

11. The system of claim 10, the operations further comprising receiving, at the social network application, a third input for a time to associate with the countdown,
wherein the amount of time is further based on the time associated with the countdown.

12. The system of claim 9, wherein the predetermined name is a first predetermined name, the event is a first event, and the predetermined amount of time is a first predetermined amount of time, the operations further comprising:
   receiving a selection of the first selectable control;
   displaying a second predetermined name associated with a second event and a second predetermined amount of time to the second event responsive to receiving the selection of the first selectable control.

13. The system of claim 9, wherein outputting the countdown comprises outputting the countdown unassociated with an image or a video.

14. The system of claim 9, the operations further comprising receiving an input to associate the countdown with an image or a video,
   wherein the image or the video is displayed in association with the countdown on a first device associated with the first user account, and
   wherein outputting the countdown further comprises outputting an instruction to display the image or the video in association with the countdown on a second device associated with the second user account.

15. The system of claim 14, wherein the input is a first input, the operations further comprising receiving a second input at the second selectable control to change a color of a background associated with the countdown as displayed on the first device and the second device.

16. The system of claim 9, the operations further comprising:
   receiving, at the social network application, a request to include a number of days with the countdown,
   wherein the updating further comprises updating, by the social network application, the countdown to reflect a number of days from a current time until the number of days associated with the countdown.

17. One or more non-transitory computer-readable media storing instructions that, when executed by one or more processors, cause the one or more processors to perform operations comprising:
   receiving, at a social network application associated with a first user account, a selection of a countdown feature in a first user interface, the first user interface comprising a first selectable control that is selectable to cycle through prepopulated countdown icons displayed in the first user interface;
   displaying, by the social network application, a countdown in the first user interface, the countdown populated with a predetermined name associated with an event, a predetermined amount of time to the event, and a selectable option that, when selected, causes a user account associated with a selection to receive a reminder when a date associated with the countdown is reached;
   displaying, by the social network application in a second user interface, the countdown comprising the selectable option and a second selectable control that is selectable to add a visual customization to an associated content item, wherein the second user interface omits the first selectable control;
   receiving, at the social network application, an indication to share the countdown with a second user account;
   outputting the countdown to a social networking system to share with the second user account;
   receiving, at the social network application, a notification that a user associated with the second user account selected the selectable option to receive the reminder; and
   updating the countdown to reflect at least one of an hour, a minute, or a second from a current time to a date associated with the event.

18. The one or more non-transitory computer-readable media of claim 17, the operations further comprising:
   displaying, by the social network application, a third selectable control in the first user interface, that when selected, enables a user to customize the countdown;
   receiving a selection of the third selectable control;
   receiving a first input of a customized name to associate with the countdown; and
   receiving a second input of a date to associate with the countdown,
   wherein outputting the countdown comprises outputting the countdown including the customized name and an amount of time based at least in part the date associated with the countdown.

19. The one or more non-transitory computer-readable media of claim 17, wherein the predetermined name is a first predetermined name, the event is a first event, and the predetermined amount of time is a first predetermined amount of time, the operations further comprising:
   receiving a selection of the first selectable control;
   displaying a second predetermined name associated with a second event and a second predetermined amount of time to the second event responsive to receiving the selection of the first selectable control.

20. The one or more non-transitory computer-readable media of claim 17, wherein the countdown is dynamically updated prior to and after outputting to the social networking system.

* * * * *